June 29, 1948. C. D. KNOWLTON ET AL 2,444,050
MACHINE FOR MAKING BOX BLANKS
Filed March 26, 1942 22 Sheets-Sheet 4
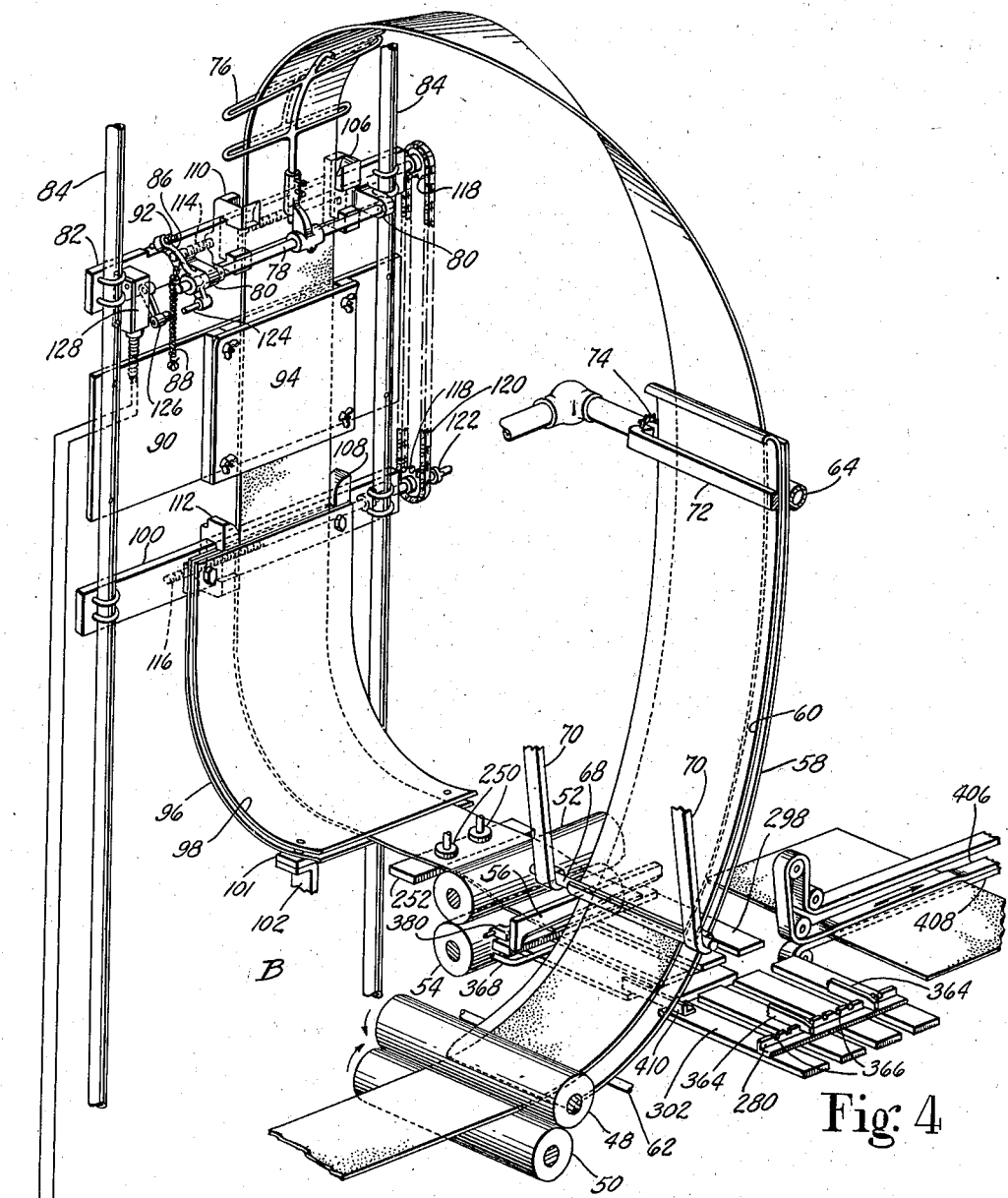
Fig. 4
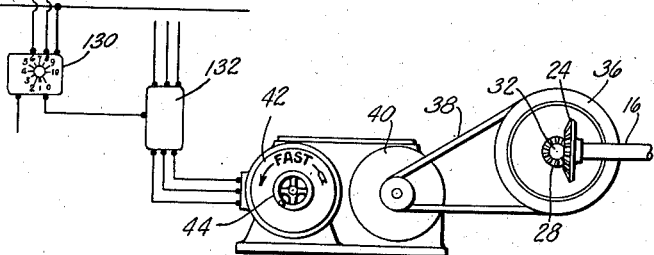
INVENTORS:

June 29, 1948.  C. D. KNOWLTON ET AL  2,444,050
MACHINE FOR MAKING BOX BLANKS
Filed March 26, 1942  22 Sheets-Sheet 6

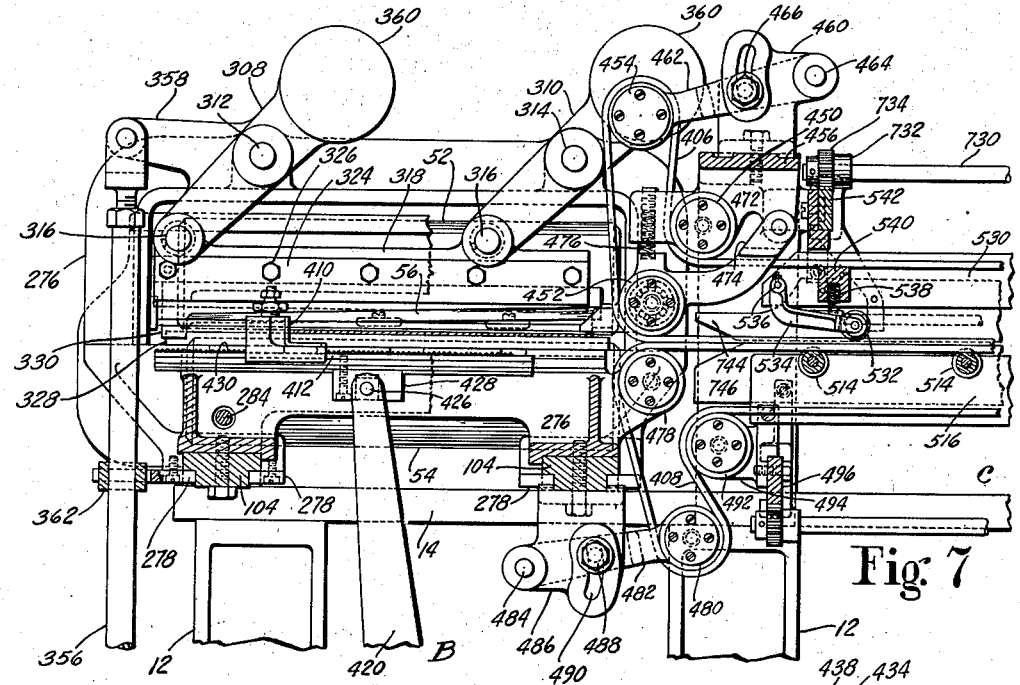
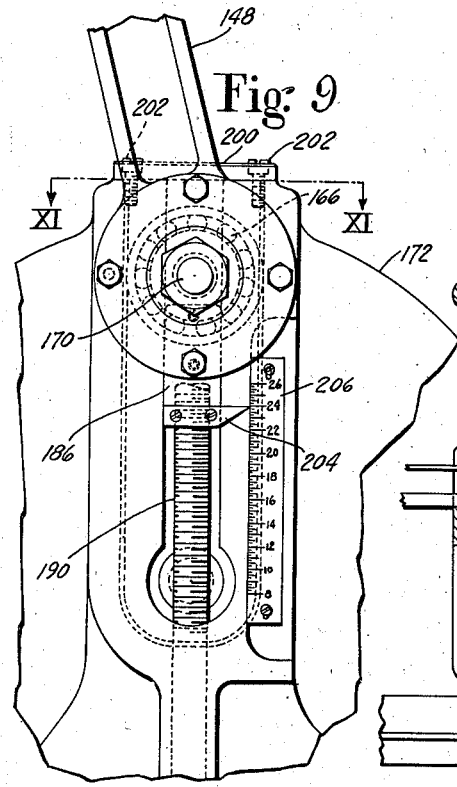
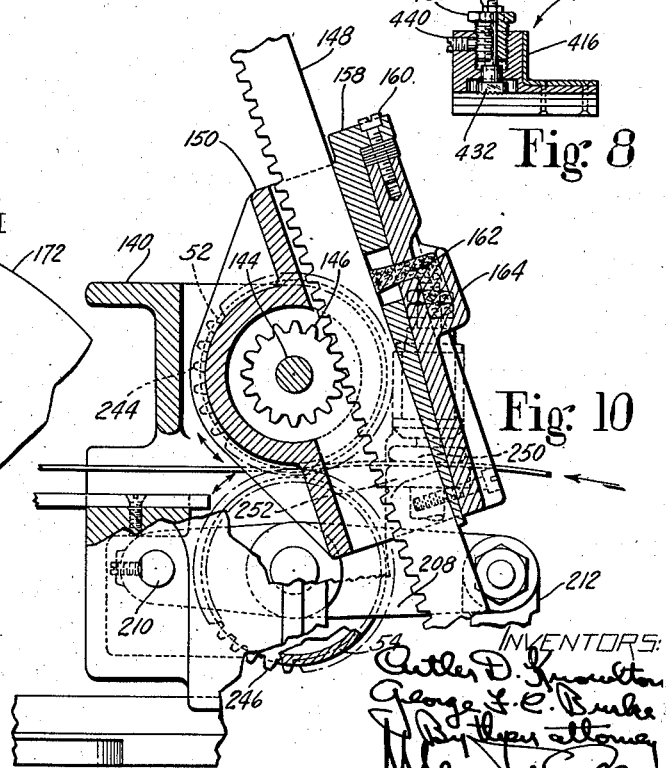

June 29, 1948.  C. D. KNOWLTON ET AL  2,444,050
MACHINE FOR MAKING BOX BLANKS
Filed March 26, 1942  22 Sheets-Sheet 8

INVENTORS

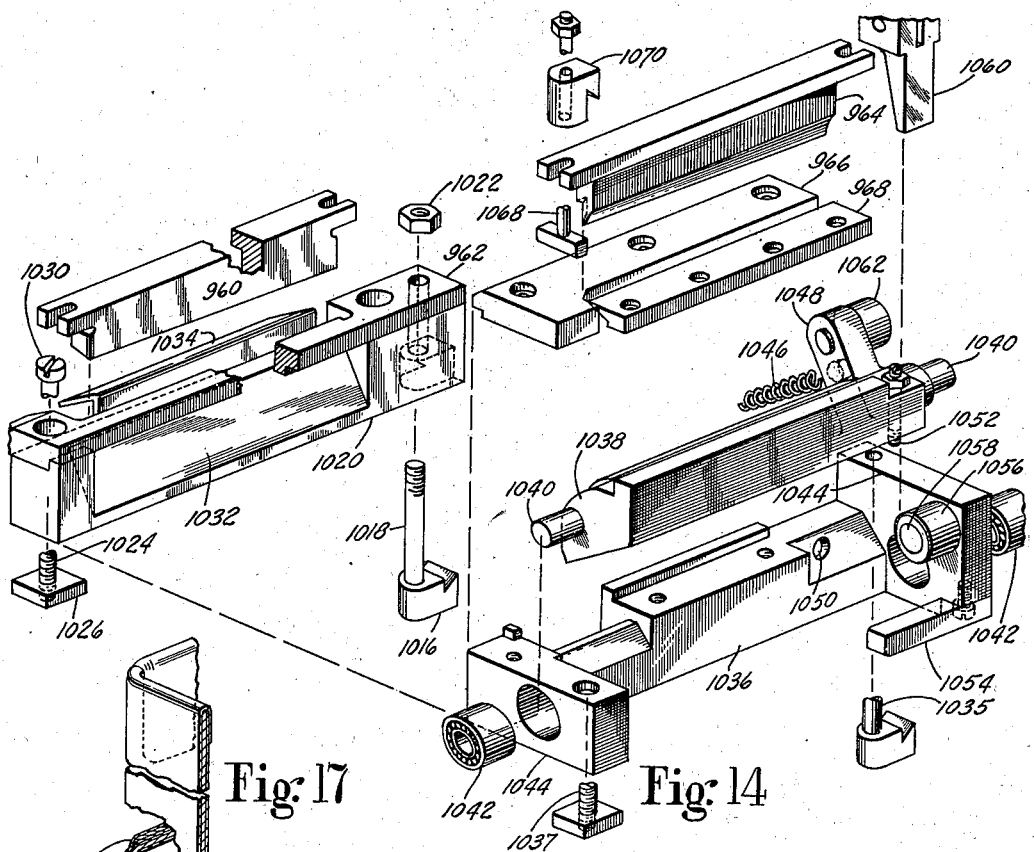
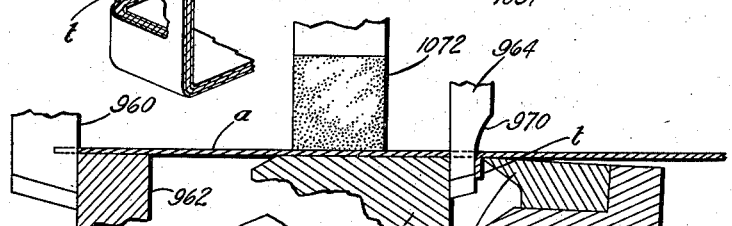
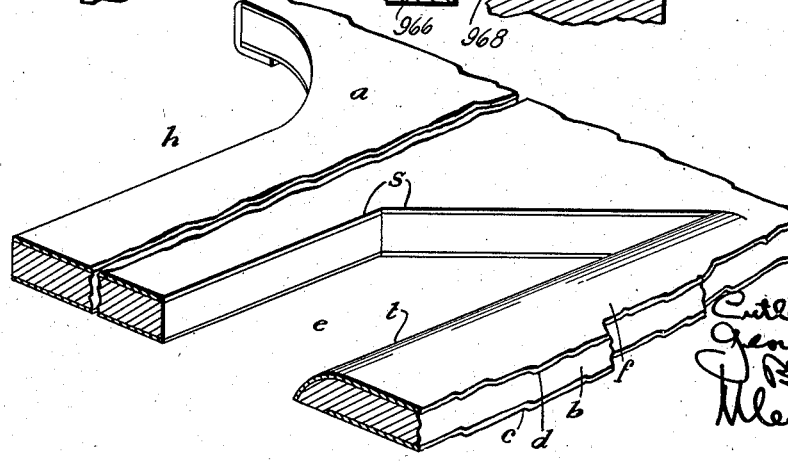

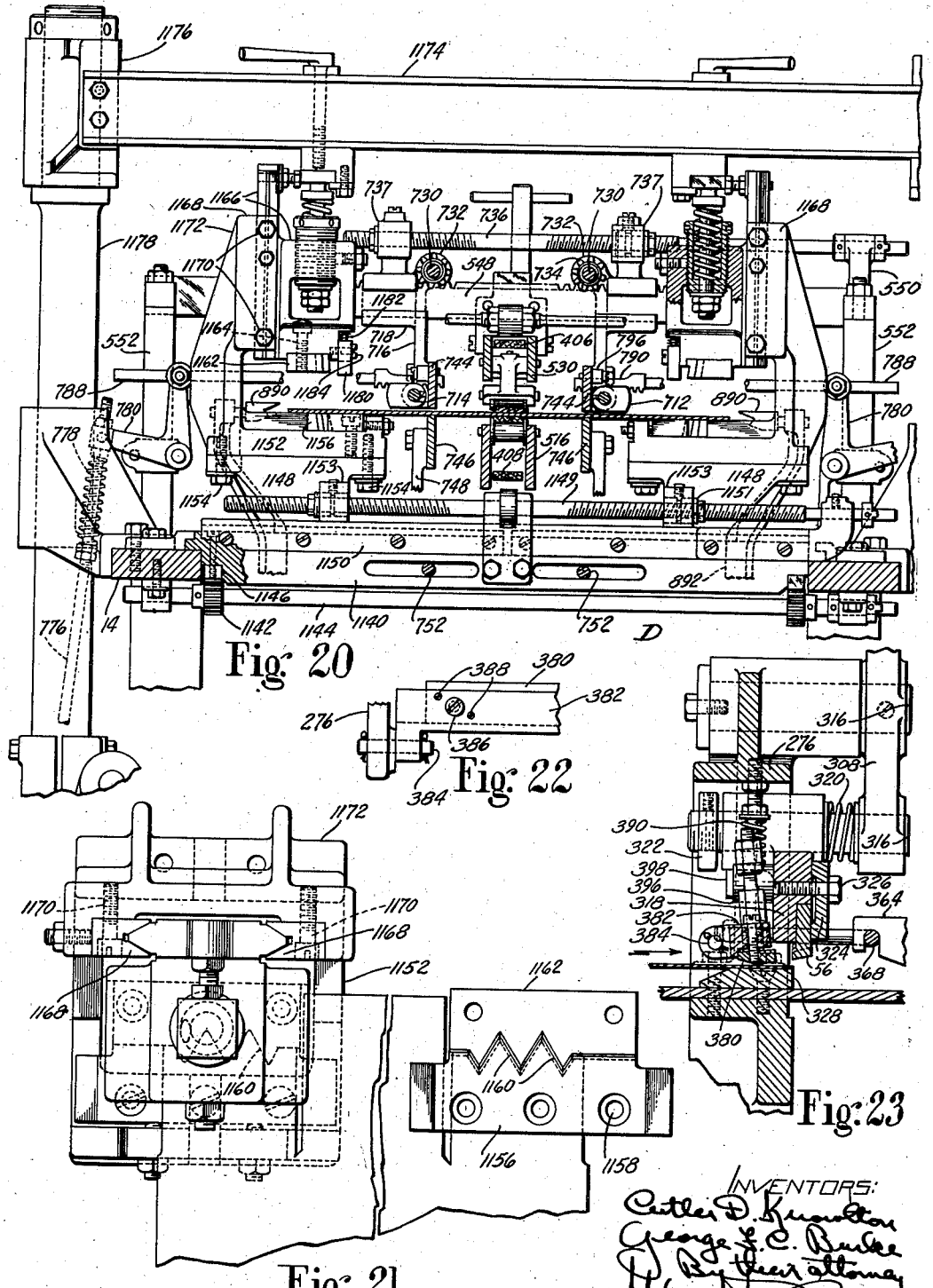

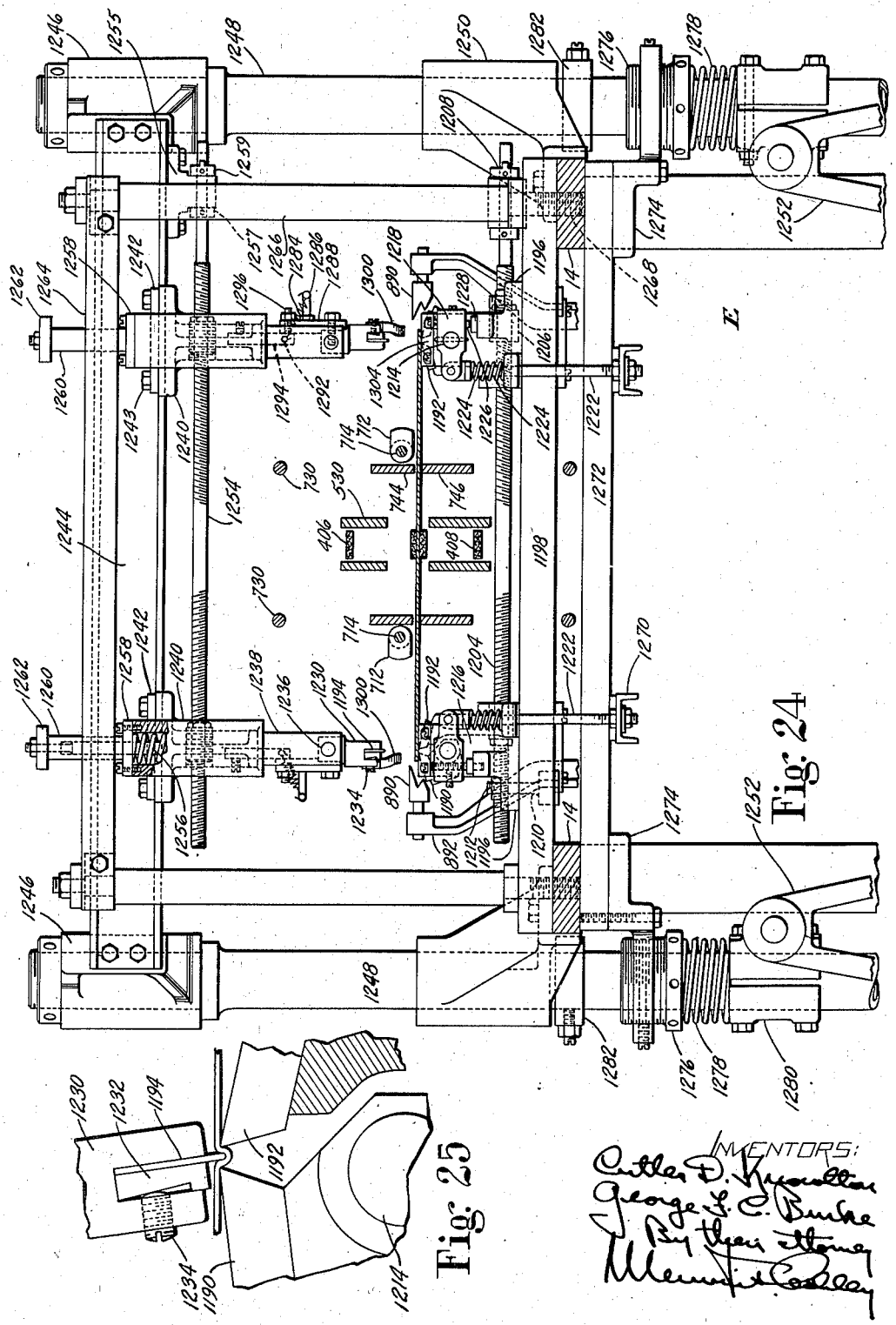

June 29, 1948. C. D. KNOWLTON ET AL 2,444,050
MACHINE FOR MAKING BOX BLANKS
Filed March 26, 1942 22 Sheets-Sheet 14
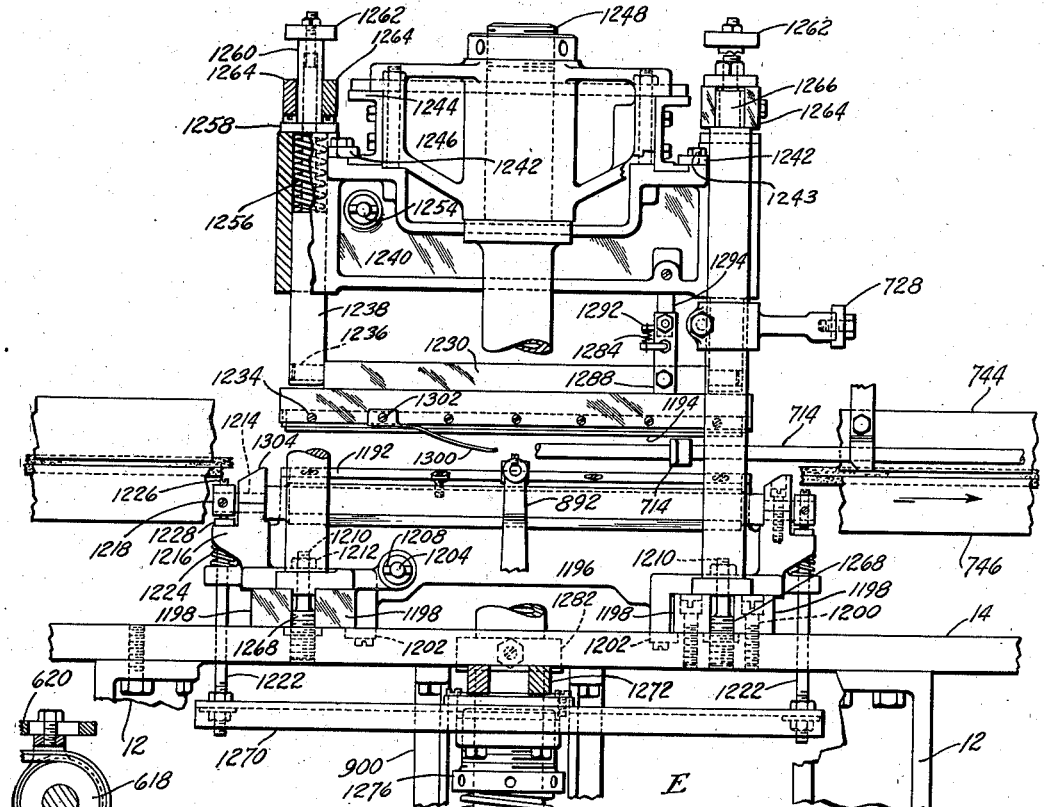
Fig. 26
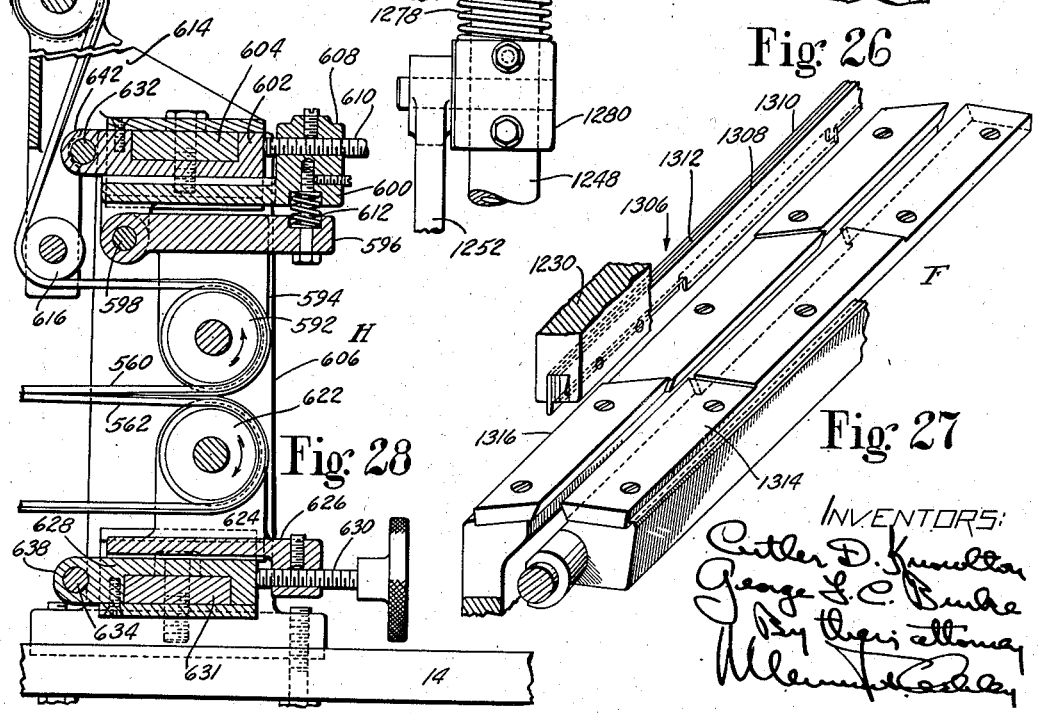
Fig. 28
Fig. 27
INVENTORS June 29, 1948.  C. D. KNOWLTON ET AL  2,444,050
MACHINE FOR MAKING BOX BLANKS
Filed March 26, 1942  22 Sheets-Sheet 16

June 29, 1948.   C. D. KNOWLTON ET AL   2,444,050
MACHINE FOR MAKING BOX BLANKS
Filed March 26, 1942   22 Sheets-Sheet 17

June 29, 1948.   C. D. KNOWLTON ET AL   2,444,050
MACHINE FOR MAKING BOX BLANKS
Filed March 26, 1942   22 Sheets-Sheet 18
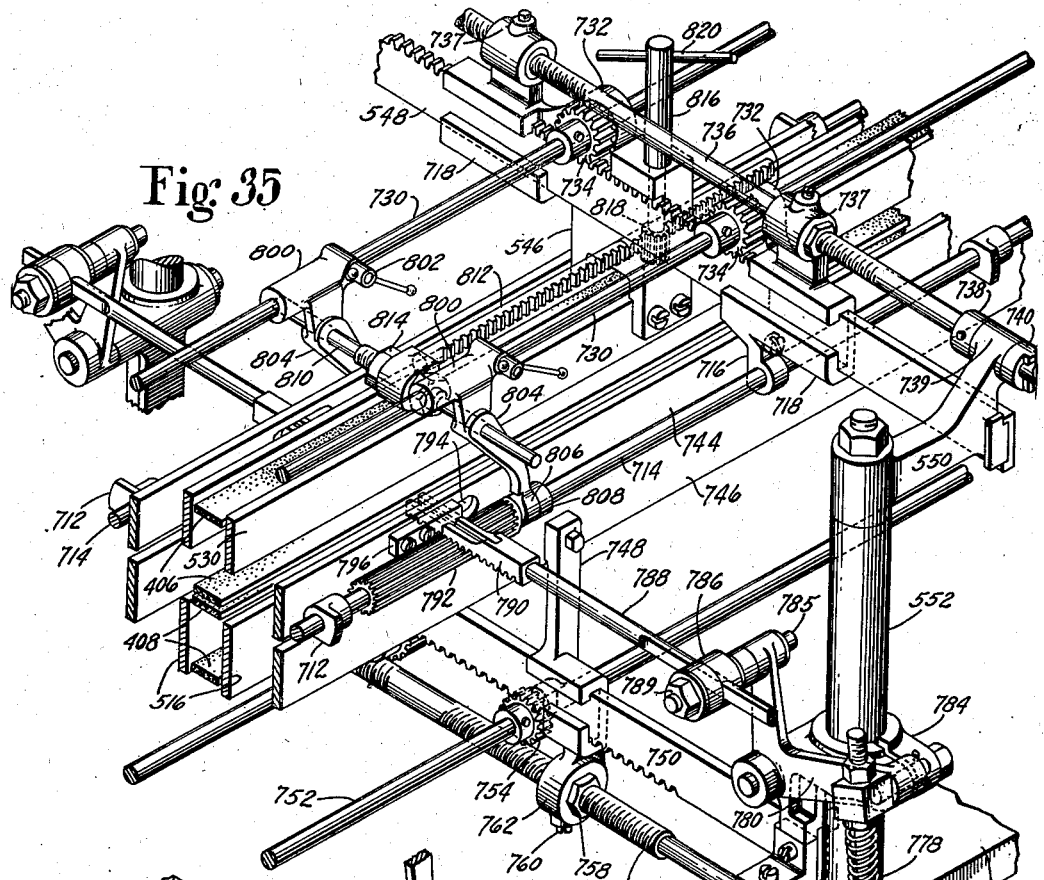
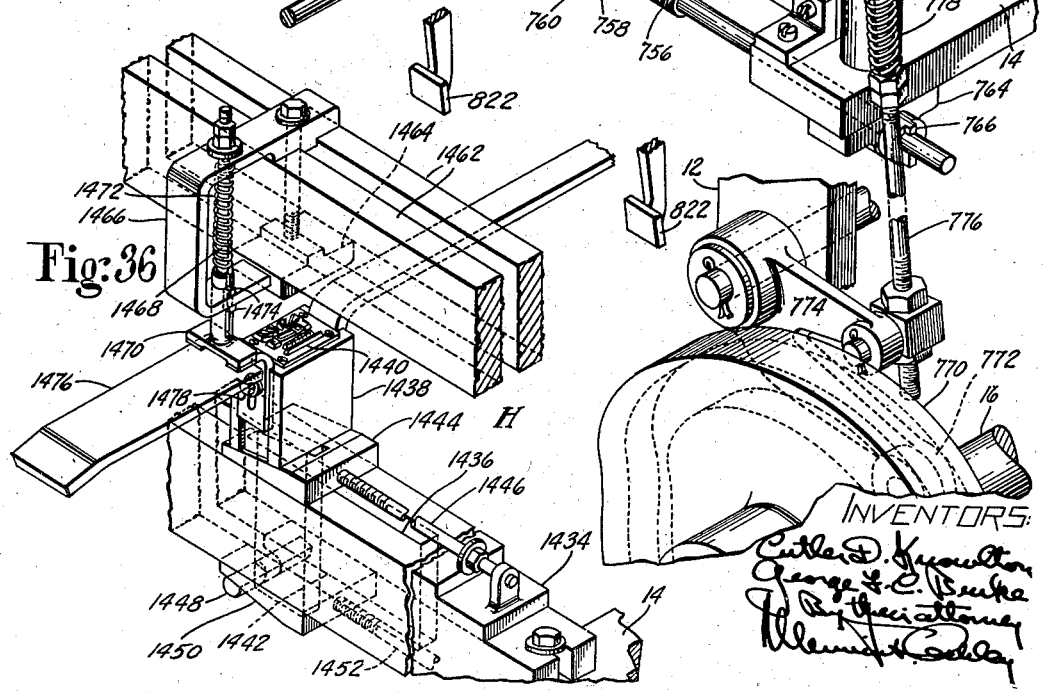

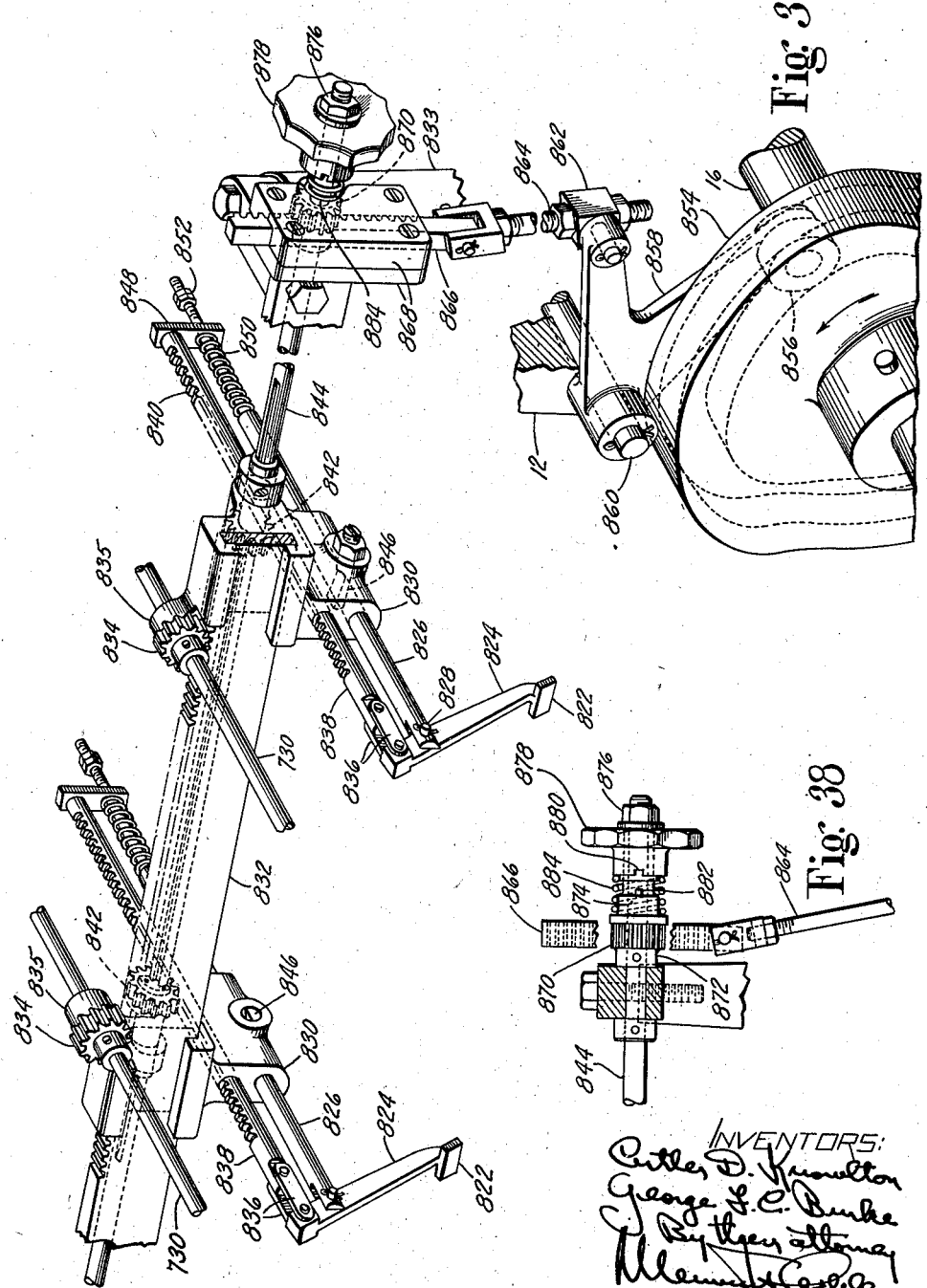

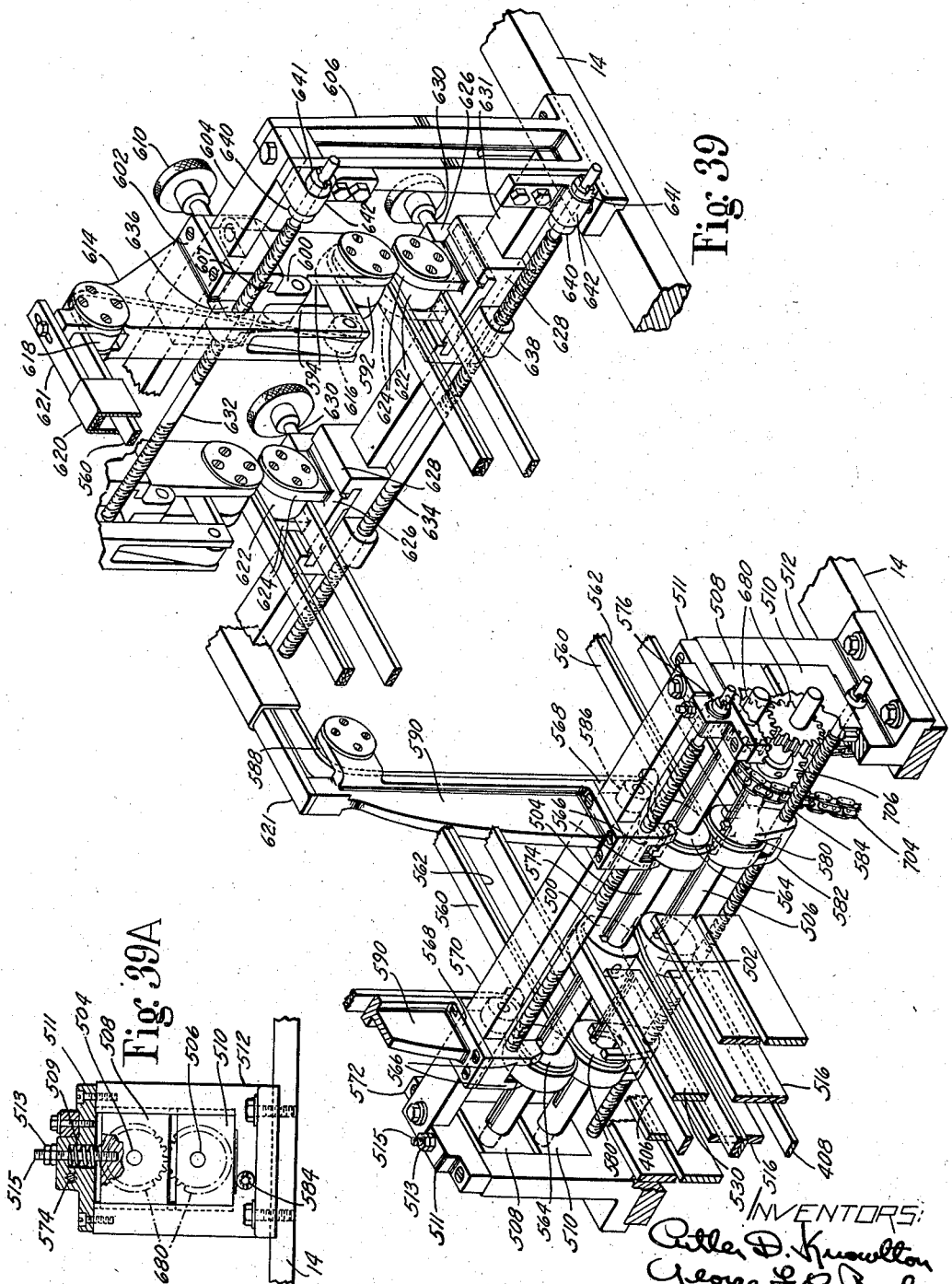

June 29, 1948. C. D. KNOWLTON ET AL 2,444,050
MACHINE FOR MAKING BOX BLANKS
Filed March 26, 1942 22 Sheets-Sheet 21

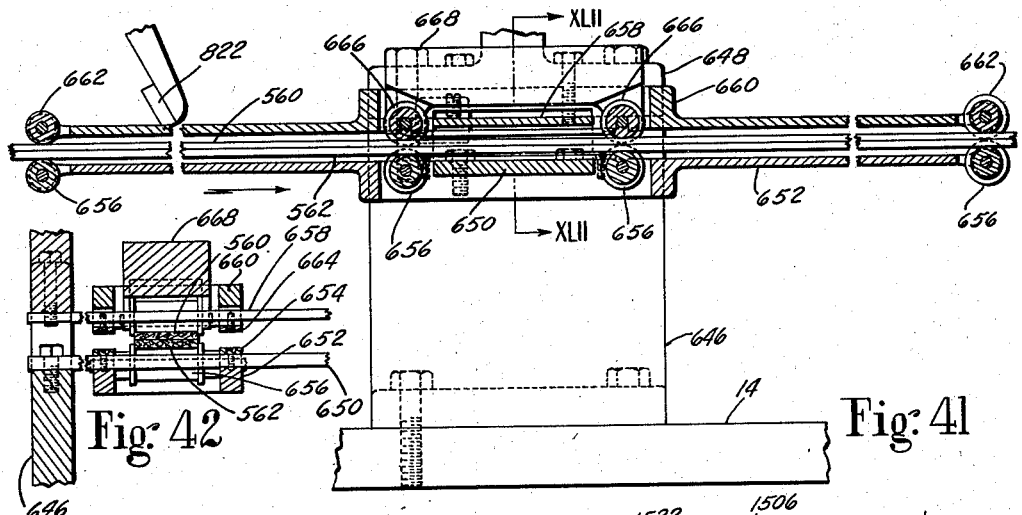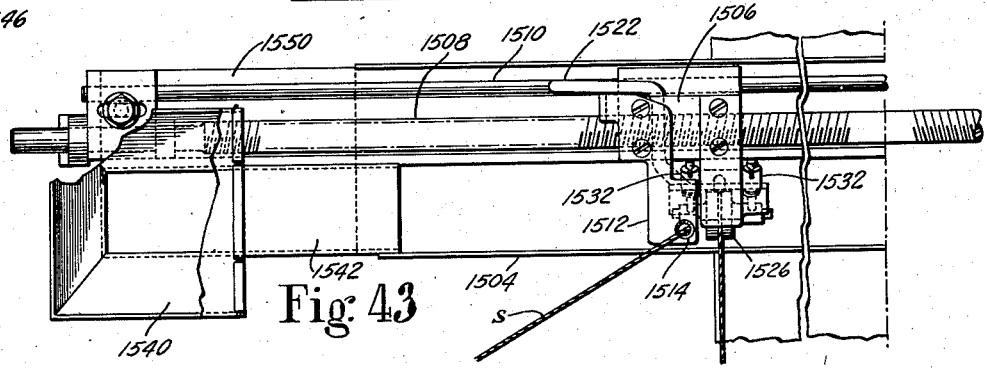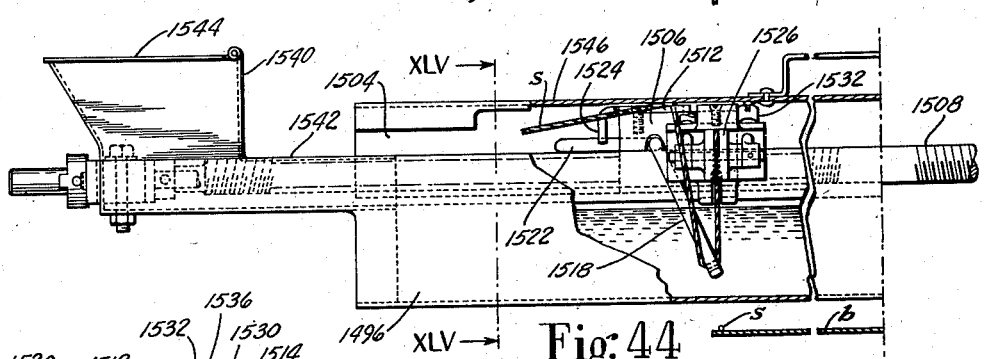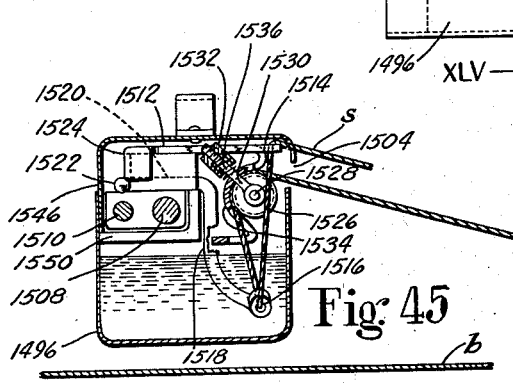

Patented June 29, 1948

2,444,050

UNITED STATES PATENT OFFICE 2,444,050

MACHINE FOR MAKING BOX BLANKS

Cutler D. Knowlton, Rockport, and George F. C. Burke, Fairhaven, Mass., assignors to Hoague-Sprague Corporation, Lynn, Mass., a corporation of Massachusetts Application March 26, 1942, Serial No. 436,362

106 Claims. (Cl. 93—36.6)

This invention relates to machines for making blanks and more particularly to blanks from which box parts are to be formed. The invention is illustrated herein as applied to a machine for making box blanks of the type illustrated in Letters Patent of the United States No. 1,811,135, granted June 23, 1931, on an application filed in the name of C. D. Knowlton, although it should be understood that the invention is applicable to the formation of other kinds of box blanks and to the manufacture of cover blanks.

An object of this invention is to provide a blank-making machine which is readily adjustable to produce box blanks of a wide range of sizes varying both as to width and to length. In the attainment of this object, webs of shell, cover and lining material are continuously combined to form a web of blank material from the end of which discrete blanks are severed and are then fed step-by-step past a plurality of forming stations at each of which an operation is performed to produce a box blank. This step-by-step feeding of discrete blanks lends itself to easy adjustment of the parts of the machine to produce blanks of different sizes and overcomes the difficulty inherent in machines of the type in which a web of blank material is continuously fed past a series of forming stations to produce the blanks which are not severed from the web until the various operations thereon are completed.

In accordance with a feature of the invention, the motion of the blanks is arrested at each of the several forming stations by stops which are movable into and out of the path of the blanks and are adjustable both in the direction of advance and transversely thereto to accommodate blanks of different sizes. Means are provided for causing the simultaneous adjustment of the stops at a plurality of stations both in the direction of advance of the blanks and transversely thereto. At certain of the stations joggers are provided to insure accurate centralization of the blanks as they come to rest and provision is made for simultaneously adjusting the joggers at the different stations to accommodate blanks of different sizes. In addition to the adjustment afforded by the stops to vary the positions at which the blanks are stopped at the stations, additional adjustments of the forming mechanisms at each station are provided.

The control of the blanks through the operating stations is facilitated by feeding the blanks with their lengthwise or finished edges disposed transversely to the direction of travel so that smooth uninterrupted edges are presented to the stops by which the motion of the blanks is arrested. By feeding the blanks in this manner, with their short dimensions in the line of travel, the overall length of the forming section of the machine is kept at a minimum which contributes to a high speed of operation of the machine. To feed the blanks in this manner and in accordance with a further feature of the invention, the path of travel of the web as it leaves the combining section is changed so that the web moves in a direction normal to the direction of advance through the combining section during which time discrete blanks are severed from the end of the web and the severed portions are then fed in a step-by-step manner through the forming stations in the same direction as the direction of the web through the combining section. To facilitate this change in the direction of travel of the web, means are provided for forming a loop between the combining section of the machine and the cutting-off section. The web is fed in a step-by-step manner into the cutting-off section and associated with the loop is a member by which the relative speeds of the combining and forming sections of the machine are controlled to maintain a substantial length of the web in the loop. Another feature of the invention relates to the means by which the web is fed from the loop intermittently to the cutting-off section and to the mechanism for varying the operation of this feeding means so that blanks of different lengths may be formed. Other features relate to the adjustment of the cutting-off means so that the blanks, regardless of their lengths, may be fed centrally of the operating stations; the means for transferring the severed portions of the web to the forming section of the machine; and the means for guiding the web smoothly through the loop.

Other features of the invention relate to improved mechanism for forming creases in the blanks which facilitate the subsequent formation of the box, this mechanism being arranged for forming simultaneously two well-defined creases in the blank without exerting any strain on the material between the creases; to improved mechanism for forming creases offset with respect to each other to separate the end-wings and corner-laps from the body of the blank and the side-wings respectively; and to the means by which the blanks are fed in a step-by-step manner through the machine. These and other features of the invention including various novel details and combinations of parts will now be more particularly described by reference to the accompanying drawings and pointed out in the claims.

In the drawings,

Fig. 3a is a plan view of a portion of the machine, illustrating the exit end of the combining section, the cutting-off section, and two of the forming stations;

Fig. 3b is a similar view of the rest of the machine, illustrating the succeeding forming stations;

Fig. 4 is a perspective view illustrating the passage of the web from the combining section to the blank-forming section of the machine and illustrating diagrammatically the mechanism for regulating the speed of the blank-forming section.

Fig. 7 is a vertical section on the line VII—VII of Fig. 6;

Fig. 8 is a vertical section through the transfer fence by which the blanks are transferred from station B to the feed belts;

Fig. 9 is a view taken from the opposite side of the machine from Fig. 6 illustrating the adjustment of the feeding movement of the rolls by which the web is fed intermittently under the knife which severs blanks therefrom;

Fig. 10 is a vertical section in a plane normal to the axes of the feed rolls illustrating the drive therefor;

Fig. 14 is an exploded view of one of the mechanisms for forming the slot between a corner-lap and an end-wing;

Fig. 15 is a view, partly in section, of one of the sets of work-engaging members for slotting and trimming the blank;

Fig. 16 is a perspective view on a greatly enlarged scale indicating how the cover paper hides the edge of the end-wing when the blank is operated upon by the mechanism of Figs. 14 and 15;

Fig. 17 is a perspective view of a portion of a box, illustrating the appearance of the covered edge of the end-wing in the completed box;

Fig. 20 is a section through the tooth-forming station D taken at right angles to Fig. 18 and looking in the direction of travel of the blanks;

Fig. 21 is a plan view of a pair of sets of cutters by which the teeth are formed at the ends of the corner-laps;

Fig. 22 is a fragmentary plan view of the clamping bar associated with the blank-severing knife;

Fig. 23 is a section on the line XXIII—XXIII of Fig. 19;

Fig. 24 is a vertical transverse section through station E in which the first sets of cross creases are formed to separate the end-wings and end-wing extensions;

Fig. 25 is a view on a large scale illustrating the action of the creaser blades on the blank;

Fig. 26 is a side elevation, partly in section of the first cross-creasing station E;

Fig. 27 is a perspective view of the cross creasers associated with station F in which are formed the second sets of cross creases separating the end-wings and the corner-laps from the rest of the blank;

Fig. 28 is a vertical section taken at the exit end of the machine illustrating the mounting of the feed belts;

Fig. 35 is a perspective view of the actuating means for the stops associated with stations C, D, E and F;

Fig. 36 is a perspective view of the embossing mechanism of station H;

Fig. 37 is a perspective view of a set of the stops associated with stations G and H illustrating the means for operating them;

Fig. 38 is a sectional detail through the mechanism for adjusting the stops of Fig. 37;

Fig. 39 is a perspective view of a portion of the belts by which the blanks are fed through the machine;

Fig. 39a is a side elevation, partly in section, illustrating the mounting of the belt driving shafts;

Fig. 41 is a vertical section of the means for holding together the upper and lower feed belts, associated with stations G and H;

Fig. 42 is a sectional view on the line XLII—XLII of Fig. 41;

Fig. 43 is a plan view of a portion of the mechanism shown in Fig. 3 for applying glue to the reinforcing string;

Fig. 44 is an elevation, partly in section, of the apparatus shown in Fig. 43; and Fig. 45 is a section on the line XLV—XLV of Fig. 44.

Figure 1:
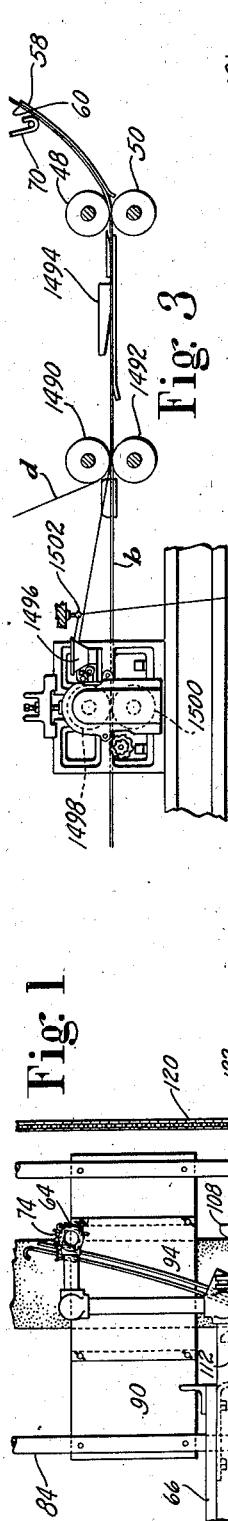
Fig. 1 is a side elevation of one form of apparatus for forming box blanks constructed in accordance with our invention, only the exit end of the combining section of the machine being illustrated.

The blanks produced by this machine are formed from a web of material which includes a layer of shell material to the opposite sides of which are adhesively secured a layer of lining material and a layer of cover material. The cover material preferably is folded around the edges of the web to present a finished appearance. Strips of stay material may be interposed between the cover material and the shell material at the edges to reinforce them. The materials forming the web may be combined in a machine such as that illustrated by Letters Patent of the United States No. 1,988,451, granted January 22, 1935 on an application filed in the name of C. D. Knowlton, the end of the combining section corresponding to that of the machine illustrated in the patent being shown at A in Fig. 1. The web of blank material is then formed into a loop at station B and its direction of travel changed so that it moves across the path of travel of the web through section A in a direction normal to the path of travel through the combining section. At station B individual blanks are severed from the end of the web. One of these severed portions from which blanks are to be produced is indicated at $a$ (Fig. 2) and is shown to comprise a layer of shell material $b$, a liner $c$ and a layer of cover paper $d$. The several illustrations at the bottom of Fig. 2 indicate the successive operations which are performed to produce the blank by the respective stations located directly above these in Figure 1. From station B in which the blanks are severed from the web, they are moved intermittently through the machine, stopping momentarily at each of the successive stations to be operated upon, these being designated successively from C to H. It should be noted that, by reason of the change in direction of travel of the web from the combining section A to the cutting-off station B, the finished edges of the blanks are disposed normally to the direction of travel through the successive operating stations. In station C the slots $e$ are formed to separate the end-wings $f$ from the corner-laps $g$. The outer edges of the corner-laps are also cut away at $h$ to accommodate the thickness of the material where the end-wing extensions are folded over the corner-laps during the setting up of the blank to box form. The blank now passes to station D in which the corner-laps $g$ are formed with a series of alternate projections and depressions to provide saw-toothed edges $j$. In station E the outer ends of the end-wings $f$ are creased transversely at $k$ to form end-wing extensions $l$. In station F second sets of cross creases $m$ and $n$ are formed to define the bases of the end-wings $f$ and the corner-laps $g$. The creases $n$ are offset slightly from the creases $m$ so that when the box is set up the corner-laps may lie smoothly within the end-wings. In station G longitudinal creases $o$ are formed which extend between the inner ends of the slots $e$ to define the bases of the side-wings $p$. Finally, in station H the blank may be embossed, or otherwise inscribed, with any desired design $q$ and the finished blank is then ejected from the machine.

The machine is built on a frame which comprises supporting bars 10 extending lengthwise of the machine and supported on the floor. Extending upwardly from the bars 10 are posts 12 to the upper ends of which are fastened rails 14 which extend lengthwise of the machine. The rails on opposite sides of the machine are connected by a plurality of crossbars, as will appear hereinafter, thereby to form a rigid framework.

All the parts of the blank-forming portion of the machine receive power from a pair of drive shafts 16 and 18 (Figs. 1 and 6) which extend lengthwise of the machine. These shafts are supported in bearings 20 at the upper ends of posts 22 mounted on the bars 10. The shafts carry bevel gears 24 and 26 (Fig. 6) at their forward ends which mesh respectively with bevel gears 28 and 30 mounted on a drive shaft 32 supported in bearings 34. These bearings are mounted in the upper ends of arms 35 supported by the bars 10. Fixed to the shaft 32 is a pulley 36 which is connected by a plurality of V-belts 38 to a variable speed drive mechanism 40 (Fig. 4) driven by a motor 42. The variable speed drive mechanism 40 may be of any suitable construction and is controlled by a hand wheel 44 mounted on the housing of the motor 42. Adjustment of this hand wheel varies the speed of operation of all the mechanisms in the blank-forming part of the machine by changing the speed of rotation of the drive shafts 16 and 18.

The completely formed web is delivered from the combining section A by a pair of constantly and uniformly driven feed rolls 48 and 50 (Figs. 1 and 4). The web is then turned through an upwardly extending loop, as shown in Fig. 4, to shift its direction of travel approximately 90°. From the loop the web passes between a pair of intermittently operated feed rolls 52 and 54 under a knife 56 which is reciprocated in timed relation to the feed rolls 52 and 54 to cut blanks from the end of the web. The loop not only serves to change the direction of travel of the web and cause it to move in a path intersecting its path through the combining section but also serves to store a sufficient amount of the web material which will be fed, during the operation of the rolls 52 and 54, at a high rate of speed to form a blank.

Figure 6:
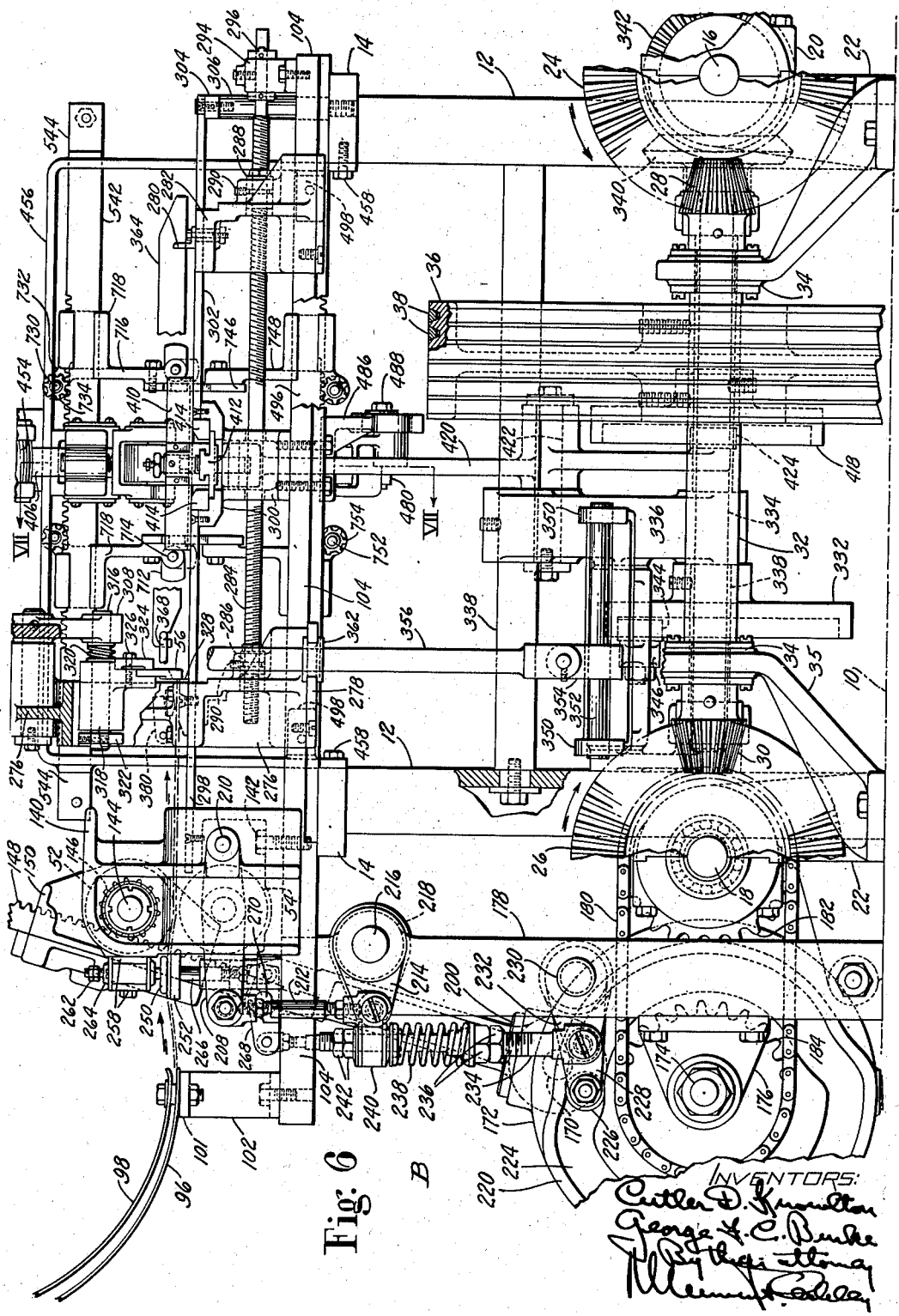
Fig. 6 is a view, partly in section, of station B taken at right angles to Fig. 5 and looking in the direction of travel of the blanks through the machine.

The web is guided upwardly from the feed rolls 48 and 50 into the loop by a pair of curved guide plates 58 and 60. The lower plate 58 is secured at its lower end to a rod 62 (Fig. 1) mounted in the exit end of the combining section A adjacent to the feed rolls. The upper end of the guide plate 58 is secured to a supporting pipe 64 which is in turn connected to a support 66. The upper guide plate 60 is provided at its lower end with a transversely extending rod 68 removably supported in a pair of hangers 70 depending from the support 66. The upper end of the guide plate 60 carries a U-shaped bracket 72 the legs of which bear against the supporting pipe 64 and are held thereagainst by springs 74 connected to pins on the bracket and the pipe. The web is guided through the top of the loop by a cage 76 secured to a rod 78 pivoted in a pair of brackets 80. These brackets are mounted on a bar 82 secured to the upper ends of a pair of vertical supports 84 which may be secured at their lower ends to the floor. The pivotal support of the rod 78 allows the cage to rise and fall with the web as the loop varies in length. The rod 78 is biased in a direction to maintain the cage in an elevated position which depends upon the length of the loop. For this purpose the rod 78 carries an arm 86 to which is secured one end of a spring 88, the other end of which is secured to a plate 90 fastened to the supports 84. The upper end of the arm 86 carries an adjustable stop screw 92 arranged to engage a portion of the bar 82 to limit the uppermost position of the cage 76. The cage thus acts to guide the web in a smooth loop through its change in direction of travel, regardless of the length of the loop. The web passes from the cage between the plate 90 and a plate 94, secured in spaced relation to the plate 90, and then between a pair of curved guide plates 96 and 98 whence it is delivered in a substantially horizontal plane to the intermittently operated rolls 52 and 54. The plates 96 and 98 are supported at their upper ends by a bar 100 carried by the supports 84 and at their lower ends by a bar 101 carried by brackets 102 (Fig. 6). These brackets are supported on the ends of crossbars 104 which are in turn mounted on the rails 14.

Inasmuch as the machine is designed to accommodate webs of different widths, adjustable guides are associated with the bars 82 and 100 (Fig. 4) to direct the web during its passage to the intermittently operated feed rolls. These guides comprise fixed guide members 106 and 108 carried by the bars 82 and 100 respectively for engagement with one edge of the web and adjustable guide members 110 and 112 for engagement with the other edge of the web. The adjustable guide members are carried by screws 114 and 116, respectively, having fixed upon their outer ends sprockets 118 connected by a chain 120. The lower screw 116 carries a member 122 adapted to receive a crank to facilitate rotation of the screw, which motion is transmitted through the sprockets and chain to the upper screw 114 to cause simultaneous adjustment of the guides 110 and 112.

During the normal operation of the machine the speed of the combining section A will be adjusted so that the web will be delivered at a speed just slightly below the speed at which the web is fed into the blank-forming portion of the machine by the feed rolls 52 and 54. Accordingly, the amount of the web in the loop in station B will gradually diminish and provision is made for interrupting the power supply to the driving motor 42 intermittently to permit the web to accumulate in the loop. This is controlled by the movement of the cage 76, which of course will continually rise and fall because of the intermittent operation of the feed rolls 52 and 54. Each time the cage falls with the loop it will fall somewhat lower than the previous time, until finally a switch-actuating member 124 carried by the lower end of the arm 86 will engage an arm 126 of a switch 128. This switch is normally closed but is opened when the cage is depressed to a predetermined point, thereby to interrupt the power supply to the motor 42. So that the supply of power to the motor will remain off long enough to permit the accumulation of a substantial amount of web in the loop, a time-delay relay 130 is provided in the circuit between the switch and a starter 132 for the motor. Momentary opening of the switch will cause interruption of the supply of power to the motor for a predetermined length of time, depending upon the setting of the relay. Actually this time need not be very long, inasmuch as the web will accumulate rapidly in the loop and the blank-forming part of the machine will slow down, but the momentum of the driving motor and the mechanisms driven thereby will keep the machine running at a reduced speed during the short time that the power is cut off from the driving motor. The effect, therefore, of opening the switch 128 is to cause the blank-forming portion of the machine to slow down without coming to rest.

The feed rolls 52 and 54 (Fig. 6) are mounted in a housing 140 secured by screws 142 to the crossbars 104. The feed rolls are rotated by mechanism to be described, the direction of rotation of the rolls being periodically reversed. The lower feed roll is intermittently moved into and out of feeding relation with the upper roll to feed the web only when the rolls are rotating in one direction. The upper feed roll is mounted on a shaft 144 journaled in the housing 140 and carrying a pinion 146 near one of its ends. This pinion meshes with a rack 148, the upper end of which slides in a housing 150 (Fig. 10) mounted for rocking movement about the axis of the roll. Received between the rear wall of the housing 150 and the back of the rack 148 is a wedge-shaped gib 158 adjustably secured to the housing by a screw 160. By turning the screw 160 the gib may be adjusted to position the rack properly relatively to the pinion 146. The back of the rack may be lubricated by a piece of felt 162 passing through apertures in the gib 158 and the adjacent wall of the housing. The outer end of the felt is received by an oil cup 164 on the rear wall of the housing. The lower end of the rack is connected by ball bearings 166 (Figs. 5 and 9) and a bushing 168 (Fig. 5) to a crank pin 170 mounted for radial adjustment on a crank disk 172. The disc is keyed to a shaft 174 mounted in bearings 176 (Fig. 6) carried by vertical posts 178. These posts are supported on the bars 10 and are secured at their upper ends to the crossbars 104 to provide additional support for these crossbars. The shaft 174 is parallel to the drive shaft 18 and is connected to it by a sprocket chain 180 passing over sprockets 182 and 184 on the shafts 18 and 174 respectively. Thus the crank disk 172 is rotated continuously during the operation of the drive motor 42 to reciprocate the rack 148 and to rotate the upper feed roll 52 intermittently in opposite directions. The upper and lower feed rolls are geared together to rotate in unison by gears 244, 246 (Fig. 10). The extent of rotation of the feed rolls in one direction or the other will determine the amount of the web that is fed at one time and the length of blank to be severed therefrom. In order to produce blanks of different lengths, provision is made for adjusting the crank pin 170 radially of the crank disk to vary the throw of the rack 148. The inner end of the crank pin 170 is connected to a wedge-shaped slide 186 (Fig. 11) mounted for sliding movement in a dovetail slideway 188 formed in the crank disk. Threaded through the slide 186 is a screw 190 passing through the slideway and outwardly through the periphery of the crank disk (Fig. 5) at a point diametrically opposite from the slide 186. Near this outer end the screw is provided with a collar 192 which seats in a counterbore in the crank disk and is held in place by a screw plug 194 threaded into the crank disk. A collar 196 is secured to the screw on the other side of the plug 194 thereby to prevent axial movement of the screw. The screw is provided with a square portion 198 to receive a tool, so that the screw may be rotated to adjust the position of the slide 186 and the crank pin relatively to the crank disk. The outer end of the slideway is closed by a cap 200 secured to the crank disk by screws 202 (Fig. 9). To indicate the position of adjustment of the crank pin and accordingly the amount of feed of the rolls 52 and 54 for each rotation of the crank disc, a pointer 204 is carried by the slide 186. A scale 206 provided with indicia suitably calibrated is mounted on the crank disk and cooperates with the pointer to indicate the amount of feeding movement of the feed rolls.

The lower feed roll 54 is supported for movement toward and away from the upper feed roll 52 by a pair of levers 208 (Figs. 6 and 10). One end of each lever is pivoted at 210 to the housing 140 and the other end of each lever is connected by links 212, adjustable as to length, (Figs. 5 and 6) to arms 214 fast on the outer ends of a shaft 216. This shaft is journaled in bearings 218 extending outwardly from the posts 178. The shaft 216 is arranged to be oscillated, thereby to move the feed roll 54 toward and away from the feed roll 52. For this purpose a cam 220 is mounted on the hub of the crank disk 172 (Fig. 5) and is secured to the crank disk by screws 222. The cam 220 is provided with a cam groove 224 (Fig. 6) in which rides a cam roll 226 mounted on the end of an arm 228. This arm is fixed to a shaft 230 journaled in the posts 178. A second arm 232 is secured to the shaft 230 and to its outer end is pivoted an upstanding rod 234. This rod is threaded near its lower end to receive a pair of nuts 236 against which the lower end of a compression spring 238 bears. The upper end of the spring 238 bears against the outer end of an arm 240 through which the rod passes. The other end of the arm is secured to the shaft 216. The upper end of the rod 234 is threaded to receive a pair of lock nuts 242 to form a stop and limit upward movement of the arm 240 by the spring 238. Upon rotation of the cam 220, the rod 234 is reciprocated vertically and acts through the spring 238 to oscillate the shaft 216. The motion of this shaft is transmitted through the adjustable links 212 to the levers 208 carrying the lower feed roll 54 thereby to move this feed roll toward and away from the upper feed roll with a yielding pressure. The adjustable links 212 permit adjustment of the relative pressures between the ends of the feed rolls when in feeding relation to insure uniform pressure on the web between the rolls. The teeth of the gears 244 and 246 by which the rolls are connected are of sufficient depth so that they do not move out of engagement with each other upon downward movement of the lower roll 54.

Clamping means are provided for holding the web against movement at the end of each feeding movement of the feed rolls. These clamping means are located on the intake side of the feed rolls and comprise a plurality of feet 250 (Figs. 5 and 6) engageable with the upper side of the web. A movable clamping bar 252 on the under side of the web is arranged to be reciprocated vertically to clamp the web intermittently against the feet 250. The feet are provided with upwardly extending shank portions 254 (Fig. 5) guided for vertical movement in housings 256 mounted between a pair of bars 258 secured to the roller housing 140. Springs 260 surround reduced portions of the shanks 254 to urge the feet downwardly and permit upward yielding movement thereof. Nuts 262 are threaded on the upper ends of the shanks 254 and cooperate with caps 264 at the tops of the housings 256 to limit the extent of downward movement of the feet.

The clamping bar 252 has a pair of depending shank portions 266, the lower ends of which are pivoted to arms 268 fixed to a shaft 270 journaled in bearings 272 (Fig. 5) secured to the crossbars 104. This shaft is connected by an arm 274 to the upper end of the rod 234 by which vertical movement is imparted to the lower roll. As this rod is moved downwardly to move the lower feed roll out of feeding relation with the upper roll, the shaft 270 is turned in a direction to lift the clamping bar 252 to press the web against the feet 250 thereby to hold the web against movement relatively to the feed rolls during the severing of a blank from the end of the web. This clamping means insures accurate feeding of the web so that exactly the right length of blank will be cut therefrom.

At the end of a movement of the rolls 52 and 54 to feed the web a predetermined amount and after the web has been clamped between the feet 250 and the clamping bar 252, the knife 56 is operated. This knife is supported for reciprocatory movement by a frame 276 (Figs. 3a, 5, 6 and 7) which is adjustably carried by the crossbars 104. These bars are T-shaped in cross-section, as shown in Fig. 7, and gibs 278 fastened to the frame 276 hold it on the crossbars. A fence or stop 280 (Figs. 3a and 6) is provided for engagement by the end of the web at the conclusion of the feeding movement and serves to guide the blank after it has been severed from the web as it is transferred forwardly from the cutting station. This fence is secured to a supporting frame 282 also carried by the crossbars 104 for sliding movement. It is desirable to maintain the center line of the blank always in the same position lengthwise of the machine and accordingly when blanks of different lengths are to be severed from the web the positions of both the knife and the fence must be correspondingly adjusted. The frames 276 and 282 carrying the knife and the fence are adjusted simultaneously toward or away from each other by an adjusting screw 284 threaded through bushings or nuts 286 and 288 in the frames 276 and 282 respectively. These bushings are held against axial movement in the frames by set screws 290 having reduced end portions engageable with annular grooves in the bushings. Upon loosening the screws either one of the bushings may be rotated relatively to the screw 284 to cause adjustment of the associated frame relatively to the other frame. The threads at the ends of the screw 284 are oppositely disposed so that upon rotation of the screw the frames will be simultaneously moved toward or away from each other in equal amounts. The outer end of the screw is supported by a bearing 294 and the screw is provided with a fitting 296 to receive a crank by which the screw is turned.

The end of the web is supported for the cutting operation by two series of slats 298 and 302. The slats 298 are supported at one end by the feed-roll housing 140 and at the other end by a support 300, disposed midway between the frames 276 and 282. This support, as will be described, carries a transfer bar by which the blanks are transferred to feed belts which carry them through the machine. The second series of slats 302, in line with the slats 298, is carried at one end by the support 300 and at the other end by a bar 304 which is in turn supported by a pair of spaced posts 306 threaded into the adjacent rail 14.

For supporting the knife 56 a pair of arms 308 and 310 pivoted at 312 and 314 to the upper part of the frame 276 is provided. The lower ends of these arms carry pins 316 on which is slidably mounted a knife carrier 318 (Figs. 6, 7 and 23). Springs 320 between the carrier 318 and the arms urge the carrier toward collars 322 on the outer ends of the pins. The knife is removably clamped upon the carrier 318 by a plate 324 secured to the carrier by screws 326. The knife acts against a shear block 328 secured to an intermediate portion of the frame 276. As indicated in Fig. 7 the shearing edge of the knife is inclined to shear the blank progressively from the web. In order that the springs 320 will not urge the knife carrier 318 to a position in which the knife would strike the top surface of the shear block, the knife is provided with a tail 330 at one end which engages the adjacent edge of the shear block in all positions of the knife.

Figure 5:
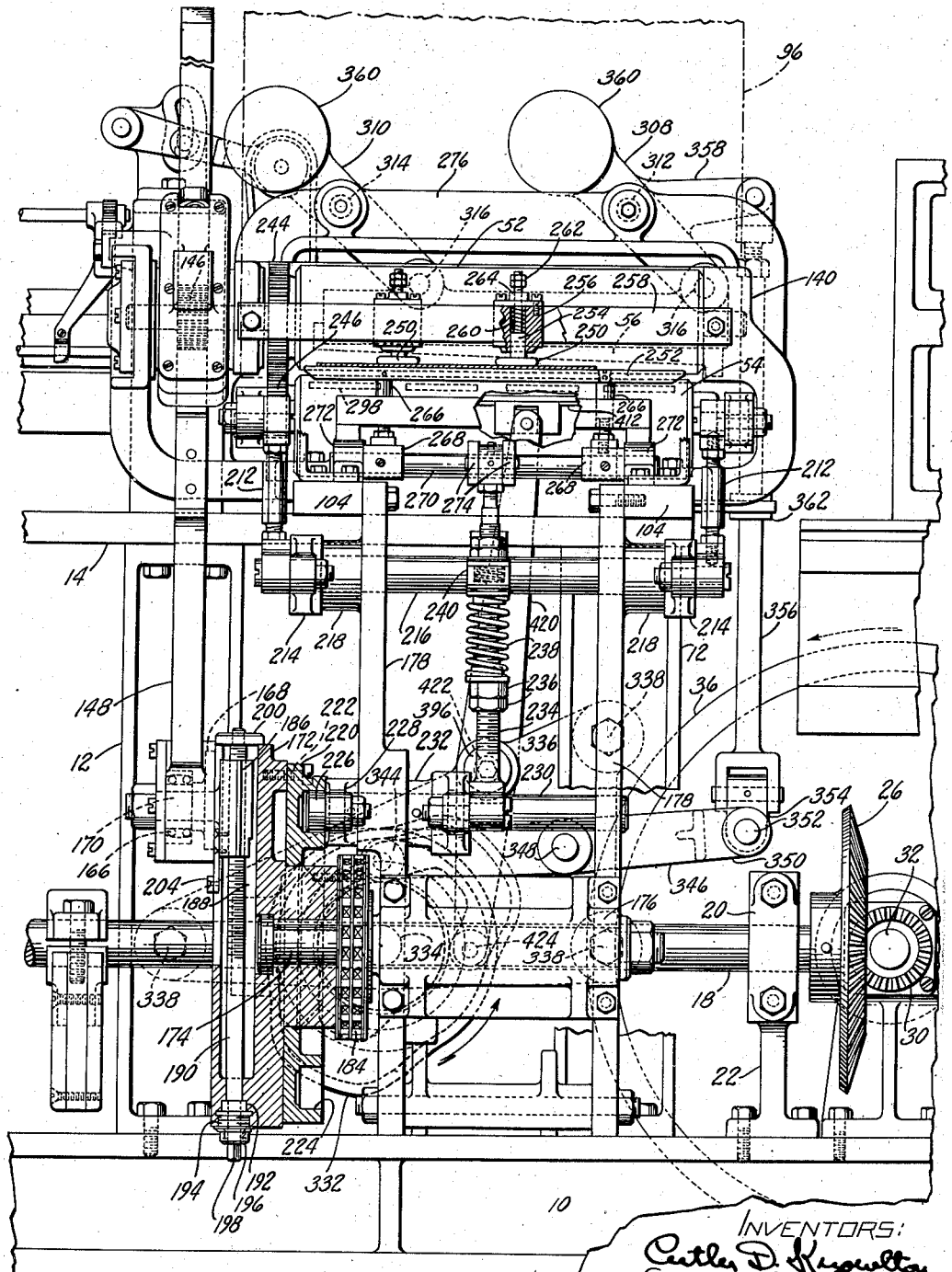
Fig. 5 is a side elevation, partly in section, of the cutting and feeding station B, at which discrete blanks are severed from the end of the web formed in the combining section, this view being taken from the opposite side of the machine from Fig. 1.

The knife is operated by a cam 332 (Fig. 6) fast to a shaft 334 journaled in a supporting plate 336. This plate is carried by tie rods 338 extending between and secured to legs 12 (Figs. 5 and 6). The cam shaft 334 carries at its outer end a bevel gear 340 driven from a bevel gear 342 on the drive shaft 16. A cam roll 344 cooperating with a cam groove in the side of the cam 332 is carried by one end of a lever 346 (Fig. 5) pivoted to the plate 336 at 348. The outer end of the lever is bifurcated to form a pair of spaced arms 350 (Fig. 6) for supporting a rod 352 forming a connection between the lever and a link 354. This link is in turn connected by a link 356, adjustable as to length, (Fig. 5) to an arm 358 integral with the arm 308 carrying one end of the knife. As the cam 332 is rotated to oscillate the lever 346, the knife will be reciprocated intermittently to sever blanks from the end of the web. The links 308 and 310 which support the knife provide for a parallel motion with respect to the shear block 328. The upper ends of these arms are weighted at 360 to counterbalance the weight of the knife and the knife carrier 318. The rod 352 by which the link 354 is connected to the lever 346 provides a slidable connection between these members which permits adjustment of the knife-supporting frame along the crossbars 104. The vertically extending link 356 passes through a guide bushing 362 mounted for sliding movement in a slotted extension of the outer gib 278, as shown in Fig. 7, which allows the necessary swinging movement of the link as it is reciprocated.

For insuring that the blank after it is severed from the web remains in a substantially flat condition, a pair of hold-down bars 364 (Fig. 4) are supported above the end of the web to prevent its curling appreciably from the supporting slats 298, 302. These bars are supported at one end in notches 366 in the fence 280. The other ends of the bars are hooked over a rod 368 (Figs. 4 and 23) secured to the knife-supporting frame 276. The large number of notches in the fence permits adjustment and retention of the positions of the bars in accordance with the width of the web.

Figure 19:
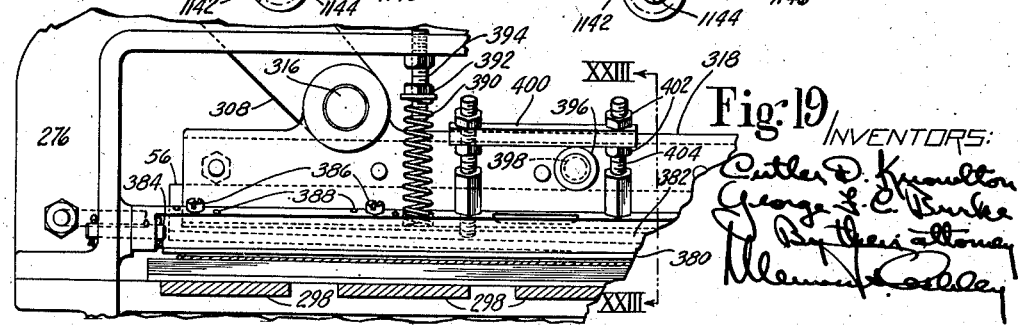
Fig. 19 is an elevation of a portion of the knife of station B, illustrating the means for clamping the web adjacent to the knife during operation of the knife.

Inasmuch as the knife 56 acts progressively across the web to sever the blanks therefrom, a member 380 is associated with the knife to clamp the web against sidewise movement. This clamping member (as shown more clearly in Figs. 19, 22 and 23) is secured to a frame 382 pivoted at 384 to the frame 276. The clamping member is secured to the frame 382 by screws 386, associated with each of which is a pair of leveling screws 388 which facilitate obtaining the desired position of the clamping member on its frame. The screws 386 hold the clamping member against the lower ends of the leveling screws 388. The clamping member is arranged to engage the web and hold it against the top surface of the shear block 328 just prior to the action of the knife 56. A pair of springs 390 (one of which is shown in Fig. 19) acts between the top surface of the frame 382 and nuts 392 to urge the frame and the clamping member against the web. The nuts 392 are adjustably retained on screws 394 threaded into the knife-supporting frame 276. When the knife is in an elevated position the clamping member is held above the web by a roll 396 mounted on a pin 398 supported by the knife carrier 318. This roll acts on a bar 400 held between nuts 402 at the upper ends of screws 404 extending upwardly from the frame 382. When the knife moves downwardly to sever a blank from the end of the web the roll 396 moves away from the bar 400 so that the springs 390 are effective to move the clamping bar 380 to hold the web against the shear block just ahead of the knife.

After the blank has been severed from the web it is transferred to a pair of feed belts 406 and 408 (Fig. 7) by which it is carried through a portion of the machine, as will be described. The blanks are transferred from station B to the belts by a bar 410 which is reciprocated in time relation to the operation of the knife. The transfer bar is mounted on a slide 412 (Fig. 6) movable in ways formed in the upper portion of the support 300. Gibs 414 hold the slide on the support. The transfer bar has a vertical portion 416 (Fig. 8) arranged for engagement with the rear edge of the blank to push the blank forwardly between the belts upon forward movement of the slide 412. This slide is arranged to be reciprocated by a cam 418 (Fig. 6) secured to the shaft 334. Motion is transmitted from the cam to the transfer slide by a lever 420 pivoted at 422 to the plate 336. The lower end of this lever carries a cam roll 424 which rides in a groove in the side of the cam. The upper end of the lever is pivoted at 426 (Fig. 7) to a block 428 secured to the under side of the transfer slide. As shown in Fig. 5 the high points of the grooves in the cams for operating the transfer slide and knife are considerably spaced angularly, thereby to insure that the transfer slide will not move to feed the blank until it has been completely severed from the web.

The transfer bar 410 is adjustably carried by the slide 412 so that the fence may be moved lengthwise of the slide to accommodate webs of different widths. The upper end of the slide is T-shaped (Fig. 6), to fit into correspondingly shaped grooves in the lower portion of the transfer bar so that the bar may be moved along the slide. The upper surface of the slide is provided with teeth 430 (Fig. 7) arranged to be engaged by a locking member 432 (Fig. 8) carried for vertical movement in the bar. Rising vertically from the locking member 432 is a reduced threaded shank portion 434 which passes through a bushing 436 threaded into the transfer bar. A nut 438 on the shank portion is engaged by the bushing when the bushing is elevated by being rotated, thereby to lift the locking member 432 away from the slide. Upon rotating the bushing 436 in the other direction, its lower end will engage the top of the locking member 432 and force it into locking engagement with the slide. The bushing may be locked against rotation by a set screw 440. The transfer bar will normally be adjusted so that it is in engagement with the adjacent edge of the blank prior to movement of the bar to transfer a newly severed blank to the feed belts It will now be seen that in station B the web is fed intermittently by the feed rolls 52 and 54 and between each feeding movement the web is clamped between the feet 250 and the clamping bar 252 located just ahead of the feed rolls in the direction of travel of the web. The web is also clamped by the clamping bar 380 just ahead of the knife in the direction of travel of the web to prevent sidewise movement of the web as a blank is severed therefrom. After the web has been clamped the knife severs a blank therefrom which is then fed forwardly by the transfer bar to be gripped between the feed belts 406 and 408 by which it is fed forwardly through the machine.

The pair of feed belts 406 and 408 transfer the blanks step-by-step through stations C, D, E and F, after which two pairs of feed belts are employed to transfer the blank through the remaining portion of the machine as will be described. At station C the upper feed belt 406 (Fig. 7) passes over pulleys 450, 452 and 454. These pulleys are supported from a U-shaped frame 456, the legs of which are secured, as shown in Fig. 6, by screws 458 to the inner sides of the rails 14. To the top of the frame 456 is secured a bracket 460 (Fig. 7) to which one end of an arm 462 is pivoted at 464. The other end of the arm carries the pulley 454 for vertical adjustment to apply the desired tension to the belt 406. The arm is held in the desired position of adjustment by a slot-and-screw connection 466. The pulley 450 is journaled in bearings in a bracket 472 carried by the under side of the top of the frame 456. Pivoted to this bracket is an arm 474 carrying the pulley 452. A compression spring 476 acts between a boss in the arm 474 above the pulley 452 and the bracket 472 to force the arm and the pulley 452 downwardly so that the belt 406 is pressed toward the belt 408 at the point where the blanks are first gripped between the belts.

The belt 408 passes over a pulley 478 journaled in bearings in the frame 276, this pulley lying directly below the downwardly pressed pulley 452. The belt 408 also passes over a pulley 480 mounted on one end of an arm 482, the other end of which is pivoted at 484 to a bracket 486 secured to the under side of one of the crossbars 104. This arm is arranged to be locked in the desired position of adjustment, with the pulley 480 applying the proper tension to the belt 408, by a nut and bolt 488, the bolt passing through a slot 490 in the bracket 486. Another pulley 492 for the belt 408 is journaled in a bracket 494 which is secured to the intermediate portion of a stationary rack 496 extending transversely of the machine. This rack is secured to ears 498 (Fig. 6) extending inwardly from the legs of the U-shaped frame 456 immediately above the points of attachment of the frame to the rails 14.

The opposite ends of the belts 406 and 408 pass over drive pulleys 500 and 502 (Fig. 39) keyed to the central portions of drive shafts 504 and 506. These drive shafts are journaled in bearing blocks 508 and 510 mounted in frames 512 secured to the rails 14 between the stations F and G (Fig. 1). The bearing blocks 508 are mounted for vertical movement within the frames 512. Springs 509 (Fig. 39a) act between caps 511, secured to the tops of the frames, and the tops of the bearing blocks to urge the shaft 504 carrying the drive pulley 500 toward the shaft 506. These springs permit separation of the belts as a blank passes between them. The movement of the shaft 504 and pulley 500 toward the shaft 506 and pulley 502 is limited by nuts 513 threaded on the upper ends of rods 515 guided in the caps 511, the lower ends of the rods being threaded into the bearing blocks 508. The adjacent runs of the belts must be maintained pressed toward each other to insure a firm gripping of the blanks by the belts. A plurality of rolls 514 (Figs. 7 and 12) support the upper run of the lower belt 408. These rolls are journaled between a pair of plates 516 which are secured at one end to the bracket 494 supporting the pulley 492 (Fig. 7). Other means, not shown, are provided for supporting the plates at various points along their lengths. Spaced plates 530 located above the lower run of the upper belt 406 and extending parallel to the plates 516 support a plurality of rolls 532, one of which is illustrated in Fig. 7. These rolls are urged downwardly to press the upper belt against the lower belt, being journaled in the lower ends of arms 534 pivoted at 536 between the plates 530. Springs 538 act between the arms and blocks 540 supported between the plates to urge the arms and the rolls downwardly. The forward ends of the plates 530 are supported from the central portion of a stationary rack 542 which is in turn secured to ears 544 (Fig. 6) extending outwardly from the frame 456. The other ends of the plates 530 are supported by a bracket 546 (Fig. 35) which depends from the central portion of a rack 548. This rack is supported crosswise of the machine by brackets 550 secured to the upper ends of posts 552 rising from the rails 14 between stations D and E (Fig. 1).

For transferring the blanks through stations G and H, two sets of upper and lower belts 560 and 562 (Fig. 39) are employed for a reason which will appear later. The upper belts are driven from pulleys 564 splined on the drive shaft 504 and arranged to be moved toward or away from each other to vary the distance between the belts. The pulleys 564 are embraced by depending arms 566 of slides 568 supported for movement along a crossbar 570 secured to the caps 511 of the frames 512. A screw 574 having oppositely threaded portions at its ends is threaded through the slides 568 and has an end portion extending outwardly through one of the caps 511. This end of the screw is provided with a fitting 576 to receive a crank, whereby the screw may be rotated thereby to move the slides and the drive pulleys 564 carried thereby toward or away from each other. The lower belts 562 are driven from pulleys 580 splined to the shaft 506 and embraced by upwardly extending arms of slides 582 arranged for simultaneous movement toward and away from each other by a screw 584 passing through the lower end of one of the frames 512. Accordingly, both sets of drive pulleys for the feed belts 560 and 562 are readily adjustable to move the belts transversely of the machine.

The upper feed belts pass under guide pulleys 586 carried by the slides 568 and then upwardly over guide pulleys 588 journaled in bearings in the upper ends of arms 590 extending vertically from the slides 568. At the exit end of the machine the upper feed belts pass around guide pulleys 592 (Fig. 28) carried by arms 594 depending from plates 596 pivoted at 598 to brackets 600 which are mounted for adjustment lengthwise of the machine in slides 602. These slides are in turn mounted for movement crosswise of the machine upon crossbars 604 (Fig. 39) attached to the upper ends of posts 606 secured to the rails 14. The lower portions of the slides 602 are provided with T-slots 607 (Fig. 39) in which are guided flanges extending laterally from the brackets 600. The brackets have portions 608 (Fig. 28) extending upwardly rearwardly of the slides 602. Screws 610 threaded through the brackets engage the rearward surfaces of the slides and provide for movement of the brackets lengthwise of the machine so that the pulleys 592 may be adjusted to vary the tension of the upper belts. Springs 612 between the plates 596 and the brackets 600 urge the plates and the pulleys 592 downwardly to maintain the upper and lower feed belts in contact at the exit end of the machine. The slides 602 carry vertically extending plates 614 upon which are journaled guide pulleys 616 and 618 corresponding to the pulleys 586 and 588 (Fig. 39). The upper reach of each belt may be enclosed by a guide 620 supported by bars 621 on the arms 590 and the plates 614.

The lower belts 562 at the exit end of the machine pass over pulleys 622 journaled between arms 624 extending vertically from brackets 626 mounted for adjustment lengthwise of the machine in slides 628. Screws 630 are provided for adjusting the tension of the lower belts by varying the positions of the brackets 626 within the slides. The slides 628 are mounted for movement transversely of the machine on crossbars 631 supported in the lower ends of the posts 606. Adjustments of the slides 602 and 628, carrying the upper and lower pulleys at the exit end of the machine, are effected by screws 632 and 634 threaded through ears 636 and 638 on the slides 602 and 628 respectively. The screws are rotatable in bearings 642 and are held against axial movement by collars 640 and 641 secured to them and engaging opposite sides of the bearings. The collars 641 are arranged to receive a crank by which the screws may be turned.

Apparatus between stations G and H for maintaining the adjacent runs of the belts 560 and 562 together is illustrated in Figs. 41 and 42. This apparatus is supported by a pair of posts 646 secured to the rails 14 and connected by a crossbar 648. The posts 646 are recessed at their upper ends and to the bottoms of the recesses are secured the ends of a supporting bar 650. Clamped to the under side of the supporting bar are a pair of roll-supporting frames 652 (only one being shown), there being one for each of the pairs of belts. The frames 652 are held against the under side of the bar 650 by retaining strips 654 supported on the upper surface of the bar 650 and secured to the adjacent portions of the frames 652. The frames carry a plurality of rolls 656 engageable wtih the under surfaces of the lower belts at spaced points along the belts. To the under side of the crossbars 648 is secured a supporting bar 658 for holding a pair of frames 660 on the outer ends of which are journaled rolls 662 which cooperate with the outermost rolls 656 to press the belt 560 against the belt 562 at these points. Retaining strips 664 are secured to the frames 660 and underlie the supporting bar 658 to prevent the frames from jumping off the bar. The weights of the frames are sufficient to cause the rolls 662 to hold the belts together between these rolls and the cooperating rolls 656. Rolls 666 which cooperate with the inner rolls 656 are mounted separately from the rolls 662 on a frame 668 which is received within central openings in the frames 660. The frames 668 are sufficiently heavy to maintain the belts in close contact between the rolls 666 and the rolls 656. It will be noted in Figs. 1 and 3b that the frames by which these rolls are carried extend throughout a substantial length of the adjacent runs of the belts and maintain sufficient pressure between the belts throughout such lengths. The mountings of the roll-supporting frames on the bars 650 and 658 enable adjustments of the positions of the rolls transversely of the machine in accordance with the positions of the belts.

Figure 40:
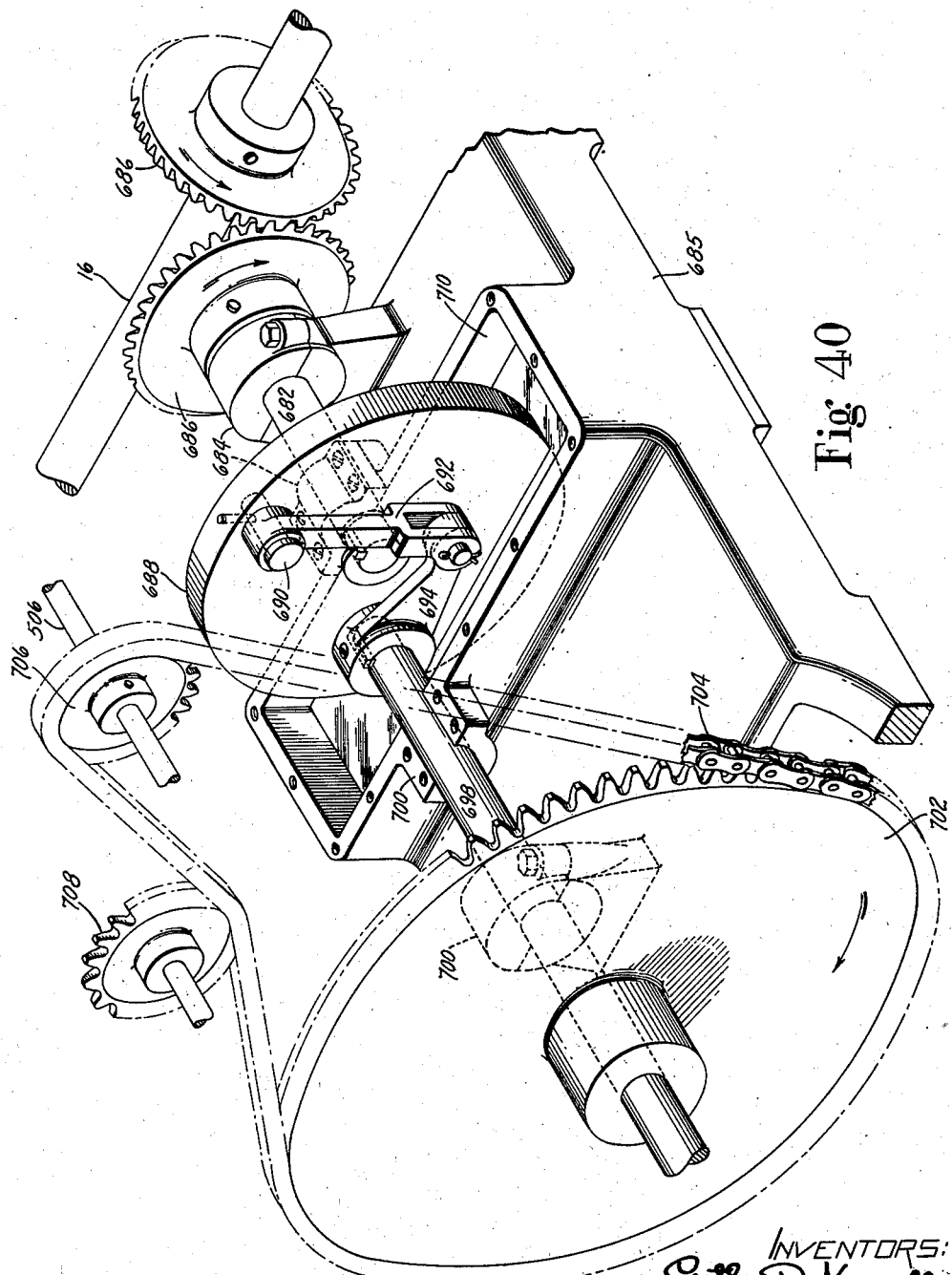
Fig. 40 is a perspective view of the mechanism for driving the belts at varying speeds.

The drive shafts 504 and 506 are connected (Fig. 39) by gears 680 and the shaft 506 is driven at variable speeds to cause the feed belts to operate at varying speeds. The belts move the blanks rapidly between the stations and then slow down to permit the blanks to come to rest easily against the stops which arrest the motion of the blanks at the operating stations. After the blanks have come to rest against the stops, the belts move very slowly and slip over the blanks while holding them against the stops without undue pressure for a sufficient length of time to permit the blanks to be operated upon. The stops are then moved out of the way, as will be explained, after which the speed of the belts is increased to carry the blanks rapidly forward to the next station. The mechanism for operating the drive shaft 506 and the belts at variable speeds is illustrated in Figs. 1 and 40. A crank shaft 682, journaled in bearings 684 on a support 685, is driven at a constant speed through bevel gearing 686 from the drive shaft 16. The crank shaft 682 carries a crank disk 688 upon which is a crank pin 690. This pin is connected by a link 692 to an arm 694 keyed to a shaft 698 supported in bearings 700. A sprocket wheel 702 is carried by the outer end of the shaft 698 and is connected by a sprocket chain 704 to a sprocket wheel 706 secured to the belt-driving shaft 506. The chain passes under an idler sprocket 708. As the crank shaft 682 is rotated at a constant speed it causes rotation of the shaft 698 at a variable speed so that the feed belts move in the manner described above. The crank disk 688 moves through a bath of oil in an oil chamber 710 formed in the central portion of the support 685 to maintain the crank pin and associated parts lubricated.

Forward motion of the blanks through stations C, D, E and F is temporarily arrested by stops 712 (Figs. 3a, 3b, 6, 12, 20, 24 and 35). These stops are carried by shafts 714 arranged to be oscillated through approximately 90° to carry the stops from horizontal positions in which they are out of the path of travel of the blanks to vertical positions, indicated by dotted lines in Fig. 6, in which they are in the path of travel of the blanks to be engaged by their forward edges. The shafts 714 carrying the stops are journaled in the lower ends of arms 716 depending from slides 718. Between stations B and C (Figs. 3a and 6) these slides are mounted for movement transversely of the machine on the rack 542. Between stations C and D (Figs. 3a and 12) similar slides are mounted on a rack 720 supported at the upper ends of posts 722 carried by the rails 14. Between stations D and E the slides are carried by the rack 548 (Figs. 3a and 35). Racks 728 and 729 (Fig. 3b) are provided between stations E and F and between stations F and G for supporting similar slides 718. All the slides on each side of the machine are interconnected for equal and simultaneous movements transversely of the machine by shafts 730 journaled in bearings 732 at the upper portions of the slides. These shafts carry gears 734 arranged for engagement with the teeth in the racks. For adjusting the positions of the slides 718 a right-and-left screw 736 (Fig. 35) is threaded through bushings carried by bosses 737 integral with the slides 718 between stations D and E. These bushings are similar to the bushings 286 (Fig. 6) and permit individual adjustment of the slides at opposite sides of the machine. The outer end of the screw 736 is journaled in a bearing 739 in the bracket 550 and collars 738 and 740 fixed to the screw engage opposite sides of the bearing to prevent axial movement of the screw. The collar 740 is arranged to receive a crank to facilitate turning the screw and movement of the associated slides toward or away from each other. This movement is transmitted through the shafts 730 to all the slides 718. Equal movements of the shafts and therefore of all the slides is insured by the cooperative action of the gears 734 and the associated racks. Accordingly, upon rotation of the screw 736, all the stops will be moved transversely of the machine, the stops at opposite sides being adjusted toward or away from each other by equal amounts. This adjustment permits engagement of the stops by the blanks near their end edges, regardless of their length. The proximity of the stops to the end edges of the blanks is, however, limited by the tools for operating on the blanks, as will become apparent as the description proceeds.

Figures 11, 12:
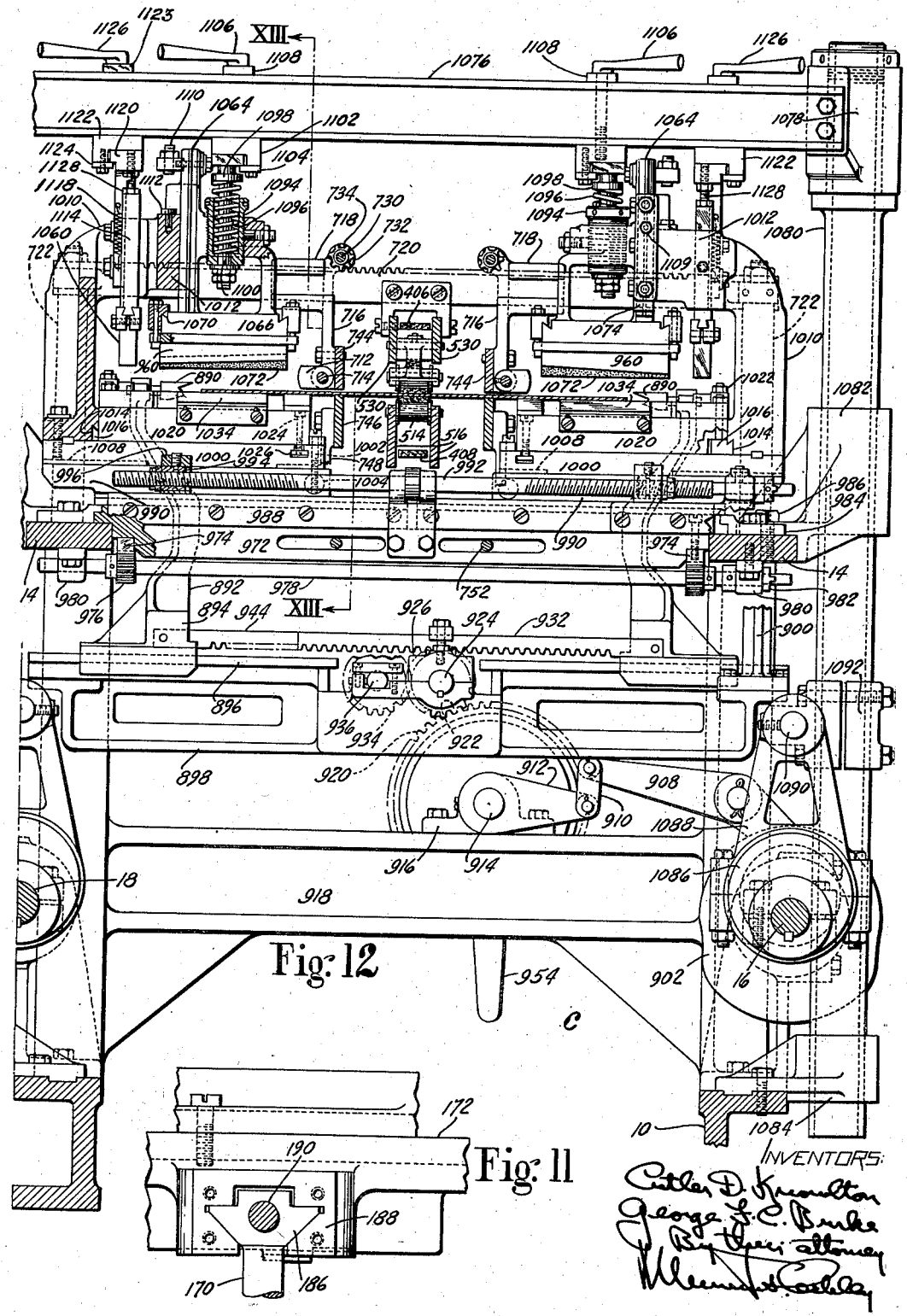
Fig. 11 is a section on the line XI—XI of Fig. 9.
Fig. 12 is an end elevation partly in section of station C in which the slots between the end-wings and corner-laps are formed and in which the outer edges of the corner-laps are trimmed.

The blanks are restrained against undue curling as they are fed through the machine by two sets of upper and lower guide bars 744 and 746 extending lengthwise of the machine and arranged to form channels between them within which the outer portions of the blanks lie. The upper guide bars are carried by the arms 716 of the slides 718 as indicated in Figs. 12 and 35 and accordingly are adjusted transversely of the machine with the stops 712. The lower guide bars 746 are secured to slides 748 which are mounted for movement transversely of the machine so that they may be adjusted to underlie the upper guide bars. One pair of these slides is supported by the rack 496 (Fig. 6). Another pair of these slides is carried by a similar rack 750 (Fig. 35) and similar racks are located at the other stations for the same purpose. To insure uniform adjustment of these bars along their entire lengths, the slides on which they are supported carry shafts 752 having fixed thereon pinions 754 which mesh with the teeth in the racks. Adjustment of the lower guide bars 746 is effected by a double screw 756 (Fig. 35) threaded through bushings 758 held by screws 760 in bosses 762 carried by the slides. The outer end of the screw passes through a bracket 764 secured to the under side of the rail 14 and has a fitting 766 to receive a crank.

The pair of shafts 714 carrying the stops 712 are oscillated by a pair of similar mechanisms, one of which is clearly illustrated in Fig. 35. Power is taken from the shafts 16 and 18 by a pair of cams, one of which is indicated at 770. Travelling in a groove in the cam is a cam follower 772 mounted at one end of a bell-crank lever 774 pivoted to the adjacent post 12. The other end of the lever is connected by a rod 776 and a spring 778 to one end of a bell-crank lever 780 pivoted to a bracket 784 secured to the post 552. Within the other end of the bell-crank lever is rotatable a pin 785 carrying a pair of washers 786. A rod 788 is adjustably clamped between the washers 786 by a nut 789. The other end of the rod carries a rack 790 having teeth which mesh with an elongated gear 792 upon the shaft 714 carrying the stops. The inner end of the rack passes through a slot 794 in the adjacent guide bar 744 so that the guide bar does not interfere with the reciprocation of the rack to oscillate the stops between their extreme positions. A rack guide 796 is secured to the bar 744 and maintains the rack in proper engagement with the gear 792. A similar driving mechanism is employed for oscillating the stops on the other side of the machine. When the stops are to be adjusted transversely of the machine, the nut 789 which clamps the rod 788 to the bell-crank lever 780 is loosened to allow the rod to slide with the stops relatively to the lever. After the proper adjustment has been made the nut 789 is tightened and in this manner the same relationship is maintained between the racks and the drive shafts to effect the same movement of the stops regardless of their positions of adjustment.

For operating on blanks of different widths provision is made for adjusting the stops lengthwise of the machine so that the motion of the blanks may be arrested at any desired position relatively to the operating stations. For this purpose the shafts 714 on which the stops 712 are mounted are carried by the bearings in the slides 718 for lengthwise adjustment. The shafts are normally locked against lengthwise movement by connections to the shafts 730 which are journaled in the upper portion of the slides. These connections consist of sleeves 800 which are secured by clamps 802 to the shafts 730. Arms 804 depend from the sleeves 800 and terminate in portions 806 which surround the shafts 714. The portions 806 are confined between the gears 792 and collars 808 fast to the shafts 714. A rod 810 extends loosely through the arms 804 and has an intermediate threaded portion carrying one end of a rack 812 which is adjustably secured lengthwise of the rod by lock nuts 814. The other end of this rack passes through the bracket 546. Carried by this bracket is a vertical shaft 816 to the lower end of which is secured a pinion 818 which engages the teeth of the rack 812. The upper end of the shaft 816 is provided with a handle 820 by which the shaft and the pinion may be rotated to move the rack, the bar 810 and the arms 804 lengthwise of the machine after the clamps 802 have been loosened. This movement of the arms 804 causes a like movement of the shafts 714 carrying the stops so that all the stops 712 on both sides of the machine are adjusted lengthwise of the machine in unison by turning the handle 820. This adjustment is permitted without affecting the drive of the shafts 714 by reason of the elongated gears 792 carried thereby which may slide relatively to the racks 790.

As stated previously, the stops 712 extend only to the exit end of station F. Another type of stop is employed between stations G and H and at the exit end of the machine inasmuch as the shafts 714 carrying the stops 712 would interfere with the operation of the long creasers employed at station G which extend transversely of the machine. At this end of the machine stops 822 are employed (Fig. 37), oscillatable about horizontal axes extending transversely of the machine. These stops are mounted at the lower ends of levers 824 pivoted to rods 826. The rods are mounted in slides 830 carried by racks 832 secured to posts 833, extending upwardly from the rails 14. The shafts 730 pass through bosses 835 in the upper portions of the slides 830. Gears 834 carried by the shafts engage the teeth of the racks 832 so that these slides and the stops 822 are adjusted transversely of the machine simultaneously with the stops 712.

The upper ends of the arms 824 are connected by links 836 to rods 838 passing through the slides 830 parallel to the rods 826. The upper surfaces of the rods 838 have rack teeth 840 which engage gears 842 splined to a shaft 844 which is arranged to be oscillated to reciprocate the rods and move the stops into and out of the path of movement of the blanks. The rods 826 on which the stops are pivoted are arranged for lengthwise adjustment within the slides 830 so that the stops may be adjusted lengthwise of the machine. A clamp 846 which may be in the form of a draw bolt is associated with each of the slides to lock the supporting rod 826 in its desired position of adjustment. After the clamp 846 has been loosened the adjustment is effected by rotating the shaft 844 relatively to its driving means. So that the rods 838 and 826 may be adjusted together as a unit, the rear end of each rod 838 carries an arm 848 which surrounds a threaded reduced portion of the rod 826. The arm 848 is held between a spring 850 and lock nuts 852 on the outer end of the rod 826. When the rod 838 is being adjusted, the spring 850 maintains the arm 848 against the nuts 852, and the rod 826, which is free to move in the slide 830, will move with the rod 838 as a unit, thereby maintaining the proper relationship between the rods.

Each of the sets of stops at stations G and H are individually driven. For this purpose a cam 854 is provided for driving each set of stops, the cams being mounted on the drive shaft 16. Each of these cams has a cam groove in which rides a cam follower 856 mounted on one arm of a bell-crank lever 858 pivoted at 860 to the adjacent post 12. The other arm of the bell-crank lever is pivoted to a block 862 adjustably secured to a link 864 which is in turn pivoted to the lower end of a rack 866. This rack is vertically movable between a pair of plates 868 and is in engagement with a pinion 870 mounted on the shaft 844. During the operation of the machine the pinion is clamped to the shaft 844 between a collar 872 (Fig. 38) fast to the shaft and a sleeve 874 which is splined to the shaft. A nut 876, threaded upon the end of the shaft, acts against the outer end of the sleeve to urge it toward the pinion 870, thus clamping the pinion between the sleeve and the collar 872. When it is desired to rotate the shaft 844 relatively to the pinion 870 in order to adjust the stops lengthwise of the machine, the nut 876 is backed off slightly, thus releasing the pressure between the sleeve and the pinion and freeing the pinion from the shaft. A handle 878 is slidably mounted on the outer end of the sleeve 874 and has a hub provided with a recess 880 which may be moved into engagement with a corresponding projection 882 on the sleeve. Rotation of the sleeve is effected by the handle upon loosening the nut and moving the handle inwardly against the force of a spring 884, to lock the handle to the sleeve. Inasmuch as the sleeve is splined to the shaft 844, the shaft may be rotated relatively to the pinion 870, which is loose on the shaft at this time, thereby to effect the necessary adjustment of the stops 822 lengthwise of the machine.

It will now be seen that the stops 822 may be adjusted both transversely and longitudinally of the machine and that the transverse adjustment is effected simultaneously with the transverse adjustment of the stops 712 by rotation of the screw 736 (Figs. 3a and 35).

Associated with each of stations C, D, E and F is a pair of joggers 890 having ends provided with U-notches for engaging the opposite edges of the blanks (Figs. 12, 20, 24 and 32). These joggers are arranged to engage opposite edges of the blanks as they come to a stop to position the blanks centrally of the stations. Inasmuch as two pairs of feed belts are provided at stations G and H, there is little opportunity for the blanks to become misplaced during their travel and the joggers accordingly may be dispensed with at these stations. The joggers are adjustably mounted in the upper ends of arms 892, the lower ends of which are secured to slides 894. These slides are movable transversely of the machine on slideways 896 formed along the upper sides of crossbars 898 suspended by hangers 900 from the rails 14.

Figures 32, 33, 34:
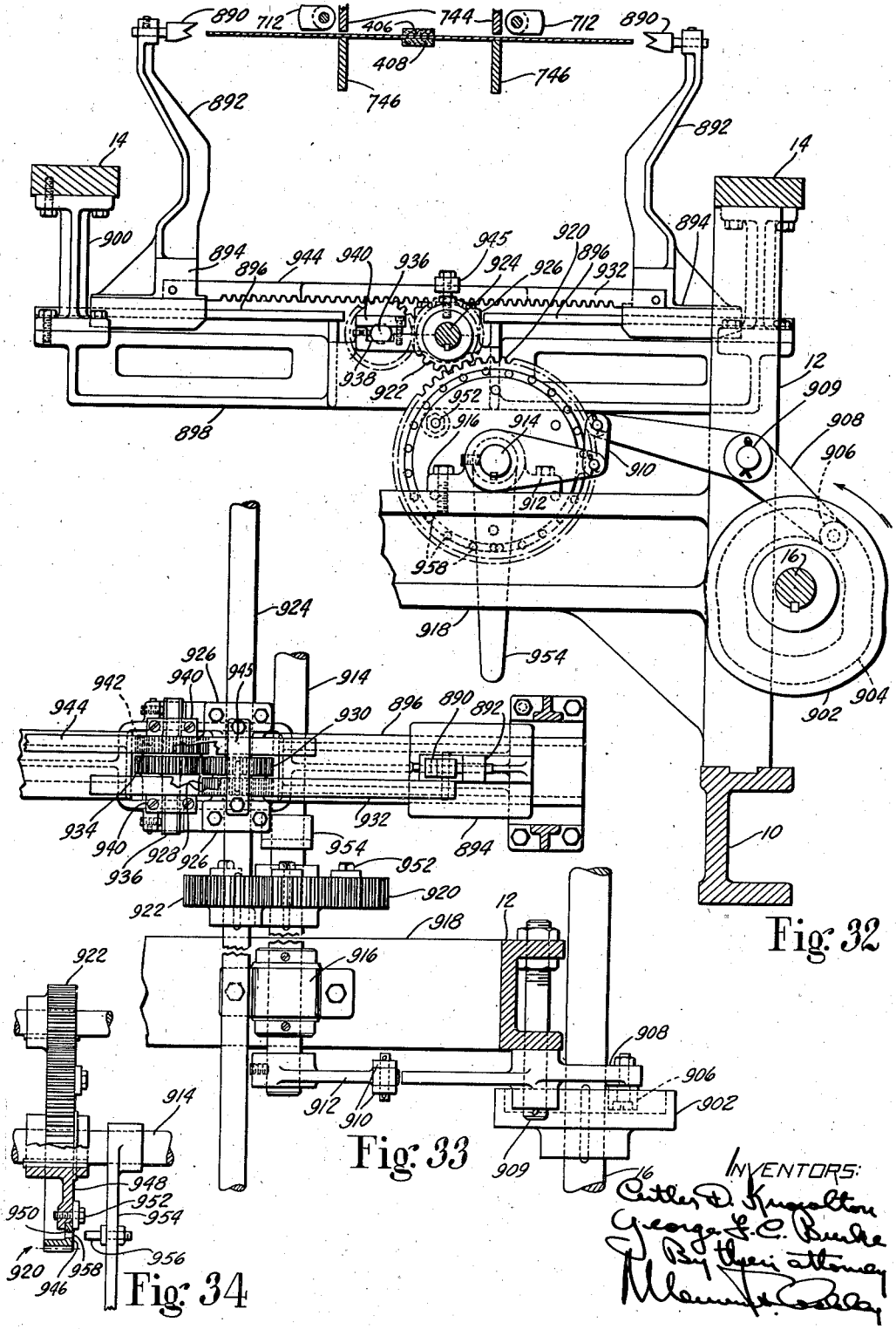
Fig. 32 is a vertical section showing a pair of joggers and the mechanism for driving them.
Fig. 33 is a plan view, partly in section, of the jogger-driving mechanism.
Fig. 34 is an elevation partly in section of the two-part gear by which the joggers are operated.

Power for reciprocating the joggers is derived from the shaft 16. This shaft carries a cam 902 (Figs. 1 and 32) in the side of which is formed a cam groove 904. A cam roll 906 mounted at one end of a lever 908 rides in the cam groove. The lever 908 is pivoted at 909 on the adjacent post 12 and is connected at its other end by a link 910 to an arm 912 fast on a shaft 914 (Figs. 32 and 33). The shaft 914 is mounted in bearings 916 carried by crossbars 918 extending between the posts 12 at the entrance and exit sides of station D. Keyed to the shaft 914 is a gear 920 which meshes with a gear 922 keyed to a shaft 924 extending from stations C to F (Fig. 1). This shaft is journaled in bearings 926 carried by the central portions of the crossbars 898 between the adjacent ends of the slideways 896 as shown in Fig. 33. Between each pair of bearings 926 and keyed to the shaft 924 is a pair of gears 928, 930 mounted on a common hub confined between the bearings. The gear 928 engages teeth on a rack 932 secured to one of the slides 894 (Fig. 32). The gear 930 is in mesh with a gear 934 journaled on a stationary shaft 936. This shaft is held in recesses 938 on the crossbar 898 by plates 940 secured to the crossbar. A gear 942 integral with the gear 934 engages teeth on the lower side of a rack 944 secured to the slide 894 on the opposite side of the machine. The racks are maintained in engagement with their driving gears by bars 945 secured to the tops of the pairs of bearings 926.

As the drive shaft 16 rotates it acts through the cam 902 to oscillate the shaft 914. The shaft 924 is therefore oscillated through the gears 920 and 922 so that all the joggers on one side of the machine are reciprocated in unison through the sets of gears 928 and the racks 932. Simultaneously with the reciprocation of the joggers on one side of the machine, the joggers on the opposite side of the machine are reciprocated oppositely thereto through the sets of gears 930, 934, 942 and racks 944. Accordingly, equal and opposite movements are imparted to the joggers to engage the outer edges of the blanks immediately after the motion of the blanks has been arrested by the stops 712 and then to move away from the blanks.

In order to accommodate blanks of different lengths provision is made for adjusting the paths of movement of the joggers so that they will approach each other to a greater or lesser extent as required. This is done by rotating the gear 920 relatively to the shaft 914 to vary the positions of the joggers with relation to the cam 902. To enable this adjustment of the gear 920, it is made of two parts, as indicated in Fig. 34. The teeth of the gear are formed on a ring 946 which is secured to a hub 948 for angular adjustment. The ring 946 includes a flange 950 arranged to be held tightly against an adjacent portion of the hub by screws and washers 952. By loosening the screws and washers it is possible to rotate the ring 946 relatively to the hub 948, which will cause movement of the joggers, and after the proper adjustment has been made, the screws are tightened to secure the ring 946 to the hub 948. To facilitate rotation of the ring, an arm 954 is suspended from the shaft 914 for rotation relatively thereto and for sliding movement thereon. Projecting laterally from the arm 954 is a pin 956 arranged to engage any one of a plurality of holes 958 in the flange 950 of the ring. Upon sliding the arm 954 to the left (Fig. 34) the pin 956 engages one of the holes 958, whereupon rotation of the arm relatively to the shaft 914 will move the ring 946 carrying the gear teeth relatively to the hub 948 providing the screws 952 have been loosened. After the proper adjustment has been made the screws 952 are tightened and the arm 954 moved to the right to disengage the pin 956 from the holes in the gear.

After a blank has been transferred from station B to station C its forward motion is arrested by the stops 712 and the blank is centered by the joggers 890. The slots e (Figs. 2 and 16) are formed in the blank to separate the end-wings and the corner-laps and the corner-laps are cut away at h by mechanisms illustrated in Figs. 12 to 15 inclusive. For this purpose, four sets of cutters are provided, one for operating at each corner of the blank. Fig. 15 illustrates the knives by which the slots and recesses are formed at the lower left-hand corner of the blank, shown in Fig. 2. The recess h in a blank a is formed by a knife 960 (Figs. 13 and 15) movable downwardly past a cooperating shear block 962 to the position illustrated. A second knife 964 moves downwardly with the knife 960 and cooperates with a shear block 966 to cut the blank along the line s (Fig. 16). The portion of the end-wing adjacent to this cut is turned down at t around the edge of a knife 968 by the curved rear portion 970 of the knife 964. The knife 968 is spaced sufficiently from the knife 964 at this time so that there is no cutting action between these knives. After the knife 964 has moved downwardly to the position illustrated, the knife 968 moves in a substantially horizontal plane to trim off the downwardly projecting portion of the blank in the plane of the inner face of the blank, thus giving the appearance shown in Fig. 16. It will be noted that the cover paper d provides the end-wing f with a finished edge along the slot e. Thus when the box is assembled this finished edge t will appear as indicated in Fig. 17 so that the edge of the layer of shell material is not visible in the completed box.

The mechanisms for operating on the blank at this station are mounted on a pair of carriages 972 (Figs. 12 and 13) mounted on the rails 14 for adjustment lengthwise of the machine. For effecting this adjustment, racks 974 are secured to the underside of each carriage near the ends. These racks are engageable with gears 976 mounted on shafts 978 which are supported by bearings 980 secured to the undersides of the rails 14. Each of the shafts 978 has on its outer end a member 982 (Fig. 12) arranged to receive a crank whereby each shaft may be individually rotated to adjust its associated carriage lengthwise of the machine. The carriages are locked in their adjusted positions by gibs 984 secured to the rails by screws 986.

Figure 13:
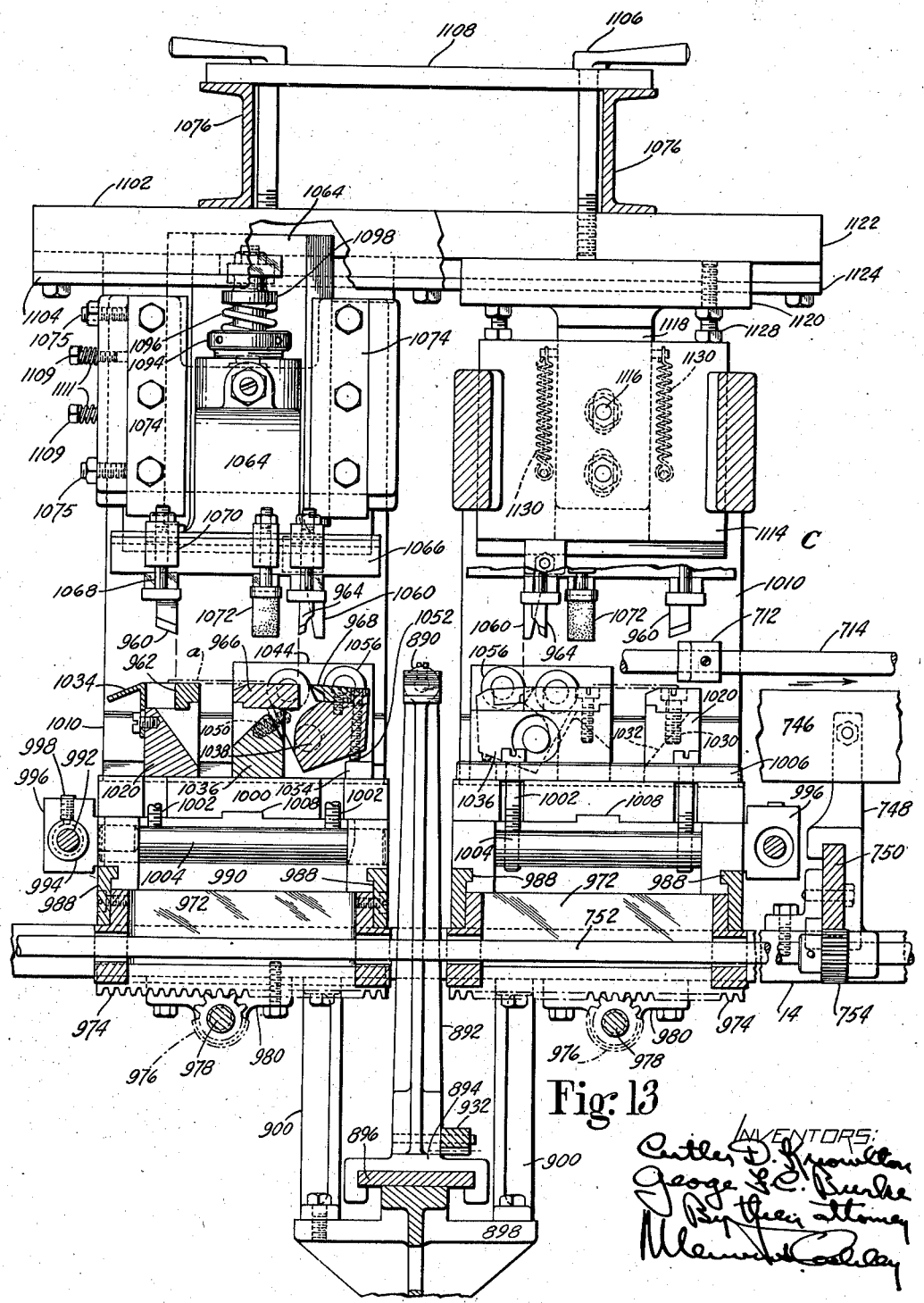
Fig. 13 is a sectional view on the line XIII—XIII of Fig. 12, on a larger scale than Fig. 12.

Each of the carriages carries a pair of gibs 988 (Fig. 13) forming between them a slideway for a pair of slides 990 movable lengthwise of the carriages or transversely of the machine. The slides on each carriage are mounted for simultaneous adjustment toward and away from each other by a screw 992 having right and left hand threaded portions passing through bushings 994 mounted in blocks 996 (Fig. 13) secured to a side of each slide. These bushings provide individual adjustment of the slides relatively to each other and are locked in the desired position of adjustment by set screws 998 engaging grooves in the bushings. Carried by each of the slides 990 is a bed 1000 upon each of which a pair of shear blocks 962 and 966 is mounted. The inner portion of each bed is secured to the slide by a pair of screws 1002 (Figs. 12 and 13) threaded into a rod 1004. These rods are journaled in spaced arms projecting from the inner portions of each slide, as shown more clearly in Fig. 13. Each pair of screws 1002 passes through a bar 1006 which engages the upper rearward surface of a bed 1000. The screws pass through recesses in the end of the bed as shown in Fig. 13 so that upon unloosening the screws slightly the bar 1006 and rod 1004 may be swung as a unit to free the rearward portion of the bed. Tongue and grooved portions 1008 between the slide and bed facilitate the proper positioning of the bed on its slide. Other securing means may be provided between the outer portions of the slides and beds, more firmly to secure them together.

Secured to the outer portions of the beds 1000 and extending upwardly therefrom are supporting frames 1010 having overhanging arm portions 1012 for supporting the knives 960 and 964. The lower portions of the supporting frames have dovetail grooves 1014 with which cooperate the wedge heads 1016 of bolts 1018 (Fig. 14) which pass through blocks 1020 for rigidly securing the blocks to the frames 1010. Nuts 1022 act on the upper surfaces of the shear blocks 962 which are supported on the blocks 1020 to secure the blocks in place. The blocks may be adjusted along the beds by reason of the dovetail connection provided by the grooves 1014 and the heads 1016 of the bolts and by reason also of the fact that the other ends of the blocks 1020 are slidably secured to the bed by bolts 1024 passing through the blocks 1020 and nuts 1026 received by a T-slot in the bed (Fig. 12). Heads 1030 of the bolts 1024 (Fig. 14) hold the shear block 962 against the upper surface of the supporting block 1020. The supporting block has a sloping surface 1032 for directing the scrap from the blanks. A conveyer belt (not shown) may be provided at the bottom of the machine for carrying material trimmed from the blanks away from the machine. On the front of the supporting blocks 1020 toward the entrance end of the machine are adjustably secured guide plates 1034 arranged for engagement by the forward edges of the blanks to insure that the blanks will ride smoothly over the blocks.

The shear blocks 966 are carried by supporting frames 1036 which are mounted on the beds 1000 for adjustment relatively to the shear blocks 962 to vary the distance between the slots e and the cut-away portions h on the blank. The frames 1036 are adjustably secured to the beds 1000 by bolts 1035 and 1037 similar to the bolts 1018 and 1024. The knives 968 are supported in the frames 1036 by rockable members 1038 having stub shafts 1040 journaled in bearings 1042 mounted in arms 1044 of the supporting frame 1036. The knives 968 are normally maintained in their retracted positions, shown in Fig. 15, by springs 1046 acting between arms 1048 on the rockable members 1038 and recesses 1050 in the frames 1036. The positions to which the members 1038 are moved by the springs are limited by set screws 1052 acting against stops 1054 secured to the under sides of one of the arms 1044 of the frames 1036. Rolls 1056 are journaled on pins 1058 in the arms 1044 and are engaged by the back sides of wedges 1060 as these move downwardly and support the wedges against lateral thrust. These wedges act on rolls 1062 carried by the arms 1048 to oscillate the members 1038 carrying the knives 968 to trim the downwardly extending portions of the blank (Fig. 15) after the operation of the knives 960 and 964.

The knives 960 and 964 are carried by vertically movable slides 1064 (Figs. 12 and 13). The knives are mounted for adjustment relatively to one another upon supporting plates 1066 carried by the lower ends of the slides. The opposite sides of the supporting plates are dovetailed, as shown in Fig. 12. Each of the knives, as shown in Fig. 14, has a pair of ears extending from each end thereof between which pass bolts 1068, the heads of which are elongated to underlie the projecting ears on the knives. Each of the bolts extends upwardly through a clamping member 1070 having an inclined surface arranged to engage the dovetailed portion of the plate 1066 whereby the opposite ends of the knives may be clamped in the desired positions on the plates. Similarly supported by the plates 1066 are strippers 1072, the work-engaging portions of which may be formed of sponge rubber arranged to clamp the blank on the top surfaces of the shear blocks 966 upon downward movement of the knives. The strippers normally extend downwardly below the knives and hold the blanks in position during the upward movement of the knives until they have cleared the blanks.

The slides 1064 are mounted for vertical movement between gibs 1074 secured to the supports 1010. One of the gibs is backed up by screws 1075 which permits adjustment of the gib toward the other gib to take up for wear. The slides are connected to vertically movable cross girts 1076 which are connected at their opposite ends to cross heads 1078 (Fig. 12) which are in turn secured to the upper ends of vertically movable rods 1080. These rods pass through bearings 1082 secured to the side rails 14 and through bearings 1084 secured to the supporting bars 10. The rods are reciprocated by the shafts 16 and 18. These shafts carry eccentrics 1086 connected by straps 1088 and pivot pins 1090 to clamps 1092 secured to the rods. The cross girts are connected to the knife-supporting slides by the following mechanism. Threaded through the upper portions of the slides are bushings 1094 providing in their lower ends seats for springs 1096. These springs act against flanges 1098 near the upper ends of rods 1100 to the bottoms of which are secured nuts acting on the bottoms of the bushings to prevent downward movement of the bushings on the rods. The upper ends of the rods are clamped between bars 1102 secured to the under sides of the cross girts and extending therebetween, and gibs 1104 secured to the bars. The bars 1102 are secured to the cross girts for adjustment by clamping screws 1106 passing through bars 1108 resting on the upper surfaces of the cross girts. These clamping screws are loosened to permit the slides 990 supporting the mechanisms for operating on the blanks to be adjusted transversely of the machine. To permit the lengthwise adjustment of the parts afforded by the carriages 972, the gibs 1104 may be loosened so that the upper ends of the rods 1100 may slide relatively to the bars 1102. Auxiliary clamping screws 1109 threaded through the arms 1012 are provided for clamping the slides 1064 against downward movement in the frames 1010 whenever desired. This may be done when the gibs 1104 are loosened to permit this lengthwise adjustment of the parts, to relieve the gib of the weight of the slide. Springs 1111 (Fig. 13) act on the heads of the screws to prevent their accidental turning. When the cross girts are moved downwardly during the operation of the machine, they act through the springs 1096 to move the knives and strippers downwardly to a position limited by engagement of stop screws 1110 with stops 1112 in the upper surfaces of the supporting frames 1010. Upon further downward movement of the cross girts the springs 1096 will compress and the wedges 1060 may continue to move downwardly, as will be described, to complete the slotting operation. The wedges 1060 are clamped to the lower ends of slides 1114 adjustably secured by bolt and slot connections 1116 (Fig. 13) to arms 1118 depending from brackets 1120. These brackets are connected to the cross girts between bars 1122 and gibs 1124. Clamping screws 1126 (Fig. 12) passing through bars 1123 on the upper surfaces of the cross girts adjustably secure the bars 1122 to the under sides of the cross girts. Accurate adjustment of the wedge-carrying slides may be effected by the screws 1128 threaded into the bars 1120 and engaging the tops of the slides 1114. Springs 1130 act between the slides and pins projecting from the arms 1118 to maintain contact of the slides with the adjusting screws when the slides are adjusted.

After the blanks have been stopped at station C the vertical rods 1080 descend carrying the cross girts, thereby moving the knives downwardly to the positions shown in Fig. 15. Upon further downward movement of the cross girts the springs 1096 are compressed while the wedges 1060 continue their downward movement, thus causing the knives 968 to be moved toward the knives 964. The rear surfaces of the knives 964 act as anvils against which the knives 968 trim the downwardly projecting portions of the blanks.

The mechanism for forming the slots e and the cut-away portions h is not claimed herein but forms the subject matter of a divisional application for Letters Patent of the United States, Serial No. 512,856, filed December 4, 1943, in our names, which has matured into Patent No. 2,414,109.

Figure 18:
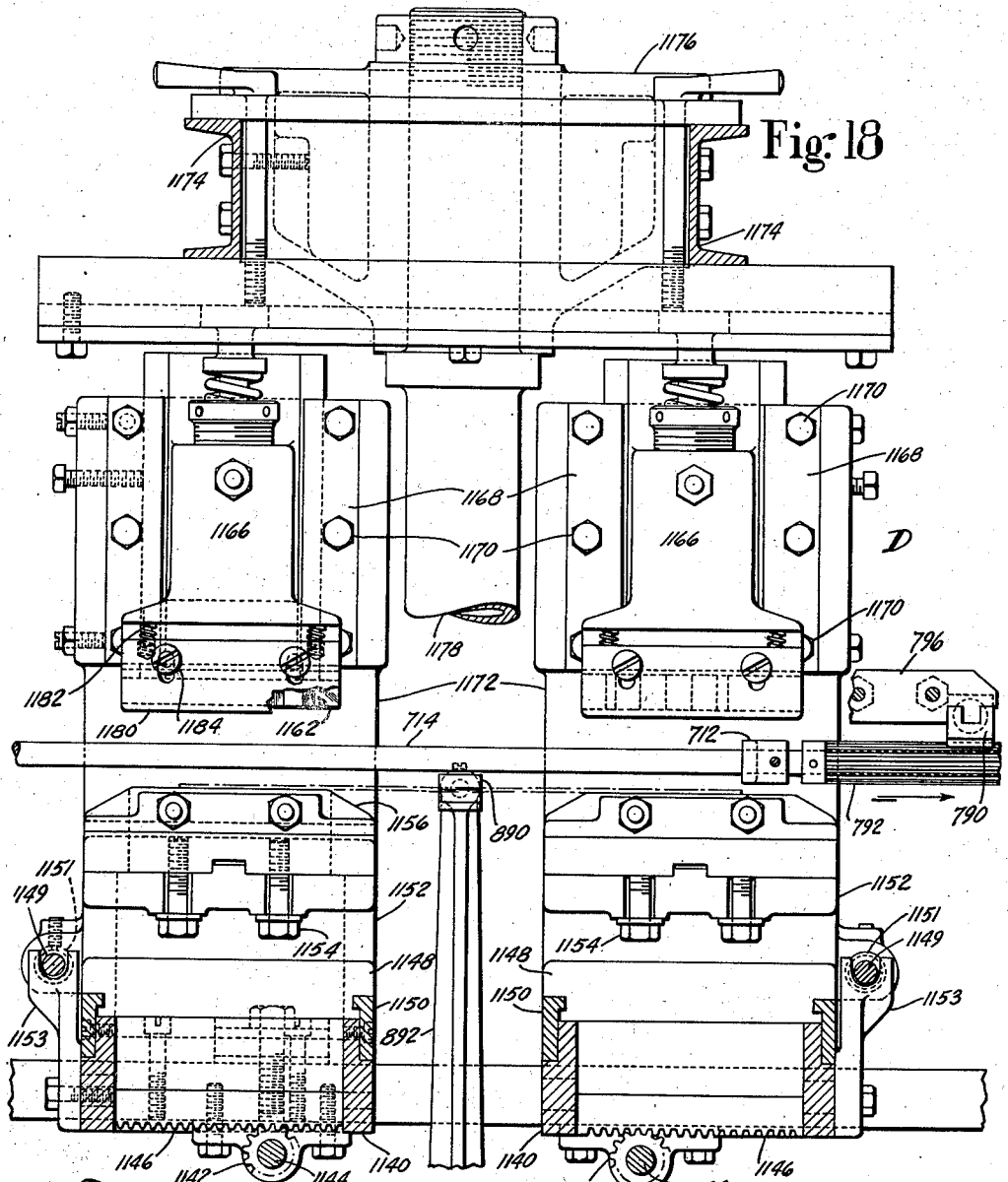
Fig. 18 is a side elevation, partly in section, of station D in which the ends of the corner-laps are toothed.

After the slots e and the cut-away portions h have been thus formed the blank moves to station D, where the ends of the corner-laps are cut to form the saw-tooth portions j. The mechanisms which operate upon the blank at this station are best illustrated in Figs. 18, 20 and 21. The mechanisms are supported by a pair of carriages 1140 similar to those at station C. The carriages are supported for adjustment lengthwise of the machine by the side rails 14. This adjustment is effected by gears 1142 carried by shafts 1144, the gears meshing with racks 1146 upon the carriages. Mounted for movement transversely of the machine are slides 1148. Gibs 1150 secured to the carriages guide the slides for movement lengthwise of the carriages. Screws 1149 threaded through bushings 1151, which are in turn secured by brackets 1153 to the carriages 1140, are provided for adjusting the slides along the carriages. Beds 1152 are secured to the upper surfaces of the slides by screws 1154. Dies 1156 are secured to the beds by screws 1158. These dies have sawtooth portions 1160, as shown in plan in Fig. 21, with which cooperate similarly formed punches 1162 movable vertically relatively to the dies for trimming the end portions of the corner-laps.

The punches 1162 are secured by screws 1164 (Fig. 20) to the under surfaces of vertically movable slides 1166. These slides are mounted in slideways formed by gibs 1168 which are secured by screws 1170 (Figs. 18 and 21) to the upper ends of arms 1172 extending vertically from the beds 1152. The slides 1166 by which the punches are carried are connected to vertically movable cross girts 1174 connected to cross heads 1176 which are in turn secured to vertically movable rods 1178. These rods are reciprocated by the drive shafts 16 and 18 in the same manner as the rods at station C. The connections between the slides and the cross girts are also similar to those at station C, and a detailed description of these is therefore unnecessary.

While sponge rubber strippers similar to those at station C might be employed, metal strippers 1180 are associated with the slides 1166 for holding the blanks against the tops of the dies 1156. These strippers are urged downwardly by springs 1182 acting between the tops of the strippers and the slides. The strippers are held to the slides by screws 1184 passing through slots in the strippers and threaded into the slides.

As the rods 1178 descend after the blank has come to a rest at station D it is first engaged by the strippers 1180, after which the springs 1182 compress and the punches 1162 continue to descend with the slides to trim the ends of the corner-laps and form the serrated portions j. The mounting of the carriages 1140 permits adjustment of the relative positions of the sets of punches and dies in accordance with the widths of the blanks being formed and the adjustment afforded by the slides 1152 lengthwise of the carriages and transversely of the machine provides adjustment for the length of the blanks.

The blanks now pass to station E where the creases k (Fig. 2) are formed to define the end-wing extensions. These creases are formed by mechanisms, shown in Figs. 24, 25 and 26, which comprise two sets of creasers, one at each side of the machine. Each set of creasers includes a pair of outer creaser blades 1190 and 1192 and an inner creaser blade 1194. In forming the creases the inner creaser blades move downwardly from the positions of Fig. 24 to the positions of Fig. 25 to force the blank downwardly between the outer blades. The creaser blades 1190 are then moved toward the creaser blades 1192 to pinch the creases which have been formed. The creaser blades 1194 are also movable toward the creaser blades 1192 at this time so that the creases are effectively pinched on both sides to give a permanent set to the material along the edges of the creases. Inasmuch as creases are formed simultaneously at opposite ends of the blank, the outer creaser blades 1192 are held stationary. Were these blades moved with the blades 1190 toward the inner creaser blades 1194 to pinch the crease, a strain would be imposed on that portion of the blank lying between the creases. By moving the blades 1190, and permitting movement of the blades 1194 toward the fixed blades 1192, the forces applied to the blanks to pinch the creases are toward the center of the blank from the outer edges. Since the edges are free to move inwardly as the creases are formed, no strain is imposed on the material of the blank.

The outer creaser blades are carried by carriages 1196 movable transversely of the machine on pairs of crossbars 1198 which are secured by screws 1200 (Fig. 26) to the rails 14. Gibs 1202 secured to the carriages underlie the inner crossbars of each pair to hold the carriages on the crossbars. A screw 1204 having right and left hand threads passes through threaded bushings 1206 in the carriages and has at its outer end a fitting 1208 to receive a crank for rotating the screw and moving the carriages toward or away from each other, thereby to accommodate different lengths of blanks. The carriages are held in their proper positions of adjustment by T-bolts 1210, the heads of which underlie the crossbars 1198 and the shanks of which pass upwardly between the crossbars to receive nuts 1212 which clamp the carriages to the crossbars.

The outer creaser blades 1192 are fixedly secured to the carriages. The blades 1190 are mounted for movement toward the fixed creaser blades and have stub shafts 1214 journaled in arms 1216 (Fig. 26) projecting upwardly from opposite ends of the carriages. Pinned to the outwardly projecting portions of the stub shafts are arms 1218 to one end of which are pivoted the heads of depending rods 1222 passing downwardly between the pairs of crossbars 1198. Springs 1224 act between the carriages and the arms 1220 to pivot the creaser blades 1190 away from the creaser blades 1192 to positions limited by the engagement of stop screws 1226 with stops 1228 in the carriages.

The inner creaser blades 1194 are secured in recesses in holders 1230 by gibs 1232 (Fig. 25) held against the creaser blades by set screws 1234. These frames are pivotally connected by stub shafts 1236 to the lower ends of rods 1238 (Fig. 26) which extend upwardly through vertical bores in the opposite ends of heads 1240 arranged for vertical movement. These heads are secured by gibs 1242 clamped by screws 1243 to cross girts 1244 which are in turn secured to cross heads 1246 mounted at the upper ends of rods 1248. These rods extend through bearings 1250 secured to the rails 14, and cranks 1252 arranged to be reciprocated by the drive shafts 16 and 18 are pivotally secured through clamps 1280 to the upper ends of the rods. The heads 1240 from which the inner creaser blades are supported are arranged to be adjusted transversely of the machine in accordance with the adjustment of the outer creaser blades. For this purpose an adjusting screw 1254 is threaded through bushings in the heads 1240. The outer end of the screw is supported in a bearing 1255 (Fig. 24) carried by one of the cross girts 1244. Collars 1257 and 1259, secured to the screw at opposite sides of the bearing prevent lengthwise movement of the screw. In order to permit adjustment of the heads by the screw 1254, the screws 1243 which clamp the gibs 1242 to the cross girts 1244 are loosened.

The rods 1238 are connected by springs 1256 (Fig. 26) to the heads 1240. These springs surround reduced portions of the rods and act between the rods and caps 1258 secured to the heads to urge the rods downwardly. Sleeves 1260 secured to the rods between the caps 1258 and collars 1262 engage the upper surfaces of the caps to limit downward movement of the inner creaser blades relatively to the heads. The driven rods 1248 by which the inner creaser blades are moved downwardly are also connected, as will be described, to the outer creaser blades 1190 to operate these during the final portion of the downward movement of the rods. During this movement of the outer creaser blades, the inner creaser blades are held against further downward movement by engagement of the collars 1262 with the top surfaces of bars 1264 between which the sleeves 1260 extend. The bars 1264 are secured to the upper ends of posts 1266, the lower ends of which are threaded at 1268 between the crossbars 1198 and into the rails 14. As the heads 1240 descend they will move the inner creaser blades downwardly until the collars 1262 engage the upper surfaces of the bars 1264 which limits downward movement of the creaser blades 1194 while permitting further downward movement of the heads by compressing the springs 1256.

This further downward movement of the heads operates through mechanism which will now be described to move the creaser blades 1190 toward the creaser blades 1192. To the lower ends of the rods 1222 are secured channel bars 1270. These channel bars in turn support crossbars 1272, the ends of which underlie the rails 14 (Fig. 24). To the under sides of the crossbars 1272 at their ends are secured brackets 1274 in the outer ends of which are adjustably connected bushings 1276 through which the driven rods 1248 pass. Springs 1278 act between the bushings 1276 and the clamps 1280 on the rods normally to hold the crossbars 1272 against the under sides of the rails 14. The rods 1248 carry collars 1282 which are arranged to engage the upper surfaces of the bushings 1276 at a predetermined time during the downward movement of the rods, thereby to move the crossbars 1272 downwardly. The collars 1282 are adjusted to cause this downward movement of the crossbars immediately after the inner creaser blades have completed their downward movements. The crossbars act during their downward movements through the channel bars 1270 and the rods 1222 to move the outer creaser blades 1190 toward the creaser blades 1192 to pinch the creases which have been formed. The creaser blades 1190 during this movement act against the inner creaser blades 1194 to rock them about their pivots 1236 so that they move toward the fixed creaser blades to pinch the crease along both edges. The inner creaser blades are normally held in the positions illustrated in Fig. 24 by springs 1284 which are connected at one end to pins 1286 projecting outwardly from arms 1288 which extend upwardly from the holders 1230 by which the inner creaser blades are carried. The springs are connected at their other ends to pins 1292 (Figs. 24 and 26) projecting outwardly from arms 1294 secured to and depending from the heads 1240. Stop screws 1296 threaded through the arms 1288 engage the arms 1294 to adjustably determine the normal position of the blades 1194.

For maintaining the ends of the blanks flat during the creasing operation, yieldable holddowns 1300 of spring steel are secured at 1302 to the frames 1230 carrying the inner creaser blades. The forward edges of the blanks are directed above the outer blades by deflectors 1304 secured by screws to the arms 1216 of the carriages 1196 directly ahead of said blades to prevent engagement of the edges of the blanks therewith.

Figure 2:
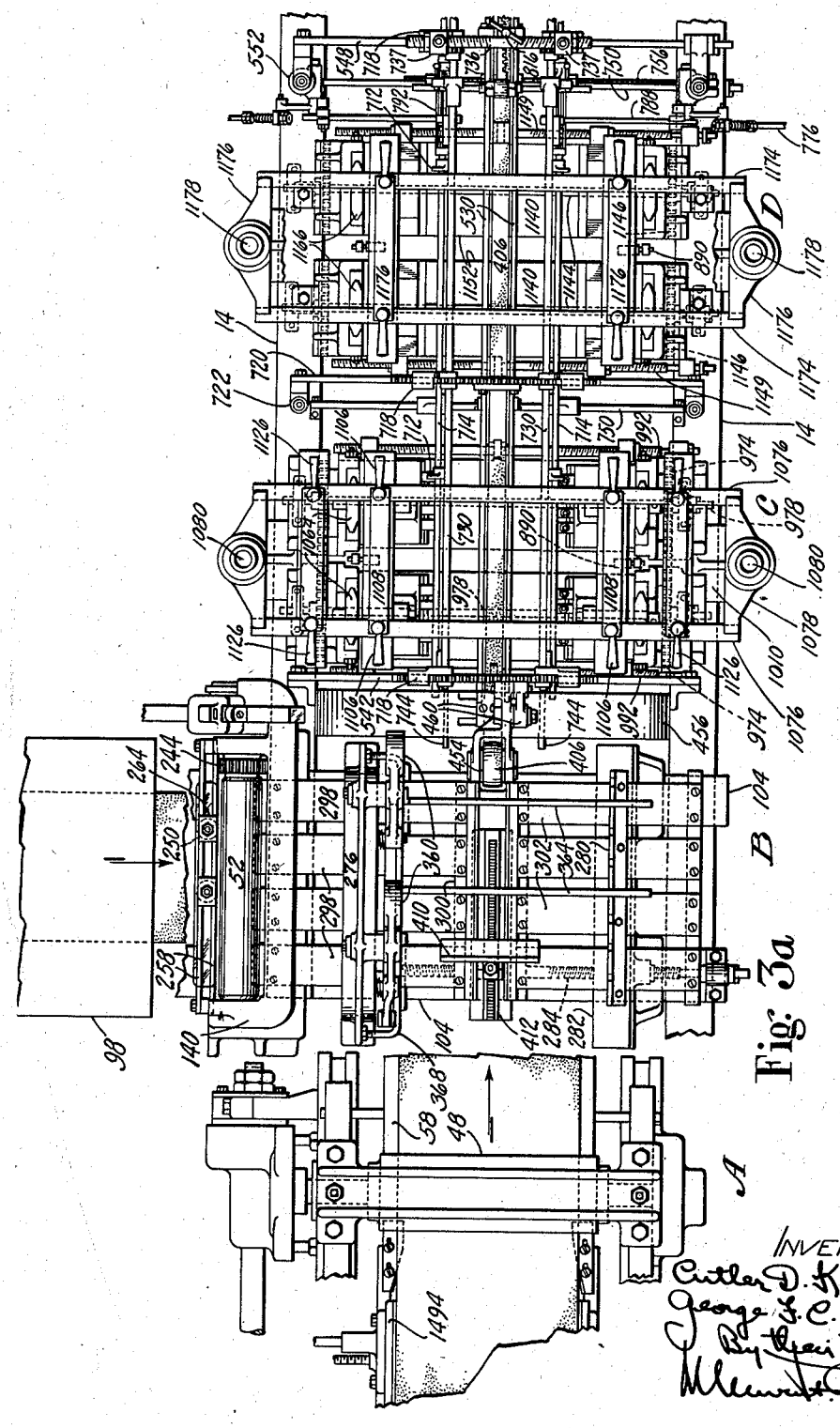
Fig. 2 is a view illustrating the progressive steps in the formation of a blank as it passes through the machine of Fig. 1.

After the creases k have been formed at station E, the blank passes to station F to receive the second cross creases m and n which define the end-wings and the corner-laps. This station is identical with station E except for the construction of the creasers which are formed so that the creases n are offset slightly from the creases m longitudinally of the blank, as shown in Fig. 2. This permits the corner-laps to lie smoothly within the end-wings when the box is set up. The construction of the creaser blades is illustrated in Fig. 27. The inner creaser blade 1306 is formed of three plates secured to the frame 1230. One of the outer plates 1308 of the inner creaser blade has at its central portion a depending creasing surface for forming the crease m. The other outer plate 1310 has depending creasing surfaces at its ends to form the creases n. The central plate 1312 acts to space the other plates to provide the desired offset between the creases. The amount of offset of the creases may be varied by substituting for the central plate 1312 another plate of a different thickness. The outer creaser blades 1314 and 1316 have offset creasing edges, as shown in Fig. 27, to cooperate with the offset portions of the inner creaser blade 1306. The central portion of the creaser blade 1314 is somewhat higher than the outer portions of this creaser blade, whereas the outer portions of the creaser blade 1316 are slightly higher than the central portion thereof. This permits the edges of each pair of the opposed portions of the two outer creaser blades to meet in the same horizontal plane, which would not be possible if the portions of each of these creaser blades were located in the same plane, inasmuch as the two blades are normally located in planes inclined with respect to each other. It will be understood that the creaser blades in station F are located nearer the center of the machine than the creaser blades of station E and are similarly adjustable to accommodate blanks of different lengths.

After the second sets of cross creases m and n have been formed at station F, the blank passes to station G in which the long creases o, o are formed. These creases extend between the slots e and define the side-wings p. They extend substantially normal to the path of travel of the blank, and so the single pair of feed belts which engages the blank along the center line of the machine cannot be employed inasmuch as it would interfere with the creasers. Accordingly the blank is fed through this station by the two sets of feed belts 560 and 562 heretofore described which engage the blank outwardly from the creases o.

Figure 29:
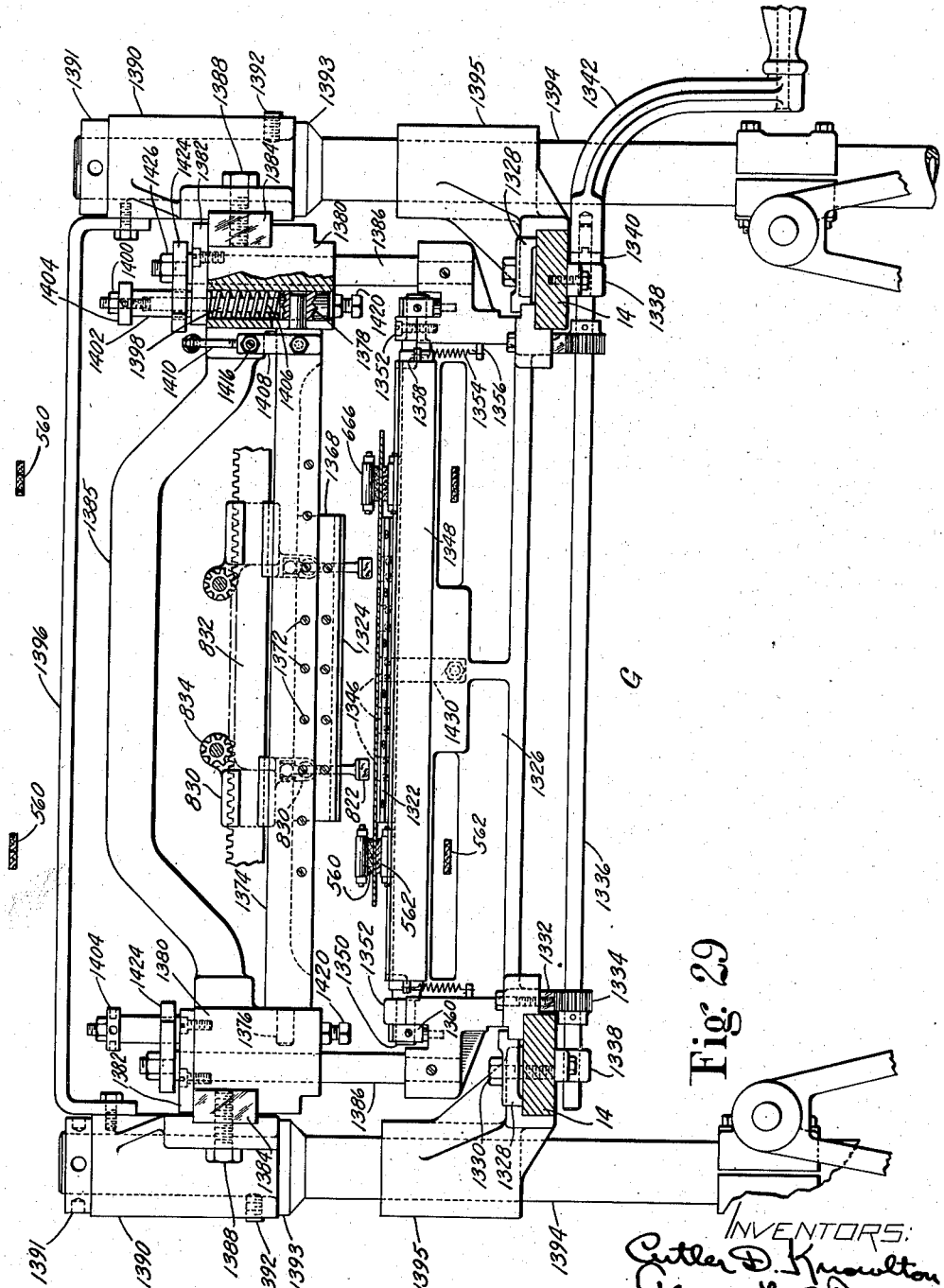
Fig. 29 is a transverse vertical section through station G in which the longitudinal creases are formed to define the side-wings.
Figure 30:
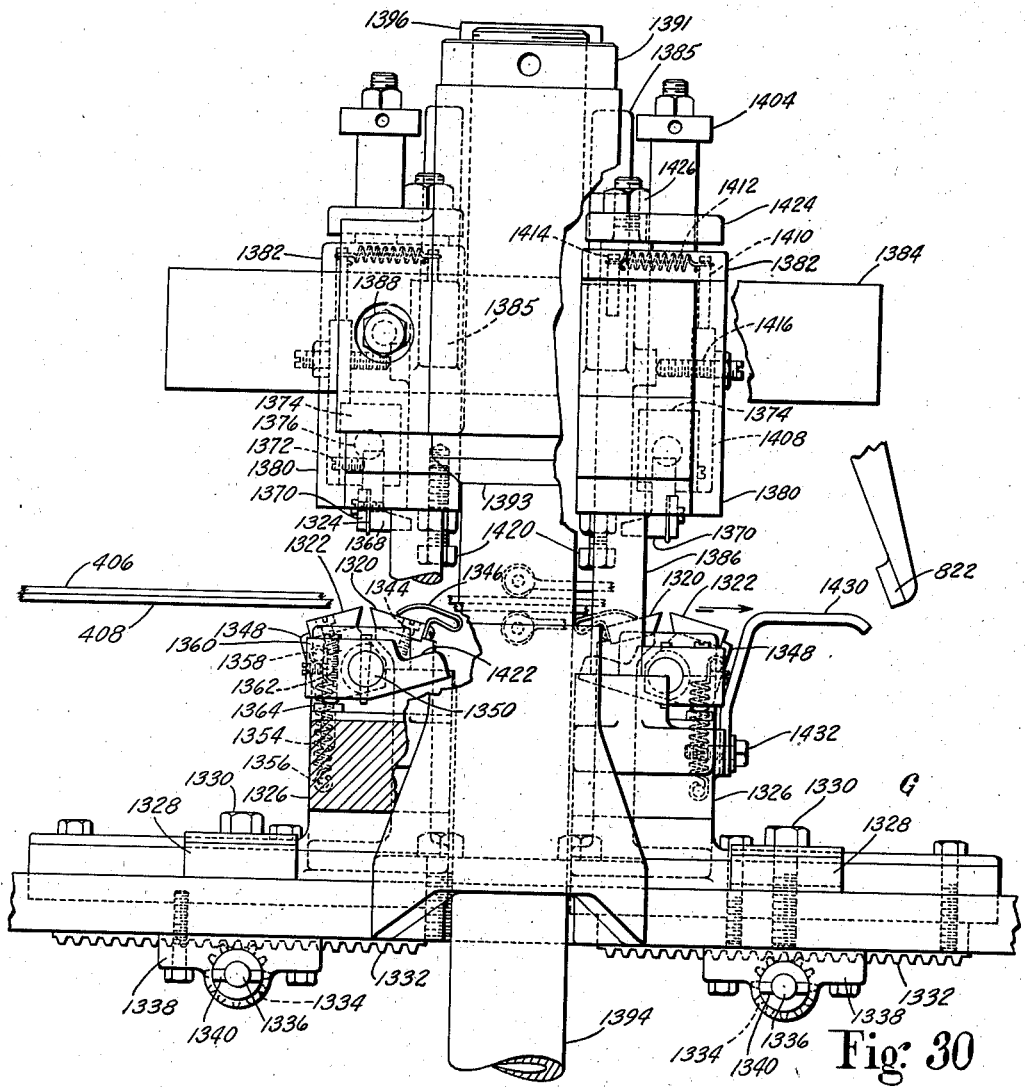
Fig. 30 is a side elevation, partly in section, of a portion of the longitudinal-creasing station G, this view being taken on a larger scale than Fig. 29.
Figure 31:
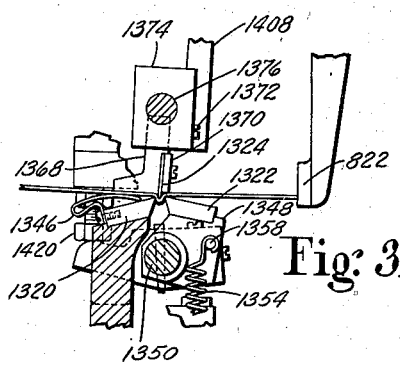
Fig. 31 is a vertical section showing the action of the creasers of Figs. 29 and 30, and including the stop by which the blank is held during the long-creasing operation.

The creases are formed by two sets of creasers, each of which comprises a pair of outer creaser blades 1320 and 1322 and an inner creaser blade 1324 (Figs. 30 and 31). Each pair of outer creaser blades is supported by a carriage 1326 (Figs. 29 and 30) supported for adjustment lengthwise of the machine on the rails 14. Gibs 1328 secured to the rails by screws 1330 hold the carriages on the rails. To the underside of the carriages are secured racks 1332 with which engage pinions 1334 carried by shafts 1336. These shafts are journaled in bearings 1338 secured to the undersides of the rails. Each of the shafts is provided with a member 1340 for receiving a crank 1342 by which the shafts are rotated. This adjustment of the carriages lengthwise of the machine enables a change in the distance between the long creases o to accommodate blanks of different widths.

The outer creaser blades 1320 are fixedly secured to the carriages by screws 1344. To these blades are secured spring members 1346 which normally act to lift the blank a slight distance above the creasers, so that after the long creases have been formed in the blank the advancing creased portions will clear the blades. The outer creaser blades 1322 are secured to holders 1348 (Fig. 31) from the ends of which extend stub shafts 1350. These shafts are journaled in bearings 1352 (Fig. 29) near the ends of the carriages and permit movement of the creaser blades 1322 toward and away from the blades 1320. The blades 1322 are normally held away from the blades 1320, as shown in Fig. 30, by springs 1354 acting between pins 1356 secured to the carriages and pins 1358 extending from the ends of the frames 1348. The stub shafts 1350 extend outwardly beyond the bearings 1352 as shown in Fig. 29 and to the outer ends of these shafts are pinned arms 1360 by which the shafts are turned during the operation of the machine to move the creaser blades 1322 periodically toward the blades 1320 against the force of the springs 1354. Stop screws 1362 passing vertically through the arms 1360 are arranged to engage stops 1364 in the carriages 1326 to limit the distance to which the blades 1322 are moved from the fixed blades 1320.

The inner creaser blades 1324 are held between plates 1368 and 1370. The plates 1368 are in turn secured by screws 1372 to holders 1374 from the outer ends of which project stub shafts 1376. These shafts are journaled in bearings 1378 and permit rocking movement of the inner creaser blades relatively to the outer creaser blades when the movable outer creaser blades are moved toward the other blades to pinch the creases after they have been formed. The bearings 1378 which support the frames 1374 are carried by vertically movable slides 1380 which are held by plates 1382 on bars 1384 extending lengthwise of the machine. The slides at opposite sides of the machine are interconnected by tie bars 1385. The bars 1384 guide the slides 1380 for adjustment lengthwise of the machine with the carriages 1326 supporting the outer creaser blades, to which they are connected by rods 1386. These rods also guide the slides 1380 for vertical movement when the inner creaser blades are moved downwardly to form the creases.

The bars 1384 are secured by screws 1388 to cross heads 1390. These cross heads are secured by screws 1392 between collars 1391 and flanges 1393 to vertically movable rods 1394 passing through bearings 1395 secured to the rails 14 and reciprocated by the drive shafts 16 and 18. The cross heads are secured together by a tie bar 1396.

The bearings 1378 by which the frames 1374 are supported have upwardly extending shank portions 1398 which are threaded at their upper ends to receive nuts 1400. The plates 1382 secured to the tops of the slides have upwardly extending sleeves 1402 through which the shank portions 1398 pass. Collars 1404 confined between the upper end of the sleeves and the nuts 1400 form stops to limit downward movement of the bearings 1378 within the slides 1380. Springs 1406 are confined between the bearings and the plates 1382 and surround the shank portions 1398 of the bearings. As the slides 1380 are carried downwardly by the rods 1394, they act through the springs to move the inner creaser blades 1324 yieldably to force the material forming the blank between the outer creaser blades.

The creaser blades 1324 are normally maintained in a vertical position by the frames 1374. To the frames are secured upwardly extending arms 1408 into the upper ends of which are threaded pins 1410. Springs 1412 act between these pins and pins 1414 carried by the tie bars 1385 to rock the frames to a position determined by the engagement of stop screws 1416 with the tie bars. These springs permit movement of the blades 1324 during the movements of the creaser blades 1322 toward the fixed creaser blades.

These movements of the creaser blades 1322 are effected by the engagement of screws 1420 (Fig. 31) with tails 1422 of the arms 1360 secured to the outer ends of the shafts 1350. These screws are threaded into the slides 1380 and move downwardly with the frames 1374. Downward movement of these frames is arrested before movement is imparted to the creaser blades 1322. For this purpose arms 1424 are secured by nuts 1426 to the upper ends of the rods 1386 and surround the sleeves 1402. After the slides 1380 have been moved downwardly to carry the creaser blades 1324 to the desired positions the collars 1404 engage the upper surfaces of the arms 1424 to prevent further downward movement of the frames carrying the creaser blades 1324. Further downward movement of the slides 1380 is permitted by the springs 1406 through which motion is transmitted from the slides to the frames. The screws 1420 now move the outer creaser blades 1322 toward the fixed creaser blades to pinch the creases which have been formed. As in stations E and F the movable creaser blades are those which engage the blanks on the sides of the creases near the edges of the blanks so that no strain is imposed upon the portion of the blank between the fixed creaser blades. After the long creases have been thus formed the blank is fed forwardly over a guide plate 1430 (Fig. 30) which supports the blanks centrally of the feed belts. This guide is secured by a screw 1432 to the carriage 1326 at the exit end of station G.

The blanks now pass to station H at which a design may be embossed therein. The mechanism for embossing the blanks is illustrated in Fig. 36. Between the rails 14 at the embossing station is secured a crossbar 1434 having a vertical slot 1436 formed therein. This crossbar supports a die holder 1438 to the upper surface of which is secured a die 1440 adapted to impress a design on the blank. The die holder 1438 has a depending shank portion 1442 passing downwardly through the slot 1436 in the crossbar. The lower surface of the die holder is inclined and rests on a wedge 1444 mounted for sliding movement along the crossbar. Threaded into the wedge is a screw 1446 which may be turned to shift the wedge along the crossbar to change the height of the die. For locking the die holder in position, its shank portion 1442 is recessed below the crossbar to receive a pin 1448 having a flattened surface arranged to engage the bottom surface of a wedge 1450. This wedge may be adjusted lengthwise of the crossbar by a screw 1452. By moving the wedge 1450 to the left it acts through the pin and shank portion 1442 to force the die holder into firm engagement with the wedge 1444. By backing off one wedge and taking up the other the die holder may be readily raised or lowered, thereby to vary the depth of the impression or to compensate for varying thicknesses of stock.

At the embossing station is a pair of vertically movable rods 1454, one of which is shown in Fig. 1, which are connected through links 1456 to eccentrics 1458 on the drive shafts of the machine. To cross heads 1460, attached to the upper ends of these rods, are secured two spaced cross girts 1462 (Fig. 36) which are reciprocated vertically by the rods 1454. A press head 1464 is held against the undersides of the cross girts by a clamp 1466. Slidable within horizontal arms of the clamp is a rod 1468 carrying at its lower end a hold-down 1470. This rod is urged downwardly by a spring 1472 acting between the upper arm of the clamp and a shoulder on the rod. The clamp 1466 has a key 1474 cooperating with a keyway in the rod 1468 to prevent turning of the rod in the clamp. The hold-down is arranged to press the blank against a support 1476 secured by a screw 1478 to the side of the die holder 1438. This support has a downwardly inclined, forward end portion arranged to guide the blank over the die 1440 and to support the blank along its central portion. As the cross girts 1462 are carried downwardly, the hold-down 1470 first engages the blank to retain it firmly in position, after which the spring 1472 is compressed and the press head 1464 continues to move downwardly. This movement continues until the blank has been firmly pressed against the die 1440 to receive the desired impression.

In order that the design may be located centrally of the blank, regardless of its size, the stops 822 may be adjusted lengthwise of the machine, as heretofore described, in accordance with the width of the blank. No adjustment for the length of the blank is necessary inasmuch as the center lines of the blanks coincide with the center line of the machine, irrespective of their lengths. After the embossing operation is completed the stops 822 move out of the way and the blank is carried out of station H and ejected from the machine.

Figure 3:
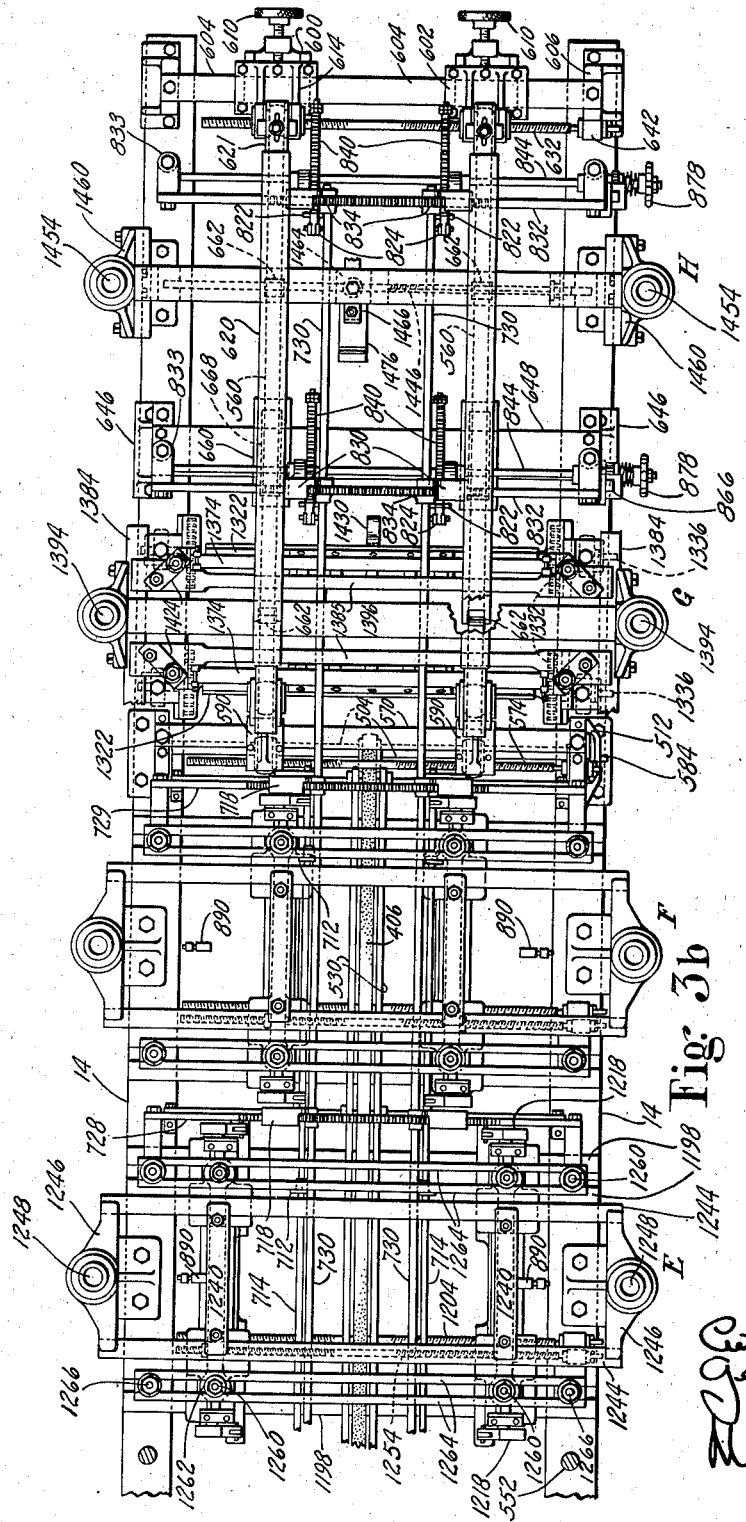
Fig. 3 is a side elevation, partly in section, of mechanism that may be associated with the combining portion of the machine for introducing reinforcing string along the edges of the web-assembly from which the blanks are formed.

To strengthen the edges of the box blanks it is often desirable to apply reinforcing material in the form of string along the margins of the web from which the blanks are made. This string is applied between the layer of shell material and the layer of cover material, or in the case of blanks for box covers the string may be applied between the shell material and the stay material. This string is applied in the combining section A of the machine by mechanism illustrated in Figs. 3, 43, 44 and 45. As shown in Fig. 3, string s is applied to the top surface of the layer of shell material b simultaneously with the combining of the shell material and the cover paper d as the layer of shell material and cover paper pass between combining rolls 1490 and 1492. A deflector or scroll 1494 folds the cover paper around the edges of the board in the usual manner, after which the board passes between the combining rolls 48 and 50 at the outlet end of the combining section A. Before the string is applied to the board it passes through a glue reservoir 1496 mounted on the supports for rolls 1498 and 1500 of the combining section.

The string is supplied from cops (not shown) which may be supported from one of the posts in the combining section and passes upwardly through an eye 1502 from which it enters the glue receptacle through an opening 1504. Mounted in the receptacle for movement transversely of the machine are a pair of slides 1506, only one of which is illustrated. These slides are mounted on a screw 1508 having right and left hand threads so that upon rotation of the screw the slides are moved simultaneously toward or away from each other so that they may be adjusted simultaneously for webs of different widths. The slides are also supported by a rod 1510 parallel to the screw 1508 so that the slides will not turn with the screw. Secured to the top of each slide is a plate 1512 having an eye 1514 for guiding the string into the receptacle.

The string passes from this eye downwardly through an eye 1516 (Fig. 45) mounted at the lower end of an arm 1518. This arm has a horizontal, rotatably mounted section 1520 which permits swinging movement of the eye 1516 into and out of the glue in the receptacle, thereby to facilitate threading the string through the eye. A handle 1522 of the arm 1518 is normally held in the position illustrated by a depending portion 1524 of the plate 1512. The handle 1522 is sufficiently resilient so that it may be withdrawn from beneath the portion 1524 of the plate to permit swinging of the arm 1518 from within the glue to a position in which it is above the surface of the glue.

After passing through the eye 1516 the string, which has now received an application of glue, passes upwardly and over a grooved guide roll 1526. This roll is journaled on a shaft 1528 the ends of which are supported by rods 1530 threaded to receive nuts 1532. The roll is urged against a wiper member 1534 depending from the plate 1512 and having a curved surface concentric with that portion of the roll about which the string passes. Springs 1536 act between the nuts 1532 and the rear surface of the wiper to urge the roll into contact therewith so that excess glue is removed from the string. The effect of the wiper 1534 may be varied by adjusting the nuts 1532 thereby to vary the tension of the springs 1536. The string which has thus been supplied with the proper amount of glue leaves the roll 1526 and passes in a path parallel to the edge of the web, as shown in Fig. 43, to be applied thereto at the proper distance inwardly of the edge. This distance is readily controlled by adjusting the slides 1506 transversely of the machine by rotating the screw 1508.

To facilitate filling the receptacle 1496 a pot 1540 is secured to one end of the receptacle, by way of a passageway formed by walls 1542. This pot is provided with a hinged cover 1544 and the receptacle is likewise provided with a cover 1546 which fits into the receptacle, as shown in Fig. 45. The screw 1508 and the rod 1510 are protected from the glue by a wall 1550 secured to the receptacle and projecting outwardly therefrom as shown in Fig. 43.

It will thus be seen that this arrangement provides means for supplying the reinforcing string with just the right amount of glue and then directing the string to the web at the proper distance inwardly of the edges. The mechanism is readily and accurately adjustable for webs of different widths by the screw 1508.

In the operation of the machine layers of cover, shell and lining material are combined in section A of the machine to form a web of blank material. From the combining section the web is fed by the rolls 48 and 50 upwardly between the guide plates 58 and 60, whence it passes through the cage 76 and downwardly between guide plates 90, 94 and 96, 98. The loop thus formed by the web assists in its change in direction of travel and also serves to permit the accumulation of sufficient web material which is fed intermittently by the rolls 52 and 54 to the cut-off means. The web is guided laterally as it passes downwardly through the loop by the guides 110 and 112 which are adjustable to accommodate webs of different widths. The cage 76 which guides the web at the top of the loop is movable with the web as the length of the web in the loop varies and serves to guide the web smoothly through the top of the loop and to control the driving means for the forming section of the machine by causing it to slow down for a length of time when the loop becomes short enough.

The web is fed intermittently by the rolls 52 and 54 under the knife 56 which is operated between the feeding movements to sever discrete blanks from the end of the web. During this time the web is held against movement by the clamping means 380 associated with the knife and by the cooperative action of the feet 250 and the clamping bar 252. The feeding action of the rolls 52 and 54 is readily adjustable by the screw 190 (Fig. 5) in accordance with the length of blank which it is desired to produce. The knife 56 and the fence 366 (Fig. 4), engageable with the end of the web, are adjustable simultaneously toward and away from each other by the screw 284 (Fig. 6) in accordance with the length of the blank to be produced to maintain the center line of the blank in the same position in the machine regardless of its length. After a blank has been severed by the knife 56 from the web it is moved by the transfer bar 410 forwardly to a position between the feed belts 406 and 408. The transfer bar 410 is mounted for adjustment lengthwise of the machine to accommodate webs of different widths.

The blank is now transferred along a path normal to its long dimension, with an increasing and then a decreasing acceleration, by the belts 406 and 408 to station C (Figs. 12 to 15), where its advance is arrested by the stops 712 movable into and out of the path of the blank. The blank is centralized by the joggers 890 which operate immediately after the blank comes to rest. The knives 960 now move downwardly to form the recesses h along the side of the corner-laps. At the same time the knives 964 move downwardly and cut the blank along the line s (Fig. 16). This knife also turns down the portion of the end-wing adjacent to this cut at t (Fig. 15), after which this downwardly projecting portion is trimmed off by the knife 968. The knife assemblies operating at each corner of the blank at this station are adjustable lengthwise of the machine by the shafts 978 to accommodate blanks of different widths. For accommodating blanks of different lengths the assemblies are adjustable widthwise of the machine by the screws 992. The slots e separating the end-wings and corner-laps and the recesses h on the corner-laps are now formed and the blank is ready for the next operation.

The stops 712 now move out of the way and the blank is fed by the belts 406 and 408 to station D at which the saw-toothed portions j are formed. The motion of the blank is arrested at the proper position in this station by the associated stops 712 and the blank is again centralized by the associated joggers 890. The punches 1162 (Figs. 18 to 21) are now moved downwardly and cooperate with the dies 1160 to form the saw-toothed portions. Shafts 1144 at this station provide for adjustment of the punches and dies lengthwise of the machine to accommodate blanks of different widths, and adjustment of the members transversely of the machine to accommodate blanks of different lengths is effected by the screws 1149.

The blank is now transferred by the feed belts to station E at which its motion is again arrested and the blank is again centralized as at the preceding stations. At this station the creases k, extending transversely of the blank and separating the end-wings and end-wing extensions, are formed as shown in Figs. 24 to 26. For this purpose the blank is supported above the two sets of lower or outer creaser blades 1190 and 1192 and the inner blades 1194 are moved downwardly to force the blank downwardly between the outer blades. The outer creaser blades 1190 nearest the edges of the blank now move toward the outer creaser blades 1192 to pinch the crease thus formed without exerting any strain on that portion of the blank lying between the creases. The inner creaser blades 1194 are movable in the same direction as the blades 1190 at this time so that the creases are effectively pinched along both edges to give a permanent set to the material. Screws 1204 and 1254 provide for the adjustment of the outer and inner creaser blades respectively transversely of the machine to accommodate blanks of different lengths. After the creases k have been thus formed the blank is again advanced to station F where the second sets of cross creases m and n which define the end-wings and the corner-laps are formed. This station is substantially the same as station E except that the creaser blades are formed as in Fig. 27 so that the creases m and n are offset slightly from each other to permit the corner-laps to lie smoothly within the end-wings when the box is set up.

The blank is now advanced from the single pair of feed belts 406 and 408 to be received and fed by the two sets of feed belts 560 and 562 which engage the opposite faces of the blanks near their outer edges so as not to interfere with the operation of the long creasers at station G in which the creases o, o which define the side wings, p, are formed. These creasers extend transversely of the machine and comprise two sets of inner and outer creaser blades which are operated in a manner generally similar to the creaser blades at stations E and F. These creaser blades are adjustable lengthwise of the machine, to accommodate blanks of different widths, by the adjusting rods 1336 (Figs. 29 and 30). The spring fingers 1346, associated with the outer creaser blades at this station, lift the blank a slight distance above the creasers after the creases have been formed so that the advancing creased portions of the blank will clear the outer creaser blades. The motion of the blank at station G as well as station H is arrested by the stops 822 which are mounted as shown in Fig. 37 so that the operation of the creaser blades at this station and of the embossing mechanism at station H will not be interfered with by the shafts 714 carrying the stops 712. Inasmuch as two sets of feed belts are used to feed the blank through stations G and H, the joggers employed at stations B, C, D and E may be omitted as there is little or no danger of the blank's being accidentally displaced when fed by these belts. After the creasing operation at station G is completed, the blank is advanced to station H at which it is suitably marked, after which the finished blank is ejected from the machine.

To accommodate blanks of different widths and so that the blanks will be stopped at the proper position at each of the forming stations, the stops are all adjustable lengthwise of the machine. This adjustment of the stops 712 is effected by turning the single adjusting shaft 816 (Fig. 35) which causes axial movement of both the shafts 714 by which the stops are carried. Each pair of stops at stations G and H is individually adjusted lengthwise of the machine by the associated adjusting handles 878 (Figs. 37 and 38). In order that the stops will more effectively arrest the motion of the blanks it is desirable that they engage the blanks near their ends and accordingly the stops are mounted for adjustment transversely of the machine to accommodate blanks of different lengths and this adjustment of all the stops is effected simultaneously by the single adjusting screw 736 (Fig. 35). In order that the joggers associated with stations C, D, E and F will properly engage the ends of the blanks they are adjustable to accommodate blanks of different lengths. All the joggers are simultaneously adjusted toward or away from each other by the arm 954 (Figs. 32 to 34) by which the teeth of the gear 920 are turned relatively to the hub 948. It should be understood, of course, that if found desirable, joggers similar to those at stations C, D, E and F may also be employed at stations G and H.

It will be understood from the foregoing that by operating on discrete blanks the various operating instrumentalities of the machine are readily adjustable to accommodate blanks of a wide range of sizes. The utilization of the forming section at which discrete blanks are individually produced step-by-step, in combination with a continuous web-forming section, is facilitated by the intermediate cutting-off section at which the web is formed into a loop and fed in a step-by-step manner from the loop to the cutting-off means. The change in direction of the feed of the web at the cutting-off section enables feeding the blanks with their longitudinal finished edges disposed transversely to the direction of travel for engagement with the stops. Furthermore, by so feeding the blanks with their short dimensions disposed in the direction of travel, the overall length of the forming section is kept at a minimum which contributes to a high speed of operation of the machine.

Having thus described our invention, what we claim as new and desire to secure by Letters Patent of the United States is:

1. In a blank-making machine, means for initially feeding a web of blank material, means for advancing the web of blank material along a path transversely of the length of the web, means for severing discrete blanks from the web, means for advancing the severed blanks in the path of initial feeding movement of the web, and means for forming the discrete blanks into box blanks.

2. In a blank-making machine, means for initially feeding a web of blank material, means for advancing the web intermittently along a path transversely of the length of the web, means for severing discrete blanks from the end of the web, means for advancing the discrete blanks along a path substantially in line with the path of initial feeding movement of the web, and means for forming the discrete blanks into box blanks.

3. In a blank-making machine, means for initially feeding a web of blank material, means for advancing the web intermittently along a path transversely of the length of the web, means for severing discrete blanks from the end of the web, means for advancing the discrete blanks along a path substantially in line with the path of initial feeding movement of the web, a plurality of forming stations, means at said stations for performing a series of operations on the blanks, and means for feeding the blanks intermittently through said forming stations.

4. In a blank-making machine having means for combining a web of shell material and a web of cover material to form a web of blank material, the improvement which comprises means for advancing the combined web along a path which extends transversely of the path of the web through the combining means, and means between said combining means and said advancing means for forming said web into a loop to facilitate the change in direction of movement of the web.

5. In a blank-making machine having means for continuously combining a web of shell material and a web of cover material to form a web of blank material, the improvement which comprises means for intermittently advancing the combined web along a path substantially normal to the path of movement of the web through the combining means, and means between said combining means and said advancing means for forming the web into a loop.

6. In a blank-making machine having means for continuously combining a web of shell material and a web of cover material to form a web of blank material, the improvement which comprises means for intermittently advancing the combined web along a path substantially normal to the path of movement of the web through the combining means, means between said combining means and said advancing means for forming the web into a loop, and means controlled by said loop for regulating the relative speeds of said combining means and said advancing means.

7. In a blank-making machine having means for continuously combining a web of shell material and a web of cover material to form a web of blank material, the improvement which comprises means for intermittently feeding the combined web along a path substantially normal to the path of movement through the combining means, means between said feeding means and said combining means for forming a loop to facilitate the change in direction of movement of the web, means in advance of said feeding means for severing discrete blanks from said web, means for performing successive operations on the blank, and means for intermittently feeding the blanks past said operating means along a path substantially in alinement with the path of movement of the web through the combining means.

8. In a machine for acting on webs of sheet material, spaced feeding means for feeding a web along two angularly related paths, the second of which extends transversely of the length of said web, and means between said spaced feeding means for forming said web into a loop having a central unrestrained portion to facilitate the change in direction of movement of said web from the first path to the second path.

9. In a machine for acting on webs of sheet material, means for feeding a web along a path, means for feeding said web along a second path substantially normal to said first path, and means between said feeding means for forming said web into a loop having a central unrestrained portion to facilitate the change in the direction of movement of said web from said first path to said second path.

10. In a machine for acting on webs of sheet material, means for feeding a web along a path, means for feeding said web along a second path substantially normal to said first path, means between said feeding means for forming said web into a loop to facilitate the change in direction of movement of said web from said first path to said second path, and means controlled by said loop for adjusting the speed of one of said feeding means.

11. In a machine for acting on webs of sheet material, means for feeding a web along a path, means for feeding said web along a second path substantially normal to said first path at a speed in excess of the speed along said first-named path, means between said feeding means for forming said web into an upwardly extending loop to facilitate the change in direction of movement of said web from said first path to said second path, and means controlled by said loop for temporarily slowing the second feeding means in response to the shortening of said loop.

12. In a machine for acting on webs of sheet material, spaced web-feeding means, means interposed between said feeding means for forming an upwardly extending loop, said means including a cage surrounding and guiding the web, means mounting said cage for movement in response to variations in the length of the loop, and means operated in response to movement of said cage to a predetermined position for varying the speed of operation of one of said feeding means.

13. In a machine for acting on webs of sheet material, spaced web-feeding means, motors for operating said means, means interposed between said feeding means for forming an upwardly extending loop, said means including a cage through which the web passes and by which the web is guided, means mounting said cage for movement in response to variations in the length of the loop, a normally closed switch controlling the operation of one of said motors and arranged to be opened upon movement of said cage to a predetermined position, and a time-delay relay for maintaining the circuit controlled by said switch open for a predetermined length of time.

14. In a machine for acting on webs of sheet material, a first pair of feed rolls, a second pair of feed rolls arranged substantially at right angles thereto, means forming an upwardly extending loop between said pairs of rolls to change the direction of travel of the web, a cage through which the web passes arranged to guide the web through said loop, means mounting said cage for movement in response to variations in the length of the loop, and means operated by movement of said cage to control the speed of one of said pairs of rolls to maintain the length of said loop within predetermined limits.

15. In a machine for acting on webs of sheet material, a pair of continuously operated feed rolls, a pair of intermittently operated feed rolls, means for causing the web to pass through a loop as it passes from the continuously operated feed rolls to the intermittently operated feed rolls, means for driving said intermittently operated feed rolls to cause feeding of the web at a speed in excess of the speed of the web through said continuously operated feed rolls, and means operated in response to a shortening of the loop for temporarily disconnecting the driving means for said intermittently operated feed rolls from a source of power.

16. In a machine for acting on webs of sheet material, a pair of continuously operated feed rolls, a pair of intermittently operated feed rolls, means for causing the web to pass through a loop as it passes from the continuously operated feed rolls to the intermittently operated feed rolls, means for driving said intermittently operated feed rolls to cause feeding of the web at a speed in excess of the speed of delivery from the continuously operated feed rolls, means operated in response to a shortening of the loop for disconnecting the motor for driving said intermittently operated feed rolls from a source of power, and means maintaining said motor disconnected from the source of power for a predetermined length of time.

17. In a machine for acting on webs of sheet material, a pair of continuously operated feed rolls, a pair of intermittently operated feed rolls, means for causing the web to pass through a loop as it passes from the continuously operated feed rolls to the intermittently operated feed rolls, means for driving said intermittently operated feed rolls to cause feeding of the web at a speed in excess of the speed of delivery through said continuously operated feed rolls, a cage through which the web passes in said loop, means mounting said cage for movement with the loop in response to changes in the length of the loop, and means operated in response to movement of said cage to a predetermined position for temporarily disconnecting the driving means for said intermittently operated feed rolls from a source of power.

18. In a machine for acting on webs of sheet material, spaced feeding means for feeding a web along two angularly related paths the second of which extends transversely of the length of the web, and means between said spaced feeding means for forming the web into a loop to facilitate the change in direction of movement from the first path to the second path, said loop-forming means including a pair of curved, substantially uniformly spaced guide plates for turning the web out of the first path and a pair of curved, substantially uniformly spaced guide plates for guiding the web from the loop into the second path.

19. In a machine for acting on webs of sheet material, spaced feeding means for feeding a web along two angularly related paths the second of which extends transversely of the length of the web, means between said spaced feeding means for forming the web into a loop to facilitate the change in direction of movement from the first path to the second path, said loop-forming means including a pair of curved, substantially uniformly spaced guide plates for turning the web out of the first path and a pair of curved, substantially uniformly spaced guide plates for guiding the web from the loop into the second path, and adjustable guide means for the edge of the web associated with said second pair of guide plates for guiding the web widthwise through the second path.

20. In a machine for acting on webs of sheet material, spaced feeding means for feeding a web along two angularly related paths the second of which extends transversely of the length of the web, means between said spaced feeding means for forming the web into a loop to facilitate the change in direction of movement from the first path to the second path, said loop-forming means including a pair of curved, substantially uniformly spaced guide plates for turning the web out of the first path and a pair of curved, substantially uniformly spaced guide plates for guiding the web from the loop into the second path, and means between said pairs of plates for guiding the web thereby to produce a smooth loop therebetween.

21. In a machine for acting on webs of sheet material, spaced feeding means for feeding a web along two angularly related paths the second of which extends transversely of the length of the web, means between said spaced feeding means for forming the web into a loop to facilitate the change in direction of movement from the first path to the second path, said loop-forming means including a pair of curved, substantially uniformly spaced guide plates for turning the web out of the first path and a pair of curved, substantially uniformly spaced guide plates for guiding the web from the loop into the second path, means between said pairs of plates for guiding the web thereby to produce a smooth loop therebetween, and means mounting said guiding means for movement in accordance with changes in the length of the loop.

22. In a machine for acting on webs of sheet material, means for feeding a web along a path, means for feeding said web along a second path substantially normal to the first path, means between said feeding means for forming the web into an upwardly extending loop to facilitate the change in direction of movement of said web from said first path to said second path, said loop-forming means including a pair of curved, substantially uniformly spaced guide plates extending upwardly from said first feeding means, a second pair of curved, substantially uniformly spaced guide plates for directing the web downwardly to the second feeding means, and means above said pairs of guide plates for guiding the web therebetween thereby to produce a smooth loop between the first and second feeding means.

23. In a machine for acting on webs of sheet material, means for feeding a web along a path, means for feeding said web along a second path substantially normal to the first path, means between said feeding means for forming the web into an upwardly extending loop to facilitate the change in direction of movement of said web from said first path to said second path, said loop-forming means including a pair of curved, substantially uniformly spaced guide plates extending upwardly from said first feeding means, a second pair of curved, substantially uniformly spaced guide plates for directing the web downwardly to the second feeding means, and means above said pairs of guide plates for guiding the web therebetween thereby to produce a smooth loop between the first and second feeding means, said last-named means comprising a cage through which the web passes and means mounting said cage for movement in accordance with variations in the length of the loop.

24. In a machine for operating on webs of sheet material, means for intermittently feeding a web of sheet material, means for severing blanks from the end of the web during the intervals between the feeding movements, intermittently operated means for advancing the severed blanks along a path at a right angle to the path of movement of the web of sheet material, means for adjusting the amount of each feeding movement of the web, and means for adjusting the positions of said severing means and the advancing means relatively to said intermittent feeding means and to each other.

25. Mechanism for acting on webs of sheet material comprising means for feeding a web of sheet material along a path, means for turning the web out of the path and then feeding it intermittently in a second path at an angle to the first path, means for severing blanks from the end of the web in the second path during the intervals between the intermittent feeding movements, and means for feeding the blanks substantially in the direction of said first path.

26. Mechanism for acting on webs of sheet material comprising means for intermittently feeding a web of sheet material along a path, means in advance of said feeding means for severing blanks from the end of the web during the intervals between the feeding movements, means for conveying the blanks along a second path, and intermittently operable means for transferring the blanks to said conveying means.

27. Mechanism for acting on webs of sheet material comprising means for continuously feeding a web of sheet material along a path, loop-forming means for turning the web out of the path and directing it in a second path, means for feeding the web intermittently in the second path, means for severing blanks from the end of the web in the second path during the intervals between the intermittent feeding movements, and means for feeding the blanks substantially in the direction of the first path.

28. Mechanism for acting on webs of sheet material comprising means for continuously feeding a web of sheet material along a path, loop-forming means for turning the web out of the path and directing it along a second path, means for feeding the web intermittently in the second path, means for severing blanks from the end of the web in the second path during the intervals between the intermittent feeding movements, and means for feeding the blanks substantially in the direction of the first path, and means controlled by the length of said loop for controlling the operation of said first-named feeding means to maintain the length of said loop within predetermined limits.

29. In a machine for operating on webs of sheet material, means for feeding a web of sheet material along a path at uniform speed, loop-forming means for turning the web out of said path normal to the first-named path, a pair of feed rolls for feeding the web from the loop intermittently along a second path, a knife for severing blanks from the end of the web during the intervals between the operation of said feed rolls, an intermittently operated transfer device for feeding the blanks substantially in the direction of said first path, and means controlled by the length of said loop for controlling the operation of said feed rolls, said knife and said transfer device to decrease temporarily the speed of operation of these members upon decrease in the length of the loop to a predetermined value.

30. In a machine for operating on blanks of sheet material, a plurality of operating stations past which a blank is fed in a step-by-step manner to have successive operations performed thereon, means at one of said stations for operating on the outer portions of the blank, means at a second of said stations for operating on the blank inwardly of said outer portions, means engageable with the opposite faces of the blank along its central portion for feeding the blank through said one station, and means engageable with the opposite faces of the blank at opposite sides of its central portion for feeding the blank through said second station.

31. In a machine for operating on blanks of sheet material, a plurality of operating stations past which a blank is fed in a step-by-step manner to have successive operations performed thereon, means at a first group of said stations for performing successive operations on the outer portions of the blank, means at another station for performing an operation on the blank between said outer portions; means for feeding blanks through said first group of stations comprising a pair of feed belts engageable with opposite faces of the blanks along their central portions, and means for feeding the blanks through said other station comprising two pairs of feed belts engageable with opposite faces of the blanks along their outer portions.

32. In a machine for operating on blanks of sheet material, a plurality of operating stations past which a blank is fed in a step-by-step manner to have successive operations performed thereon, means at a first group of said stations for performing successive operations on the outer portions of the blank, means at another station for performing an operation on the blank between said outer portions; means for feeding blanks past said first group of stations comprising a pair of feed belts engageable with opposite faces of the blanks along their central portions, means for feeding the blanks through said other station comprising two pairs of feed belts engageable with opposite faces of the blanks along their outer portions, and means for adjusting said last two pairs of feed belts toward and away from each other to accommodate blanks of different sizes.

33. In a machine for operating on blanks of sheet material, a pair of feed belts engageable with the opposite faces of a blank to feed it past an operating station, a pair of shafts extending parallel to said belts at opposite sides thereof, means for oscillating said shafts, stops carried thereby and movable into and out of the path of movement of the blank, means for adjusting the shafts toward or away from each other, and means for adjusting the shafts axially to accommodate blanks of different sizes.

34. In a machine for operating on blanks of sheet material, means for feeding blanks past an operating station, a stop associated with said station for temporarily arresting the motion of each blank at said station, means for moving said stop into and out of the path of movement of the blanks, and means acting in time relation to the movement of said stop for varying the speed of operation of said feeding means.

35. In a machine for operating on blanks of sheet material, means for feeding blanks past a plurality of operating stations, stops associated with each of said stations for temporarily arresting the motion of the blanks at each station, means for moving said stops into and out of the path of movement of the blanks, and means acting in time relation to the movement of said stops for varying the speed of operation of said feeding means.

36. In a machine for operating on blanks of sheet material, means for intermittently feeding blanks past successive operating stations, said feeding means comprising a pair of feed belts engageable with opposite faces of the blanks, means for alternately accelerating and decelerating said belts, stops associated with each of said stations, and means for periodically moving said stops into and out of the path of movement of said blanks temporarily to arrest the motion of the blanks at each station.

37. In a machine for operating on blanks of sheet material, means for intermittently feeding blanks past successive operating stations, said feeding means comprising a pair of feed belts engageable with opposite faces of the blanks, means for alternately accelerating and decelerating said belts to cause rapid movement of the blanks between the stations and slower movement of the blanks as they approach the positions in the stations to be operated upon, stops associated with each of said stations, and means for periodically moving said stops into and out of the path of movement of said blanks temporarily to arrest the motion of the blanks at each station.

38. In a machine for operating on blanks of sheet material, a pair of feed belts extending lengthwise of the machine and engageable with opposite faces of the blanks to feed them through the successive operating stations, a pair of shafts extending parallel to said belts, a plurality of stops carried by each of said shafts, means for oscillating said shafts to move the stops into and out of the path of movement of the blanks, and means for driving said belts at variable speeds, the speed of the belts being at a minimum while the stops are engaged by the blanks.

39. In a machine for operating on blanks of sheet material, means for feeding blanks past a plurality of operating stations, stops associated with each of said stations for temporarily arresting the movement of the blanks at each station, and means for simultaneously adjusting the stops at a plurality of stations along the line of feed.

40. In a machine for operating on blanks of sheet material, means for feeding blanks past a plurality of operating stations, stops associated with each of said stations for temporarily arresting the movement of the blanks at each station, means for moving said stops into and out of the path of movement of the blanks, and single means for causing a simultaneous adjustment of said stops along the line of feed.

41. In a machine for operating on blanks of sheet material, means for feeding blanks past a plurality of operating stations, a pair of stops at each station for temporarily arresting the movement of the blanks at each station, the stops of each pair being arranged at opposite sides of the center line of the path of travel, means for moving said stops into and out of the path of movement of the blanks, and means for causing simultaneous inward or outward movement of all said stops.

42. In a machine for operating on blanks of sheet material, means for feeding blanks past a plurality of operating stations, a pair of stops at each station for temporarily arresting the movement of the blanks at each station, the stops of each pair being arranged at opposite sides of the center line of the path of travel, means for moving said stops into and out of the path of movement of the blanks, and means for simultaneously adjusting said stops along the line of feed.

43. In a machine for operating on blanks of sheet material, means for feeding blanks past a plurality of operating stations, a pair of stops at each station for temporarily arresting the movement of the blanks at each station, the stops of each pair being arranged at opposite sides of the center line of the path of travel, means for moving said stops into and out of the path of movement of the blanks, means for simultaneously adjusting said stops along the line of feed, and single means for adjusting the stops at each station transversely of the line of feed.

44. In a machine for operating on blanks of sheet material, means for feeding a blank past an operating station, a pair of stops, means for moving said stops into and out of the path of movement to arrest the blank at the station, means for adjusting said stops transversely of the path of movement, and means for adjusting said stops along the path of movement.

45. In a machine for operating on blanks of sheet material, means for feeding a blank past an operating station, a pair of stops, means for moving said stops into and out of the path of movement of the blank to arrest the blank at the station, means for simultaneously adjusting said stops in opposite directions transversely of the path of movement, and means for adjusting said stops along the path of movement.

46. In a machine for operating on blanks of sheet material, means for feeding a blank past an operating station, a pair of stops, means for moving said stops into and out of the path of movement to arrest the blank at the station, means for adjusting said stops as a unit along the line of feed, and single means for adjusting said stops equal amounts in opposite directions transversely of the line of feed.

47. In a machine for operating on blanks of sheet material, means for feeding blanks past a plurality of operating stations, a stop associated with one station and movable about an axis parallel to the line of feed into and out of the path of movement of the blanks, a stop associated with another station and movable about an axis normal to the line of feed into and out of the path of movement of the blanks, means for operating said stops, and single means for simultaneously adjusting the stops transversely of the line of feed.

48. In a machine for operating on blanks of sheet material, means for feeding blanks past a plurality of operating stations, a stop associated with one station and movable about an axis parallel to the line of feed into and out of the path of movement of the blanks, a stop associated with another station and movable about an axis normal to the line of feed into and out of the path of movement of the blanks, means for operating said stops, single means for simultaneously adjusting the stops transversely of the line of feed, and means for adjusting said stops along the line of feed.

49. In a machine for operating on blanks of sheet material, means engageable with the central portion of a blank for feeding it, upper and lower guides for supporting and guiding the blank at opposite sides of the line of contact with the feeding means, stops associated with said upper guides and movable into and out of the path of movement of the blank for temporarily arresting the blank, means for operating said stops, and means for adjusting the guides and associated stops transversely of the line of feed.

50. In a machine for operating on blanks of sheet material, means engageable with the central portion of a blank for feeding it, upper and lower guides for supporting and guiding the blank at opposite sides of the line of contact with the feeding means, stops associated with said upper guides and movable in and out of the path of movement of the blank for temporarily arresting the blank, means for operating said stops, means for adjusting the guides and associated stops transversely of the line of feed, and means for adjusting the stops relatively to the guides along the line of feed.

51. In a machine for operating on blanks of sheet material, means for feeding a blank past an operating station, a shaft extending parallel to the line of feed, means for oscillating said shaft, a stop carried by said shaft and movable thereby into and out of the path of movement of the blank, means for adjusting said shaft along the line of feed, and means for adjusting said shaft transversely of the line of feed.

52. In a machine for operating on blanks of sheet material, opposed belts engageable with the central portion of a blank to feed it past an operating station, a pair of shafts extending parallel to said belts at opposite sides thereof, means for oscillating said shafts, stops carried by the shafts and movable into and out of the path of movement of the blank, and means for simultaneously adjusting the positions of the shafts to accommodate blanks of different sizes.

53. In a machine for operating on blanks of sheet material, means for feeding a blank past an operating station, a shaft mounted for oscillation about an axis parallel to the path of feeding movement, a stop carried by said shaft for movement into and out of the path of movement of the blanks, a pinion carried by said shaft, a rack having teeth meshing with said pinion, means for reciprocating said rack to oscillate the shaft, and means supporting said shaft for lengthwise adjustment to vary the position at which the movement of the blank is arrested by the stop, the pinion on said shaft being sufficiently long to permit the lengthwise adjustment of the shaft.

54. In a machine for operating on blanks of sheet material, means for feeding a blank past an operating station, a shaft mounted for oscillation about an axis parallel to the path of feeding movement, a stop carried by said shaft for movement into and out of the path of movement of the blanks, a pinion carried by said shaft, a rack having teeth meshing with said pinion, means for reciprocating said rack to oscillate the shaft, means supporting said shaft for lengthwise adjustment to vary the position at which the movement of the blank is arrested by the stop, the pinion on said shaft being sufficiently long to permit the lengthwise adjustment of the shaft, and means for supporting said shaft and said rack for adjustment transversely of the path of movement of the blank.

55. In a machine for operating on blanks of sheet material, means for feeding blanks past a plurality of operating stations, a shaft mounted for oscillation about an axis parallel to the path of feeding movement, stops carried by said shaft and movable into and out of the path of the blanks for interrupting their feeding movements at each of said stations, an elongated pinion carried by said shaft, a rack operatively associated with said pinion, means for reciprocating said rack to oscillate the shaft, and means supporting said shaft for lengthwise adjustment thereby to vary the operative position of said stops relatively to said station.

56. In a machine for operating on blanks of sheet material, means for feeding blanks past a plurality of operating stations, a pair of parallel shafts mounted for oscillation about axes parallel to the path of feeding movement of the blanks, stops carried by said shafts for movement into and out of the path of feeding movement for arresting the movement of the blanks at each of said stations, elongated pinions carried by said shafts, racks having teeth in engagement with said pinions, means for reciprocating said racks to move the stops on each of said shafts in unison into and out of the path of feeding movement of the blanks, and single means for adjusting both of said shafts lengthwise of the path of feeding movement to vary the positions at which movement of the blanks is arrested at each of said stations.

57. In a machine for operating on blanks of sheet material, means for feeding blanks past a plurality of operating stations, a pair of parallel shafts mounted for oscillation about axes parallel to the path of feeding movement of the blanks, stops carried by said shafts for movement into and out of the path of feeding movement for arresting the movement of the blanks at each of said stations, elongated pinions carried by said shafts, racks having teeth in engagement with said pinions, means for reciprocating said racks to move the stops on each of said shafts in unison into and out of the path of feeding movement of the blanks, single means for adjusting both of said shafts lengthwise of the path of feeding movement to vary the positions at which movement of the blanks is arrested at each of said stations, and single means for adjusting said shafts simultaneously toward or away from each other to accommodate blanks of different widths.

58. In a machine for acting on blanks of sheet material, means for feeding blanks past a plurality of operating stations, stops associated with each of said stations for temporarily arresting the movement of the blanks at each station, a pair of shafts extending parallel to the direction of travel of the blanks on which said stops are mounted, slides supporting said shafts, racks extending crosswise of the direction of travel on which said slides are mounted, shafts passing through said slides parallel to said first-named shafts, pinions carried by said second-named shafts in mesh with the teeth of said racks, means for adjusting said slides crosswise of the machine, and means for operating said first-named shafts to move the stops into and out of the path of travel of the blanks.

59. In a machine for operating on blanks of sheet material, means for feeding blanks past a plurality of operating stations, stops associated with each of said stations for temporarily arresting the movement of the blanks at each station, a pair of shafts extending parallel to the direction of travel of the blanks on which said stops are mounted, slides supporting said shafts for rotative and axial movement, racks extending crosswise of the direction of travel on which said slides are mounted, shafts passing through said slides parallel to said first-named shafts, means securing said second-named shafts to said slides against axial movement, means releasably locking said first-named shafts to said last-named shafts against axial movement, pinions carried by said last-named shafts in mesh with the teeth of said racks, means for adjusting said slides crosswise of the machine, and means for oscillating said first-named shafts to move the stops into and out of the path of travel of the blanks.

60. In a machine for operating on blanks of sheet material, means for feeding blanks past an operating station, a support above said operating station extending transversely of the path of movement of the blanks, a slide carried by said support, a stop carried by said slide for pivotal movement about an axis normal to the direction of movement of the blank, a rack connected to said stop and arranged to be reciprocated to move the stop into and out of the path of movement of the blanks, a shaft carried by said support, a pinion on said shaft in operative engagement with said rack, and means for oscillating said shaft.

61. In a machine for operating on blanks of sheet material, means for feeding blanks past an operating station, a support above said operating station extending transversely of the path of movement of the blanks, a slide carried by said support, a stop carried by said slide for pivotal movement about an axis normal to the direction of movement of the blank, a rack connected to said stop and arranged to be reciprocated to move the stop into and out of the path of movement of the blanks, a shaft carried by said support, a pinion on said shaft in operative engagement with said rack, means for oscillating said shaft, and means for adjusting said slide and said pinion lengthwise of their supports.

62. In a machine for operating on blanks of sheet material, means for feeding blanks past an operating station, a support above said station and extending transversely of the direction of movement of the blanks, slides carried by said support, stops pivotally carried by said slides for oscillation about horizontal axes normal to the direction of movement of the blanks, a shaft carried by said slides for oscillation about an axis parallel to the pivotal axes of the stops, racks connected to the stops and arranged to be reciprocated to oscillate the stops, pinions carried by said shaft in engagement with the last-named racks, and means for oscillating said shaft.

63. In a machine for operating on blanks of sheet material, means for feeding blanks past an operating station, a support above said station and extending transversely of the direction of movement of the blanks, slides carried by said support, stops pivotally carried by said slides for oscillation about horizontal axes normal to the direction of movement of the blanks, a shaft carried by said slides for oscillation about an axis parallel to the pivotal axes of the stops, racks connected to the stops and arranged to be reciprocated to oscillate the stops, pinions carried by said shaft in engagement with the last-named racks, means for oscillating said shaft, and means for adjusting said slides and said pinions lengthwise of the support toward and away from each other.

64. In a machine for operating on blanks of sheet material, means for feeding blanks past an operating station, a support above said station and extending transversely of the direction of movement of the blanks, slides carried by said support, stops pivotally carried by said slides for oscillation about horizontal axes normal to the direction of movement of the blanks, a shaft carried by said slides for oscillation about an axis parallel to the pivotal axes of the stops, racks connected to the stops and arranged to be reciprocated to oscillate the stops, pinions carried by said shaft in engagement with the last-named racks, means for oscillating said shaft, means for adjusting said slides and said pinions lengthwise of the support toward and away from each other, and means for adjusting said stops perpendicularly to said support along the path of feeding movement of the blanks.

65. In a machine for operating on blanks of sheet material, means for feeding blanks past an operating station, a support extending horizontally above said operating station normal to the path of feeding movement of the blanks, slides carried by said support for movement therealong, horizontal rods carried by said slides extending parallel to the path of movement of the blanks, stops pivoted to said rods for movement about horizontal axes normal to the path of movement of the blanks, racks connected to said stops and extending through said slides parallel to said rods, a shaft journaled in said slides for oscillation about an axis normal to said racks, pinions carried by said shaft engaging the teeth on said racks, and means for adjusting said rods in said slides to vary the positions of said stops along the path of movement of the blanks.

66. In a machine for operating on blanks of sheet material, means for feeding blanks past an operating station, a support extending horizontally above said operating station normal to the path of feeding movement of the blanks, said support being provided with rack teeth, slides carried by said support for movement therealong, horizontal rods carried by said slides extending parallel to the path of movement of the blanks, stops pivoted to said rods for movement about horizontal axes normal to the path of movement of the blanks, racks connected to said stops and extending through said slides parallel to said rods, a shaft journaled in said slides for oscillation about an axis normal to said racks, pinions carried by said shaft engaging the teeth on said racks, means for adjusting said rods in said slides to vary the positions of said stops along the path of movement of the blanks, shafts carried by said slides and extending in the direction of movement of the blanks, pinions carried by said shafts engaging the rack teeth on said support, and means for turning said shafts to adjust the positions of said slides transversely of the direction of movement of the blanks.

67. In a machine for operating on blanks of sheet material, means for feeding blanks past an operating station, a support extending horizontally above said operating station normal to the path of feeding movement of the blanks, said support being provided with rack teeth, slides carried by said support for movement therealong, horizontal rods carried by said slides extending parallel to the path of movement of the blanks, stops pivoted to said rods for movement about horizontal axes normal to the path of movement of the blanks, racks connected to said stops and extending through said slides parallel to said rods, a shaft journaled in said slides for oscillation about an axis normal to said racks, pinions carried by said shaft engaging the teeth on said racks, single means for adjusting simultaneously both of said rods in said slides to vary the positions of said stops lengthwsie of the path of movement of the blanks, shafts carried by said slides and extending in the direction of movement of the blanks, pinions carried by said shafts in engagement with the rack teeth on said support, and means for simultaneously turning said last-named shafts in opposite directions simultaneously to move said slides toward or away from each other.

68. In a machine for operating on blanks of sheet material, means for feeding blanks past an operating station, a stop associated with a station for temporarily arresting the motion of the blanks at said station, means for moving said stop into and out of the path of movement of the blank, joggers movable toward and away from each other to engage opposite edges of the blanks as they come to rest to position them transversely of said path, means for operating said joggers, and means acting in timed relation to the movement of said stop and said joggers for varying the speed of operation of said feeding means.

69. In a machine for operating on blanks of sheet material, means for feeding blanks past a plurality of operating stations, stops associated with each of said stations for temporarily arresting the motion of the blanks at each station, means for moving said stops into and out of the path of movement of the blank, joggers movable toward and away from each other to engage opposite edges of the blanks as they come to rest to position them transversely of said path, means for operating said joggers, and means acting in timed relation to the movement of said stops and said joggers for varying the speed of operation of said feeding means.

70. In a machine for operating on blanks of sheet material, means for intermittently feeding blanks past successive operating stations, said feeding means comprising a pair of feed belts engageable with opposite faces of the blanks, means for alternately accelerating and decelerating said belts to cause rapid movement of the blanks between the stations and slower movement of the blanks as they approach the positions in the station to be operated upon, stops associated with each of said stations, means for periodically moving said stops into and out of the path of movement of said blanks temporarily to arrest the motion of the blanks at each station, a pair of joggers associated with each station, and means for moving said joggers toward and away from each other thereby to engage opposite edges of the blanks as they come to rest to centralize the blanks with respect to the operating station.

71. In a machine for operating on blanks of sheet material, means for intermittently feeding blanks past successive operating stations, stops associated with each of said stations, means for periodically moving said stops into and out of the path of movement of the blanks temporarily to arrest the motion of the blanks at each station, a pair of joggers associated with each of said stations, means for periodically moving said joggers toward and away from each other thereby to engage opposite edges of the blanks intermittently to centralize the blanks with respect to the operating stations, means for simultaneously adjusting all said stops in the direction of the path of movement to accommodate blanks of different sizes, and means for simultaneously adjusting all the joggers transversely of the path of movement of the blanks.

72. In a machine for operating on blanks of sheet material, means for feeding blanks along a path, means for positioning said blanks transversely relatively to said path, said means including joggers movable toward and away from each other to engage opposite edges of successive blanks being fed along said path, means for operating said joggers and means for simultaneously adjusting said joggers transversely of said path to accommodate blanks of different sizes.

73. In a machine for operating on blanks of sheet material, means for feeding blanks along a path, means for positioning said blanks relatively to said path, said means including a plurality of joggers on each side of the path, said joggers being arranged in pairs, the joggers of each pair being movable toward and away from each other to position the blanks at successive stations along the path, means for operating said joggers, and means for simultaneously adjusting all said joggers transversely of said path to accommodate blanks of different sizes.

74. In a machine for operating on blanks of sheet material, means for feeding blanks along a path, means for intermittently arresting movement of the blanks along the path at successive stations, a pair of joggers disposed at each station and arranged to be moved into engagement with opposite edges of the blanks to position the blanks at each station, means for simultaneously operating the joggers at all the stations, and means for simultaneously adjusting all the joggers transversely of said path to accommodate blanks of different sizes.

75. In a machine for operating on blanks of sheet material, means for feeding blanks along a path, a pair of joggers disposed at opposite sides of said path, and means for reciprocating said joggers toward and away from each other, thereby to engage opposite edges of a blank to position it transversely of said path and then to move out of engagement with the blank, said means including an adjustable member for simultaneously adjusting said joggers transversely of said path to accommodate blanks of different sizes.

76. In a machine for operating on blanks of sheet material, means for feeding blanks along a path, a pair of joggers disposed at opposite sides of said path, a drive shaft, means for oscillating said drive shaft, and means connecting said drive shaft to said joggers for reciprocation toward and away from each other thereby to engage opposite edges of a blank to position it transversely of said path and then to move out of engagement with the blank, said connecting means including an adjustable member enabling simultaneous adjustment of said joggers transversely of said path to accommodate blanks of different sizes.

77. In a machine for operating on blanks of sheet material, means for feeding blanks along a path, a pair of joggers disposed at opposite sides of said path, and means for reciprocating said joggers toward and away from each other thereby to engage opposite edges of a blank to position it transversely of said path and then to move out of engagement with the blank, said means including a drive shaft, means for oscillating said drive shaft, racks connected to said joggers and means connecting said racks to said drive shaft for reciprocation in opposite directions.

78. In a machine for operating on blanks of sheet material, means for feeding blanks along a path, a pair of joggers disposed at opposite sides of said path, means for reciprocating said joggers toward and away from each other thereby to engage opposite edges of a blank to position it transversely of said path and then to move out of engagement with the blank, said means including a drive shaft, means for oscillating said drive shaft, racks connected to said joggers and means connecting said racks to said drive shaft for reciprocation in opposite directions, and means for simultaneously adjusting said racks relatively to said drive shaft thereby to adjust said joggers transversely of said path to accommodate blanks of different sizes.

79. In a machine for operating on blanks of sheet material, means for feeding blanks along a path, a pair of joggers disposed at opposite sides of said path, means mounting said joggers for sliding movement transversely of said path, a drive shaft, means for oscillating said drive shaft, a member carried by said drive shaft for oscillation therewith, means connecting said member to said joggers to cause movement of said joggers toward and away from each other, and means for adjusting said member relatively to said shaft thereby simultaneously to adjust said joggers to vary the proximity with which they approach each other.

80. In a machine for operating on blanks of sheet material, means for feeding blanks along a path, a pair of joggers disposed at opposite sides of said path, means mounting said joggers for sliding movement transversely of said path, racks connected to said joggers, a drive shaft, means for oscillating said drive shaft, gearing connecting said drive shaft and said racks to cause reciprocation of said joggers toward and away from each other, and means for adjusting said gearing thereby simultaneously to adjust said joggers to vary the proximity with which they approach each other.

81. In a machine for operating on blanks of sheet material, means for feeding blanks along a path, a pair of joggers disposed at opposite sides of said path, means mounting said joggers for sliding movement transversely of said path, a drive shaft, means for oscillating said drive shaft, a gear carried by said drive shaft for oscillation therewith, racks connected to said joggers and to said gear and arranged to be reciprocated in response to oscillation of said gear thereby to move said joggers toward and away from each other, said gear being adjustable around said drive shaft to vary the positions of said joggers at the limits of their inward movements, and means for locking said gear to said drive shaft.

82. In a machine for operating on blanks of sheet material, means for feeding blanks along a path, a pair of joggers disposed at opposite sides of said path, means mounting said joggers for sliding movement transversely of said path, a drive shaft, means for oscillating said drive shaft, a gear carried by said drive shaft for oscillation therewith, racks connected to said joggers and to said gear and arranged to be reciprocated in response to oscillation of said gear thereby to move said joggers toward and away from each other, said gear being adjustable around said drive shaft to vary the positions of said joggers at the limits of their inward movements, means carried by said drive shaft for adjusting said gear, and means for locking said gear to said drive shaft.

83. In a machine for operating on blanks of sheet material, means for feeding blanks along a path, a pair of joggers disposed at opposite sides of said path, means mounting said joggers for sliding movement transversely of said path, a drive shaft, means for oscillating said drive shaft, a gear carried by said drive shaft for oscillation therewith, racks connected to said joggers and to said gear and arranged to be reciprocated in response to oscillation of said gear thereby to move said joggers toward and away from each other, said gear including a hub fixed to said drive shaft and teeth adjustably mounted on said hub to vary the positions of said joggers at the limits of their inward movements, and means for locking said teeth to said hub.

84. In a machine for operating on blanks of sheet material, means for feeding blanks along a path past a succession of operating stations, a pair of joggers associated with each station and arranged to be moved into engagement with opposite edges of the blanks to position the blanks at each station, a drive shaft, means for oscillating said drive shaft, a driven shaft, means connecting said shafts to cause oscillation of said driven shaft, means connecting each pair of joggers to said driven shaft to cause reciprocation of said joggers toward and away from each other, and means for causing rotational movement of said driven shaft relatively to said drive shaft to cause simultaneous adjustment of all of said joggers transversely of said path to accommodate blanks of different sizes.

85. In a machine for operating on blanks of sheet material, means for feeding blanks along a path past a succession of operating stations, a pair of joggers associated with each station and arranged to be moved into engagement with opposite edges of the blanks to position the blanks at each station, a drive shaft, means for oscillating said drive shaft, a driven shaft, means connecting said shafts to cause oscillation of said driven shaft, said means including a gear mounted for rotational adjustment on said drive shaft and enabling adjustment of said driven shaft relatively to said drive shaft, and means connecting each pair of joggers to said driven shaft to cause reciprocation of said joggers toward and away from each other.

86. In a machine for operating on blanks of sheet material, means for feeding blanks step-by-step past a plurality of operating stations, means at one of said stations for forming in the blank a crease extending in the direction of feed, means at another station for forming in the blank a crease extending substantially normal to the direction of feed, said feeding means including a single pair of feed belts engageable with opposite faces of the blank substantially along its center line at said one of said stations, and two pairs of feed belts engageable with opposite faces of the blank adjacent to its outer edges at said other of said stations.

87. In a machine for operating on blanks of sheet material, means for feeding blanks step-by-step past a plurality of operating stations, and means at one of said stations for forming a crease substantially normal to the direction of movement of the blank and terminating inwardly of its ends, said feeding means including two pairs of feed belts engageable with opposite faces of the blank outwardly of said crease.

88. In a machine for operating on blanks of sheet material, means for feeding blanks step-by-step past a plurality of operating stations, means at one of said stations for forming a crease substantially normal to the direction of movement of the blank and terminating inwardly of its ends, said feeding means including two pairs of feed belts engageable with opposite faces of the blank outwardly of said crease, and means for adjusting said belts laterally of the path of movement to accommodate blanks of different sizes.

89. In a machine for operating on blanks of sheet material, means for feeding blanks step-by-step past a plurality of operating stations, means at one of said stations for forming in the blank a pair of spaced creases extending in the direction of feed, means at another station for forming in the blank a pair of creases extending substantially normal to the direction of feed, said feeding means including a single pair of feed belts engageable with opposite faces of the blank substantially along its center line at said one of said stations and two pairs of feed belts engageable with opposite faces of the blank adjacent to its outer edges at said other of said stations, means for adjusting the creasing means at each of said stations to vary the spacing between the creases, and means for adjusting the feed belts at said second of said stations to accommodate blanks of different sizes.

90. In a machine for operating on blanks of sheet material, means for feeding blanks step-by-step past a plurality of operating stations, means at one of said stations for forming in the blank a pair of spaced creases extending in the direction of feed, means at another station for forming in the blank a pair of creases extending substantially normal to the direction of feed, said feeding means including a single pair of feed belts engageable with opposite faces of the blank substantially along its center line at said one of said stations and two pairs of feed belts engageable with opposite faces of the blank adjacent to its outer edges at said other of said stations, means for adjusting the creasing means at each of said stations to vary the spacing between the creases, means for adjusting the feed belts at said second of said stations to accommodate blanks of different sizes, stops associated with each of said stations for temporarily arresting the movement of the blank, and means for adjusting said stops in the line of feed.

91. In a machine for forming a crease in a blank of sheet material, an inner creaser blade, first and second outer creaser blades between which a crease is formed, means for relatively moving said inner and outer creaser blades to position the inner creaser blade between said outer creaser blades, means for restraining said first outer creaser blade against movement in the plane of the blank, and means for moving said second outer creaser blade and said inner creaser blade toward said first outer creaser blade after the completion of said relative movement.

92. In a machine for forming a crease in a blank of sheet material, a fixed outer creaser blade, a movable outer blade, an inner creaser blade, means for moving said inner creaser blade to a position between said outer creaser blades, and means for moving said inner creaser blade and said movable outer creaser blade toward said fixed outer creaser blade.

93. In a machine for forming a pair of parallel spaced creases in a blank of sheet material, spaced inner creaser blades, a pair of outer creaser blades cooperating with each of said inner creaser blades, means for moving said inner creaser blades to press portions of the blank between said outer creaser blades, means fixedly mounting the outer creaser blades which define the inner edges of the creases, means mounting the others of the outer creaser blades for movement toward the fixed outer creaser blades, and means operative at the completion of said movement of the inner creaser blades for moving the others of the outer creaser blades toward said fixed outer creaser blades.

94. In a machine for forming a crease in a blank of sheet material, a pair of outer creaser blades, an inner creaser blade movable into and out of creasing relationship with said outer creaser blades, means mounting said inner creaser blade for rocking movement about an axis substantially parallel to its work-engaging edge, means for moving said inner creaser blade into creasing relationship with said outer creaser blades, and means for then moving one of said outer creaser blades and said inner creaser blade toward the other outer creaser blade.

95. In a machine for forming a crease in a blank of sheet material, a pair of outer creaser blades, an inner creaser blade movable vertically to a position between said outer creaser blades, a vertically movable head, means connecting said inner creaser blade to said head for movement therewith, said connecting means including a yieldable member for permitting movement of the head relatively to said inner creaser blade, means for moving said head to move the inner creaser blade to a position between said outer creaser blades, means for limiting such movement of said inner creaser blade, and means operative in response to further movement of said head for moving one of said outer creaser blades toward the other outer creaser blade.

96. In a machine for forming a crease in a blank of sheet material, a pair of outer creaser blades, an inner creaser blade movable vertically to a position between said outer creaser blades, a support for said inner creaser blade, means mounting said inner creaser blade on said support for rocking movement about an axis substantially parallel to the work-engaging edge of said inner creaser blade, means yieldably holding said inner creaser blade in a substantially vertical plane, a vertically movable head, means connecting said support to said head for movement therewith, said connecting means including a yieldable member for permitting downward movement of the head relatively to the support, means for moving said head and said support downwardly to move the inner creaser blade to a position between said outer creaser blades, means for limiting downward movement of said support, and means operative upon further downward movement of said head for moving one of said outer creaser blades and said inner creaser blade toward the other outer creaser blade.

97. In a machine for forming a crease in a blank of sheet material, a pair of cooperating creaser blades, means for depressing a portion of a blank between said creaser blades to form a crease therein, and a spring finger secured to one of said creaser blades and having a free portion extending toward the other creaser blade, said spring when in unstressed condition being located above the plane in which the blank is supported thereby to lift the creased portion of the blank from between the creaser blades at the conclusion of the creasing operation.

98. In a creasing mechanism, an outer creasing blade having two creasing edges which are offset with respect to each other in both vertical and horizontal planes.

99. In a creasing mechanism, cooperating outer creaser blades each of which has two creasing edges which are offset with respect to each other in both vertical and horizontal planes, the opposite creasing edges being reversely arranged in the two blades, said blades being located in oppositely inclined planes.

100. In a creasing mechanism, an inner creaser blade having two creasing edges in planes offset vertically with respect to each other, a pair of oppositely inclined outer creaser blades having creasing edges arranged in planes offset vertically with respect to each other to cooperate with the corresponding portions of the inner creasing blade, the creasing edges of the outer creasing blades also being in planes offset horizontally with respect to each other such that all opposed edges of the outer blades are located in substantially the same horizontal plane.

101. Mechanism for forming a crease in a blank of sheet material, said crease being composed of at least two portions offset laterally with respect to each other comprising an inner creasing blade having creasing portions offset laterally with respect to each other, and a pair of outer creaser blades having correspondingly offset creasing portions.

102. Mechanism for forming a crease in a blank of sheet material, said crease being composed of at least two portions offset laterally with respect to each other, comprising an inner creasing blade having creasing portions offset laterally with respect to each other, a pair of outer creaser blades having creasing portions correspondingly offset with respect to each other, means for moving said inner creasing blade into creasing relationship to said outer creasing blades, and means for moving one of said outer creasing blades toward said other outer creasing blade.

103. In a creasing mechanism, an inner creaser blade having two creasing edges in planes offset vertically with respect to each other, a pair of oppositely inclined outer creaser blades having creasing edges arranged in planes offset vertically with respect to each other to cooperate with the corresponding portions of the inner creasing blade, the creasing edges of the outer creasing blades also being in planes offset horizontally with respect to each other such that all opposed edges of the outer blades are located in substantially the same horizontal plane, means for moving said inner creasing blade into creasing relationship to said outer creasing blades, and means for moving one of said outer creasing blades toward said other outer creasing blade.

104. In a creasing mechanism, an inner creaser blade having two creasing edges in vertically offset planes offset vertically with respect to each other, a pair of oppositely inclined outer creaser blades having creasing edges arranged in planes offset vertically with respect to each other to cooperate with the creasing portions of the inner creasing blade, the creasing edges of the outer creasing blades also being in planes offset horizontally with respect to each other such that all opposed edges of the outer blades are located in substantially the same horizontal plane, means fixedly mounting one of said outer creaser blades, means mounting the other outer creaser blade for rocking movement toward and from said fixed outer creaser blade, means mounting said inner creaser blade for vertical movement and for rocking movement about an axis parallel to the axis of movement of said other outer creaser blade, means for moving said inner creaser blade to a position between said outer creaser blades, and means for moving said other outer creaser blade and said inner creaser blade toward said fixed outer creaser blade.

105. In a machine for making box blanks, means for feeding a blank past an operating station, means for stopping the blank at said station, means for operating the feeding means to cause deceleration of the blank as it approaches the stopping means, means for centralizing the blank at the station, and means for performing an operation on the blank while it is at rest and after it has been properly centered.

106. In a machine for making box blanks, means for feeding blanks step by step past a plurality of operating stations, means for stopping the blanks at each station, means for operating said feeding means to cause rapid movement of the blanks between the said stopping means and slower movement of the blanks as they approach the stopping means, means associated with said stations for centralizing the blanks as they come to rest at the stations, and means at each of said stations for performing an operation on the blanks while they are at rest and after they have been properly centered.

CUTLER D. KNOWLTON.
GEORGE F. C. BURKE.

(References on following page)

REFERENCES CITED

The following references are of record in the file of this patent:

UNITED STATES PATENTS

| Number | Name | Date |
|---|---|---|
| Re. 21,208 | Gollwitzer | Sept. 19, 1939 |
| 267,849 | Elmer | Nov. 21, 1882 |
| 295,181 | Leblond | Mar. 18, 1884 |
| 446,829 | Crowell | Feb. 17, 1891 |
| 530,780 | Kingsbury | Dec. 11, 1894 |
| 531,088 | Bartholomew | Dec. 18, 1894 |
| 533,681 | Taylor | Feb. 5, 1895 |
| 557,310 | Marston | Mar. 31, 1896 |
| 631,392 | Binder | Aug. 22, 1899 |
| 695,553 | Heany | Mar. 18, 1902 |
| 970,366 | Barber | Sept. 13, 1910 |
| 992,244 | Potdevin | May 16, 1911 |
| 1,058,101 | Richards | Apr. 8, 1913 |
| 1,092,271 | La Batt | Apr. 7, 1914 |
| 1,126,816 | Mayall | Feb. 2, 1915 |
| 1,151,082 | Cartwright | Aug. 24, 1915 |
| 1,187,144 | Hawkins | June 13, 1916 |
| 1,219,941 | Herman | Mar. 20, 1917 |
| 1,281,982 | Labombarde | Oct. 15, 1918 |
| 1,402,259 | Smith | Jan. 3, 1922 |
| 1,405,513 | Hughes | Feb. 7, 1922 |
| 1,405,515 | Hughes | Feb. 7, 1922 |
| 1,451,782 | Nitsch et al. | Apr. 17, 1923 |
| 1,456,249 | Mayer | May 22, 1923 |
| 1,587,639 | Fleischer | June 8, 1926 |
| 1,637,892 | Benner et al. | Aug. 2, 1927 |
| 1,683,318 | Waner | Sept. 4, 1928 |
| 1,731,834 | Wheeler | Oct. 15, 1929 |
| 1,764,358 | Smith | June 17, 1930 |
| 1,773,709 | Daniels | Aug. 19, 1930 |
| 1,781,111 | Klaucke | Nov. 11, 1930 |
| 1,787,657 | Andren et al. | Jan. 6, 1931 |
| 1,891,367 | Broderick | Dec. 20, 1932 |
| 1,907,760 | Egger | May 9, 1933 |
| 1,908,546 | Sheppared et al. | May 9, 1933 |
| 1,957,613 | Richard | May 8, 1934 |
| 1,988,451 | Knowlton | Jan. 22, 1935 |
| 2,009,618 | Hubbard | July 30, 1935 |
| 2,021,064 | Heygel | Nov. 12, 1935 |
| 2,025,418 | Moore | Dec. 24, 1935 |
| 2,029,394 | Sidebottom | Feb. 4, 1936 |
| 2,045,046 | Mudd | June 23, 1936 |
| 2,085,034 | Magill | June 29, 1937 |
| 2,173,830 | Eitzen | Sept. 26, 1939 |
| 2,188,064 | Spaulding | Jan. 23, 1940 |
| 2,277,514 | Elser | Mar. 24, 1942 |
| 2,288,350 | Gollwitzer | June 30, 1942 |
| 2,290,386 | Schindler | July 21, 1942 |
| 2,295,327 | Bendz | Sept. 8, 1942 |
| 2,349,204 | Staude | May 16, 1944 |

FOREIGN PATENTS

| Number | Country | Date |
|---|---|---|
| 97,844 | Germany | June 28, 1898 |
| 116,212 | Germany | Dec. 18, 1900 |
| 125,537 | Germany | Nov. 22, 1901 |
| 3,868 | Great Britain | A. D. 1910 |
| 307,067 | Great Britain | May 8, 1930 |